United States Patent [19]

Nakata

[11] Patent Number: 5,896,174
[45] Date of Patent: Apr. 20, 1999

[54] CONTROL SYSTEM FOR INHIBITING A CALCULATING SYSTEM IN AN AUTOMATIC FOCUSING DEVICE

[75] Inventor: Masahiro Nakata, Tokyo, Japan

[73] Assignee: Asahi Kogaku Kogyo Kabushiki Kaisha, Tokyo, Japan

[21] Appl. No.: 08/839,937

[22] Filed: Apr. 18, 1997

Related U.S. Application Data

[63] Continuation of application No. 08/351,485, Dec. 7, 1994, abandoned, which is a continuation of application No. 08/119,844, Sep. 13, 1993, abandoned.

[30] Foreign Application Priority Data

Sep. 11, 1992 [JP] Japan ................... 4-243436

[51] Int. Cl.$^6$ ........................................ H04N 5/232
[52] U.S. Cl. .................. 348/348; 348/352; 396/81; 396/95; 396/96
[58] Field of Search .................. 348/345, 348, 348/349, 351, 352, 353, 354, 355, 356; 396/79, 80, 81, 82, 95, 93, 94, 138, 139, 78, 130, 147, 435, 96; H04N 5/232

[56] References Cited

U.S. PATENT DOCUMENTS

| | | | |
|---|---|---|---|
| 4,959,678 | 9/1990 | Nakagawa | 354/403 |
| 4,969,003 | 11/1990 | Ohnuki et al. | 354/402 |
| 5,189,459 | 2/1993 | Watanabe et al. | 396/95 |
| 5,223,886 | 6/1993 | Ishida et al. | 396/130 |
| 5,239,332 | 8/1993 | Muramatsu et al. | 354/402 |
| 5,379,084 | 1/1995 | Yamazaki | 396/78 |
| 5,448,329 | 9/1995 | Nakata | 354/402 |
| 5,498,944 | 3/1996 | Nakata | 318/640 |

FOREIGN PATENT DOCUMENTS 4217237  8/1992  Japan ................ G03B 13/36

*Primary Examiner*—Wendy Garber
*Assistant Examiner*—Ngoc-Yen Vu
*Attorney, Agent, or Firm*—Greenblum & Bernstein, P.L.C.

[57] ABSTRACT

An automatic focusing device has a rangefinder CCD sensor unit that measures a defocus amount with respect to the image of an object which is focused by an optical system. A focusing lens group of the optical system is driven into a focusing position based on the measured defocus amount. An object image moving speed, at which the image of the object moves, is calculated based on at least two defocus amounts which are measured. If the difference between a present defocus amount and a preceding defocus amount is smaller than a predetermined value, the focusing lens group is driven to move the focusing position at a tracking speed corresponding to the object image moving speed. If the difference is equal to or greater than the predetermined value, the focusing lens group is driven at a previously calculated object image moving speed. Even if an object moves out of a rangefinding zone while the object-in-motion is being tracked for focusing, the automatic focusing device keeps tracking the object, causing the focusing lens group to focus on the object.

9 Claims, 39 Drawing Sheets

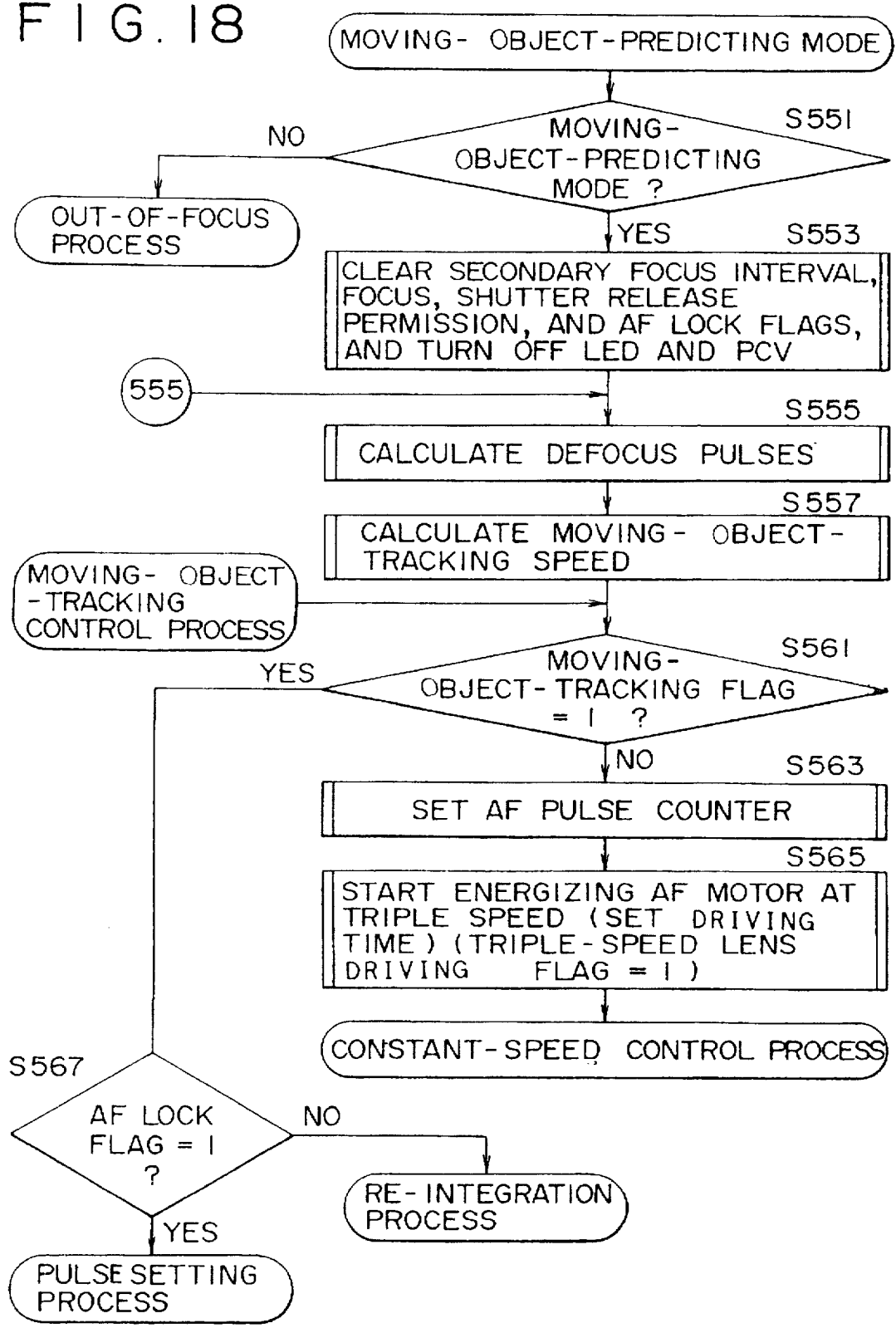

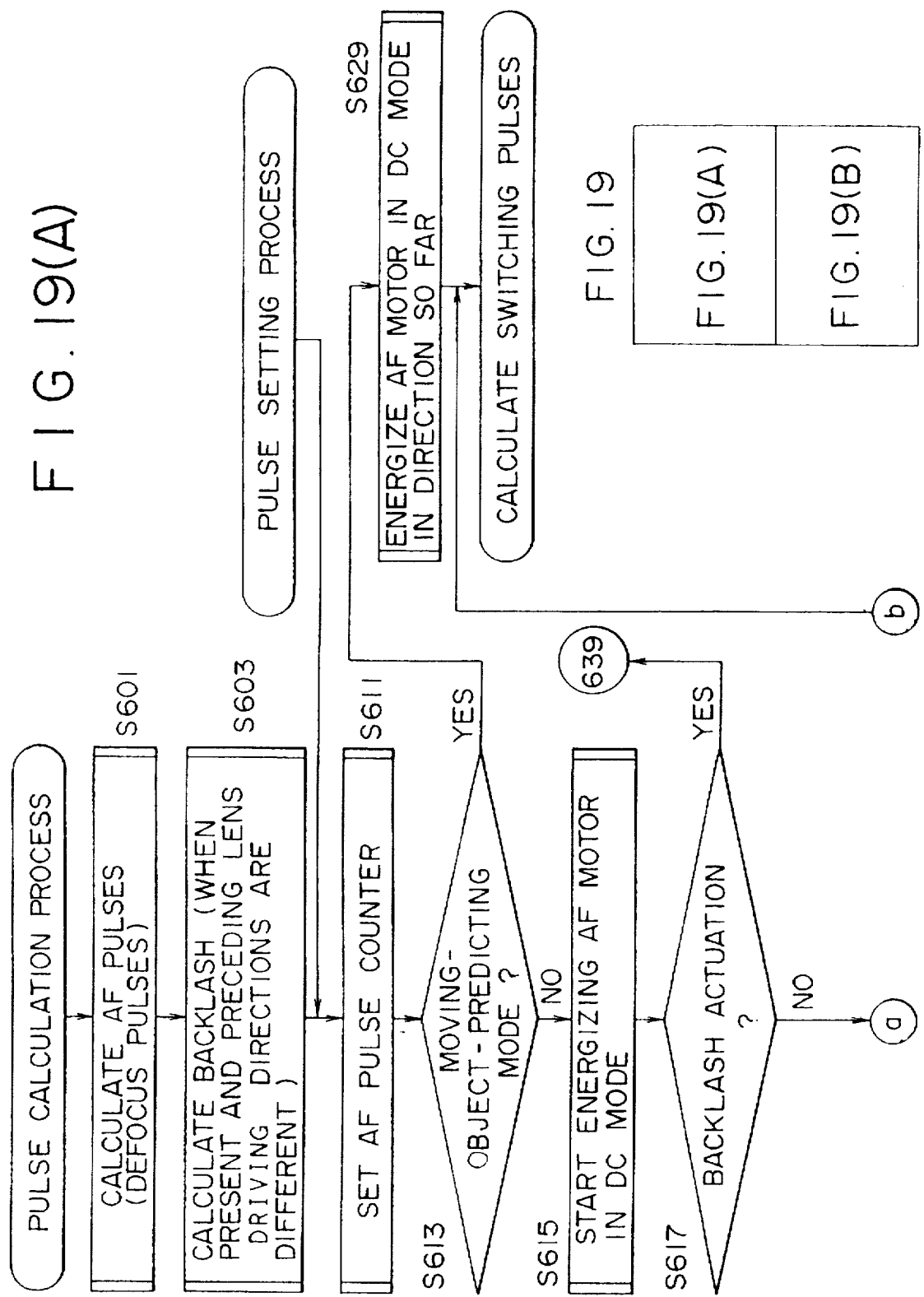

F I G. 20(B)
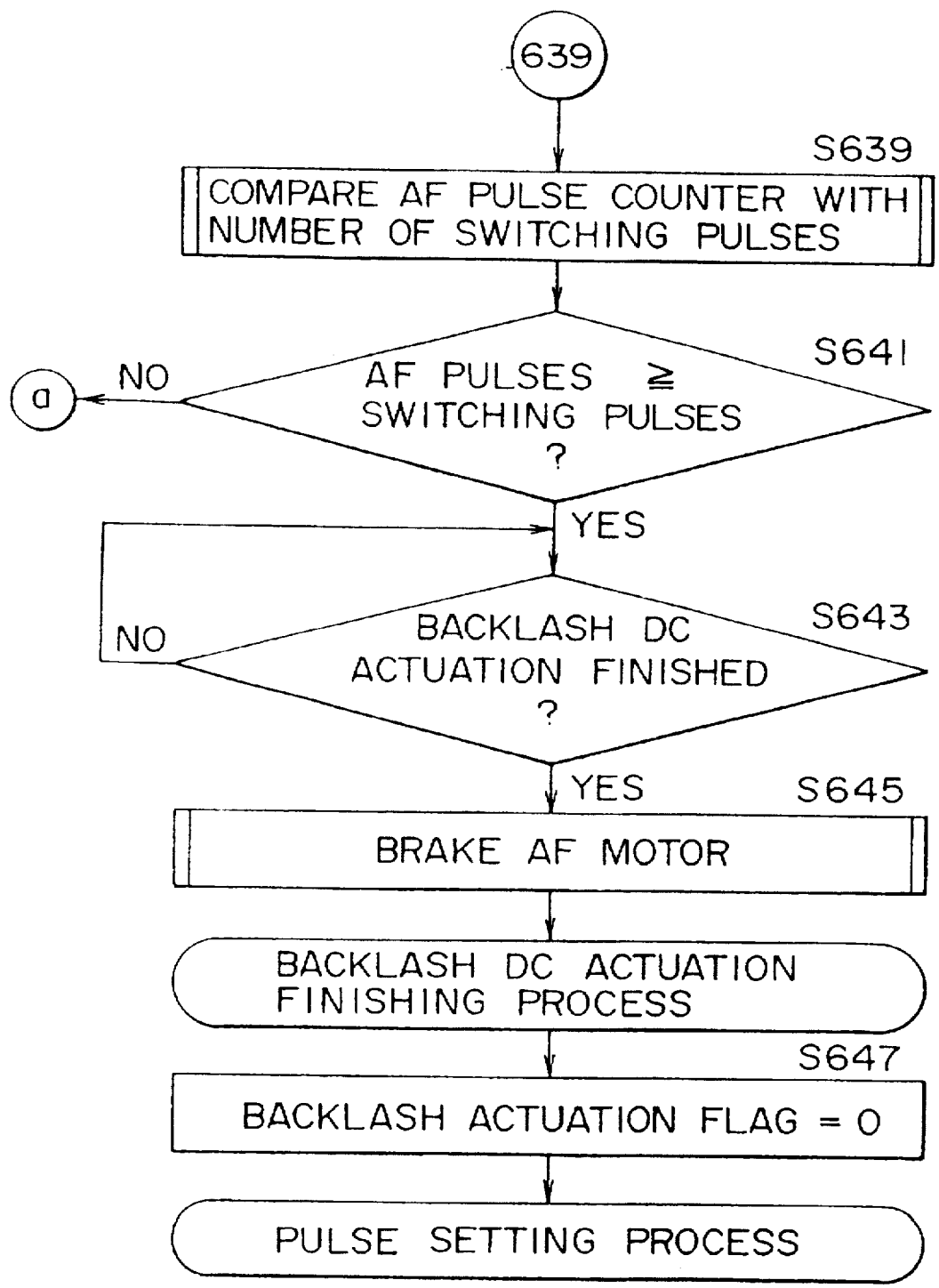

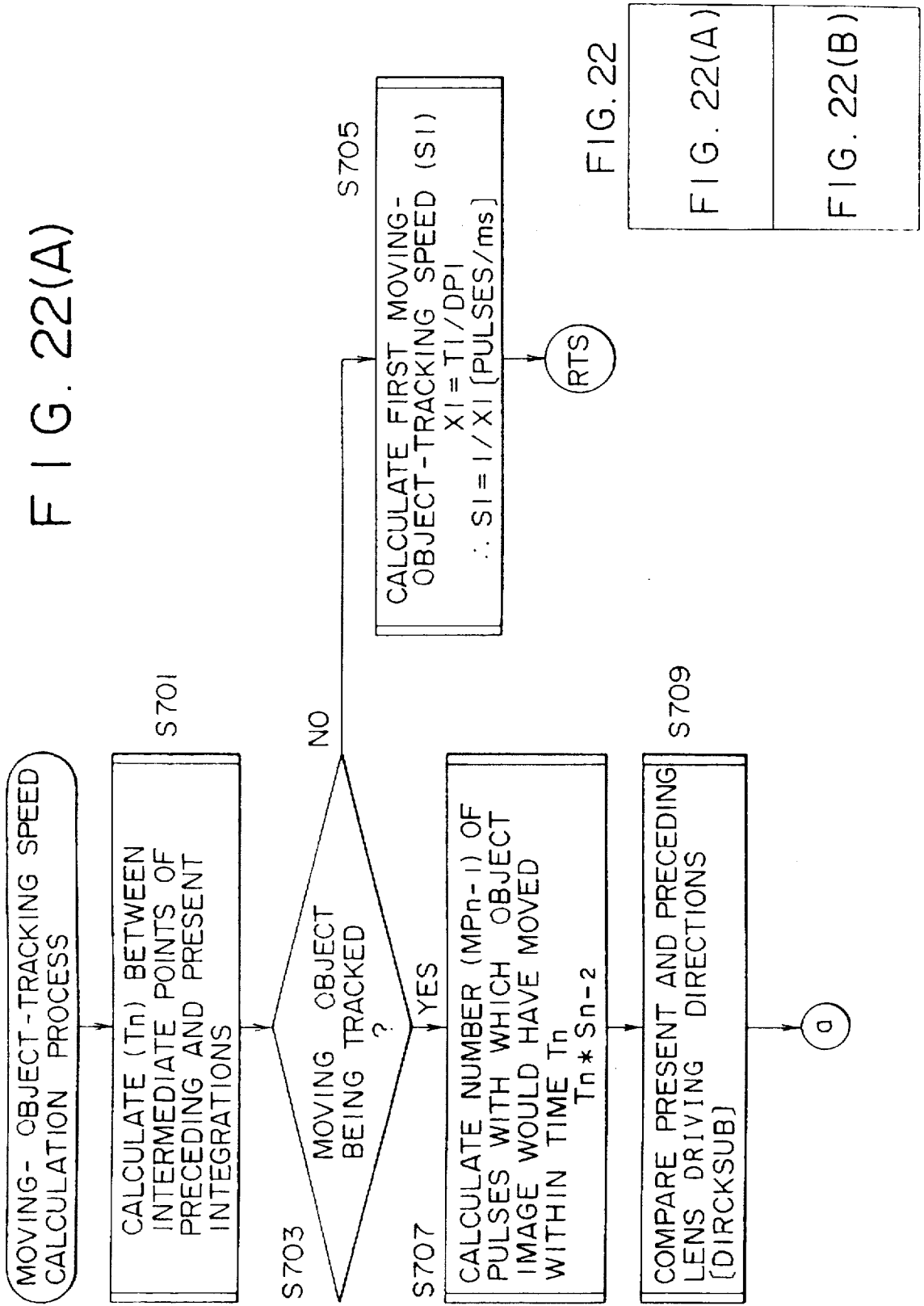

CONTROL SYSTEM FOR INHIBITING A CALCULATING SYSTEM IN AN AUTOMATIC FOCUSING DEVICE

This application is a continuation of application Ser. No. 08/351,485, filed Dec. 7, 1994, now abandoned, which is a continuation of application Ser. No. 08/119,844, filed Sep. 13, 1994, now abandoned.

BACKGROUND OF THE INVENTION

The present invention relates to an automatic focusing device employed in, for example, a photographic camera, and more particularly to an automatic focusing device for automatically focusing on an object even when the object is moving.

In the field of an automatic focusing system for use in a photographic camera, there has been known a focus prediction AF (automatic focusing) system for focusing on an object-in-motion. The focus prediction AF system is a system which predicts a position that the object-in-motion will reach in a predetermined period of time, and controls the focusing lens of a camera so as to obtain an in-focus object image.

Specifically, such an automatic focusing system detects the distance to the object, i.e., distance to a portion of the object which is located at a rangefinding zone (AF detecting zone of a viewfinder field), or a defocus amount, and adjusts the focusing lens so as to focus on the object based on the measured distance or detected defocus amount. Therefore, the automatic focusing system cannot keep the lens focused on the object unless it detects the object within the rangefinding zone (AF detecting zone).

However, it is difficult to keep an object-in-motion within the area of the viewfinder field corresponding to the rangefinding zone (AF detecting zone) at all times, and another object may possibly enter the rangefinding zone (AF detecting zone). If an object-in-motion temporarily slips out of the rangefinding zone (AF detecting zone), the automatic focusing system is unable to remain focused on the object-in-motion anymore, and tends to focus on another object which is presently located in the rangefinding zone (AF detecting zone). Once another object is focused, the automatic focusing system may not re-focus on the object-in-motion immediately when the object-in-motion returns to the rangefinding zone (AF detecting zone). It would take a considerable period of time for the AF system to refocus on the object-in-motion. Thus, when successive exposures are being made, considerable number of pictures would be taken in an out-of-focus condition.

SUMMARY OF THE INVENTION

It is therefore an object of the present invention to provide an automatic focusing device which is capable of tracking an object-in-motion even if the object-in-motion temporarily moves out of a rangefinding zone.

For the above object, according to an aspect of the present invention, there is provided an automatic focusing device including:

an optical system having a focusing lens group;

a defocus measuring means for obtaining a defocus amount data of an object image with respect to a film plane;

a lens driving means for driving the focusing lens group along the optical axis of the optical system;

a calculating means for calculating a relative speed of movement, along the optical axis, of the object image with respect to the film plane based on at least two defocus amount data obtained by the rangefinding means; and a control means for controlling the lens driving means to drive the focusing lens group to a position where an in-focus condition is obtainable with respect to the object.

The control means controls the drive means to drive the focus lens group in accordance with a currently calculated relative speed of the object image if current defocus amount data satisfies a predetermined condition, while the controlling means controls the lens driving means to drive the focusing lens group in accordance with the previously calculated relative speed of the object image, if the current defocus amount data does not satisfy the predetermined condition.

According to another aspect of the invention, there is provided an automatic focusing device including:

an optical system including a focusing lens group;

a defocus measuring means for obtaining a defocus amount data of an object image with respect to a film plane;

a lens driving means for driving the focusing lens group along the optical axis of the optical system;

a successive exposure means for effecting successive exposures;

a calculating means for calculating a relative speed of movement, along the optical axis, of the object with respect to the film plane based on at least two defocus amount data obtained by the rangefinding means; and a controlling means for controlling the lens driving means to drive the focusing lens group so that an infocus condition is obtainable with respect to the object. The controls means controlling the drive means to drive the focusing lens in accordance with a currently calculated relative speed of the object image if current defocus amount data satisfies a predetermined condition.

The controlling means controls the lens driving means to drive the focusing lens group in accordance with a previously calculated relative speed of the object image if the successive exposure means is effected, and the present defocus amount data does not satisfy the predetermined condition.

In the above device, the predetermined condition includes a condition where the present defocus amount data corresponds to an amount which is less than a predetermined amount. Thus, if the object temporarily moves out of the distance measuring zone, tracking operation can be continued.

Further, if the defocus amount data cannot be obtained because of low contrast, the device keeps tracking the object with use of the previously obtained data.

Optionally, after a predetermined number of shootings have been made, even if the defocus amount exceeds a predetermined amount, the controlling means controls the driving means to drive the focusing lens group in accordance with a currently calculated relative speed of the object image.

According to further aspect of the invention, there is provided an automatic focusing device including:

an optical system including a focusing lens group;

a defocus measuring means for obtaining a defocus amount data of an object image with respect to a film plane;

a lens driving means for driving the focusing lens group along the optical axis of the optical system;

a successive exposure means for effecting successive exposures; and a controlling means capable of controlling the lens driving means, based on the defocus amount data, to drive the focusing lens group so that an in-focus condition is obtainable with respect to an object-in-motion.

If currently obtained defocus amount data does not satisfy a predetermined condition, the controlling means controls the driving means to drive the focusing lens group without using the currently obtained defocus amount data.

According to still further aspect of the invention, there is provided an automatic focusing device including:

an optical system including a focusing lens group;

a defocus measuring means for obtaining a defocus amount data of an object image with respect to a film plane;

a driving means for driving the focusing lens group along the optical axis of the optical system;

a successive exposure means for effecting successive exposures;

a calculating means for calculating a relative speed of movement, along the optical axis, of the object with respect to the film plane based on at least two defocus amount data obtained by the rangefinding means; and a controlling means for controlling the driving means to drive the focusing lens group so that an infocus condition is obtainable with respect to the object. The controlling means controls the drive means to drive the focusing lens in accordance with a currently calculated relative speed of the object image if current defocus amount data satisfies a predetermined condition.

If the successive exposure means is effected and the current defocus amount data does not satisfy the predetermined condition, the controlling means controls the driving means to drive the focusing lens group as if the relative speed of the object is unchanged.

DESCRIPTION OF THE ACCOMPANYING DRAWINGS

Figure 10:
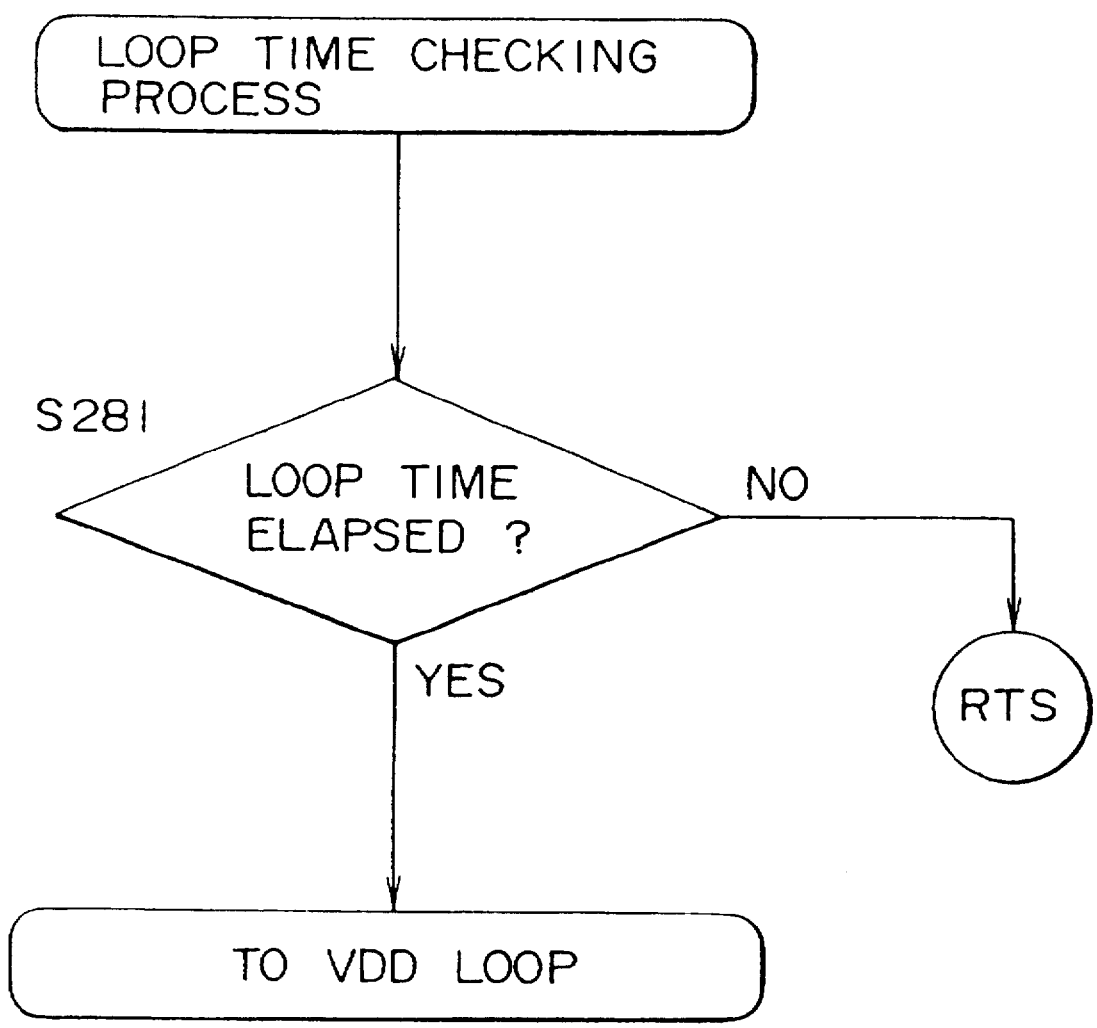
Figure 11:
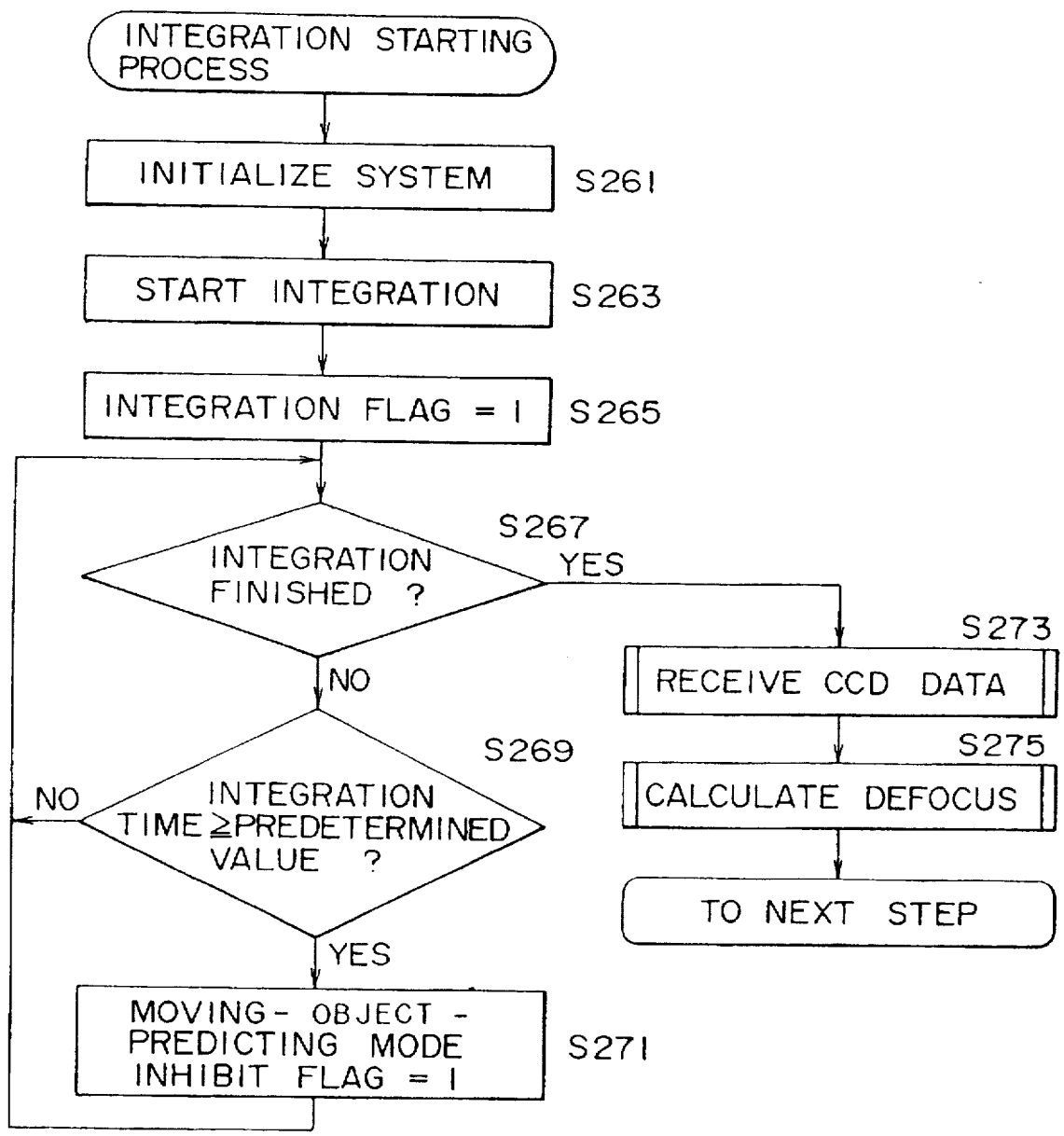
Figure 14:
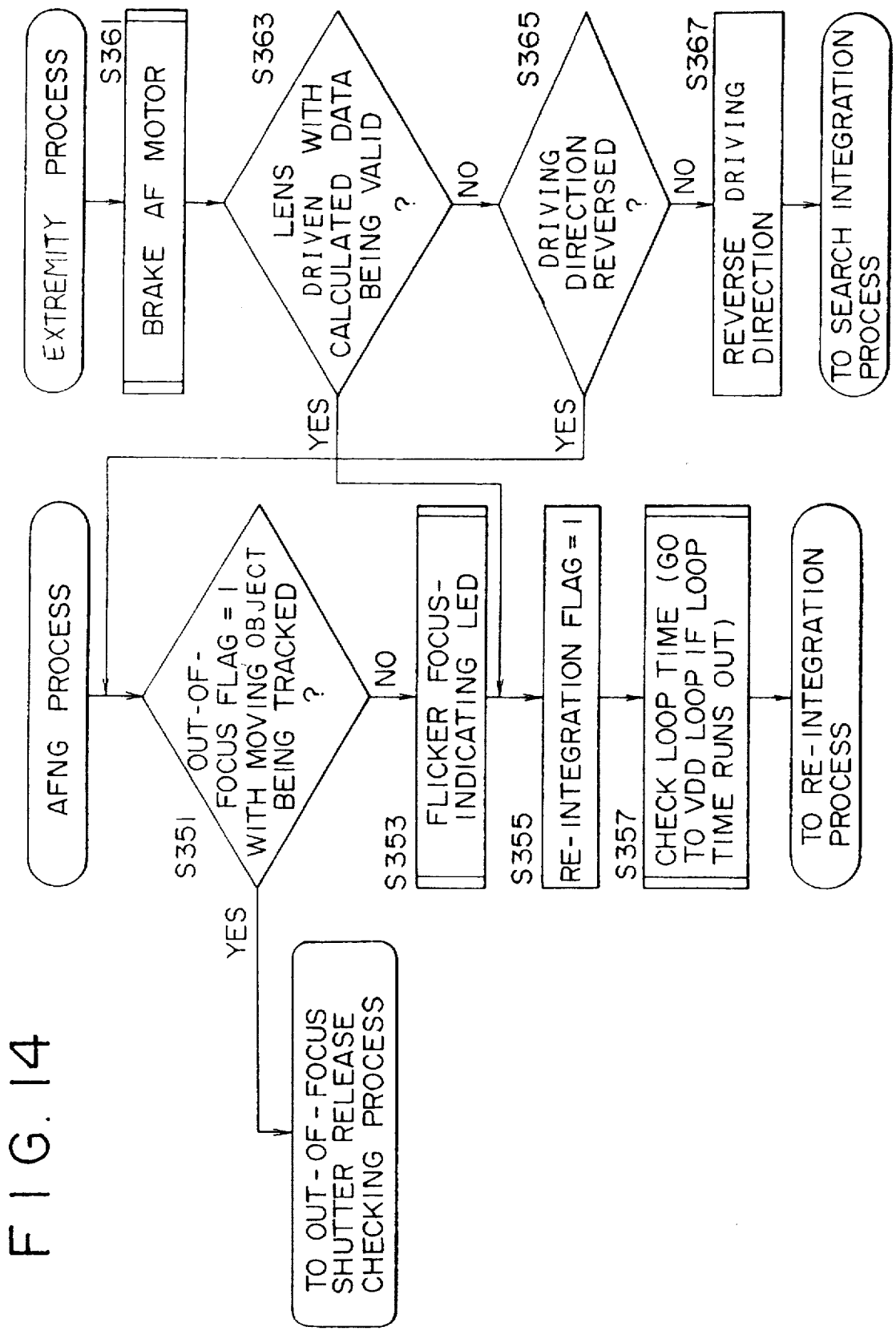
Figure 15A:
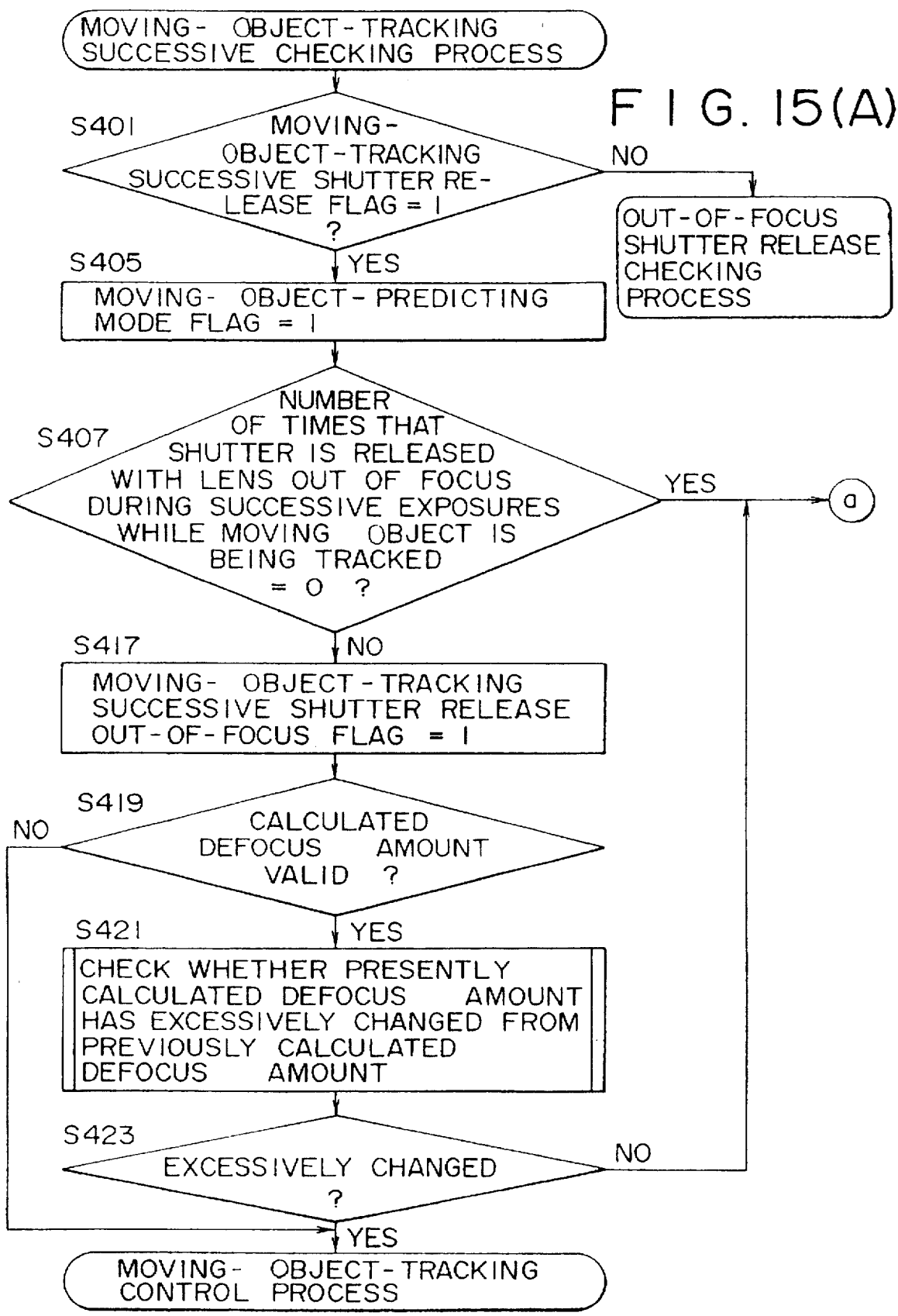
Figure 15B:
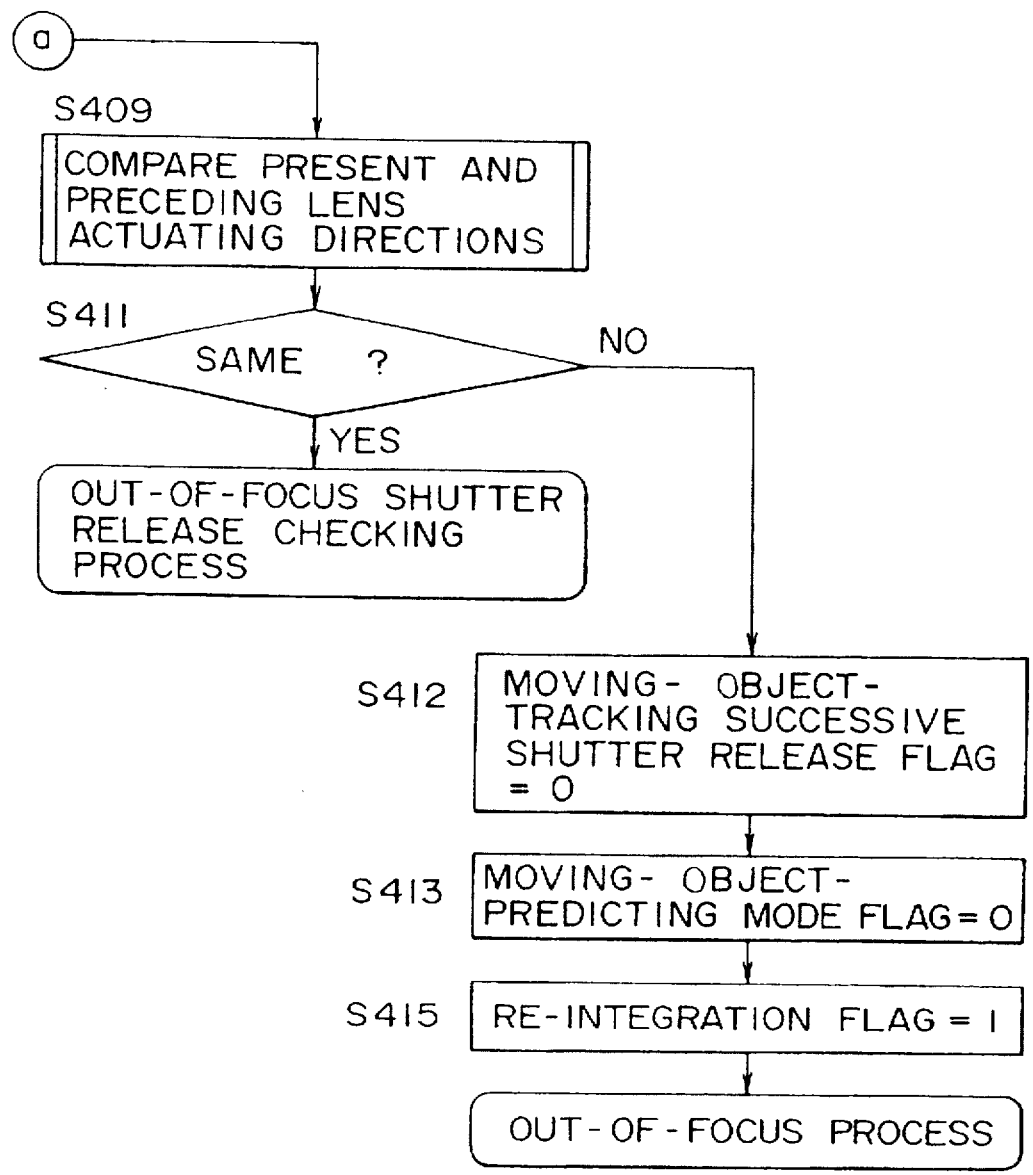
Figure 15:
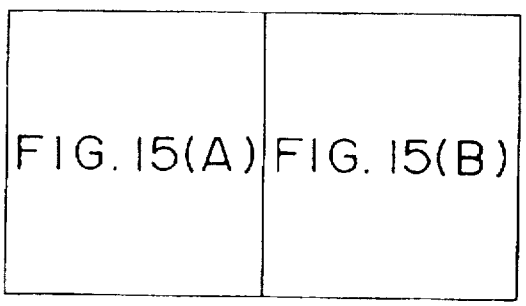
Figure 16A:
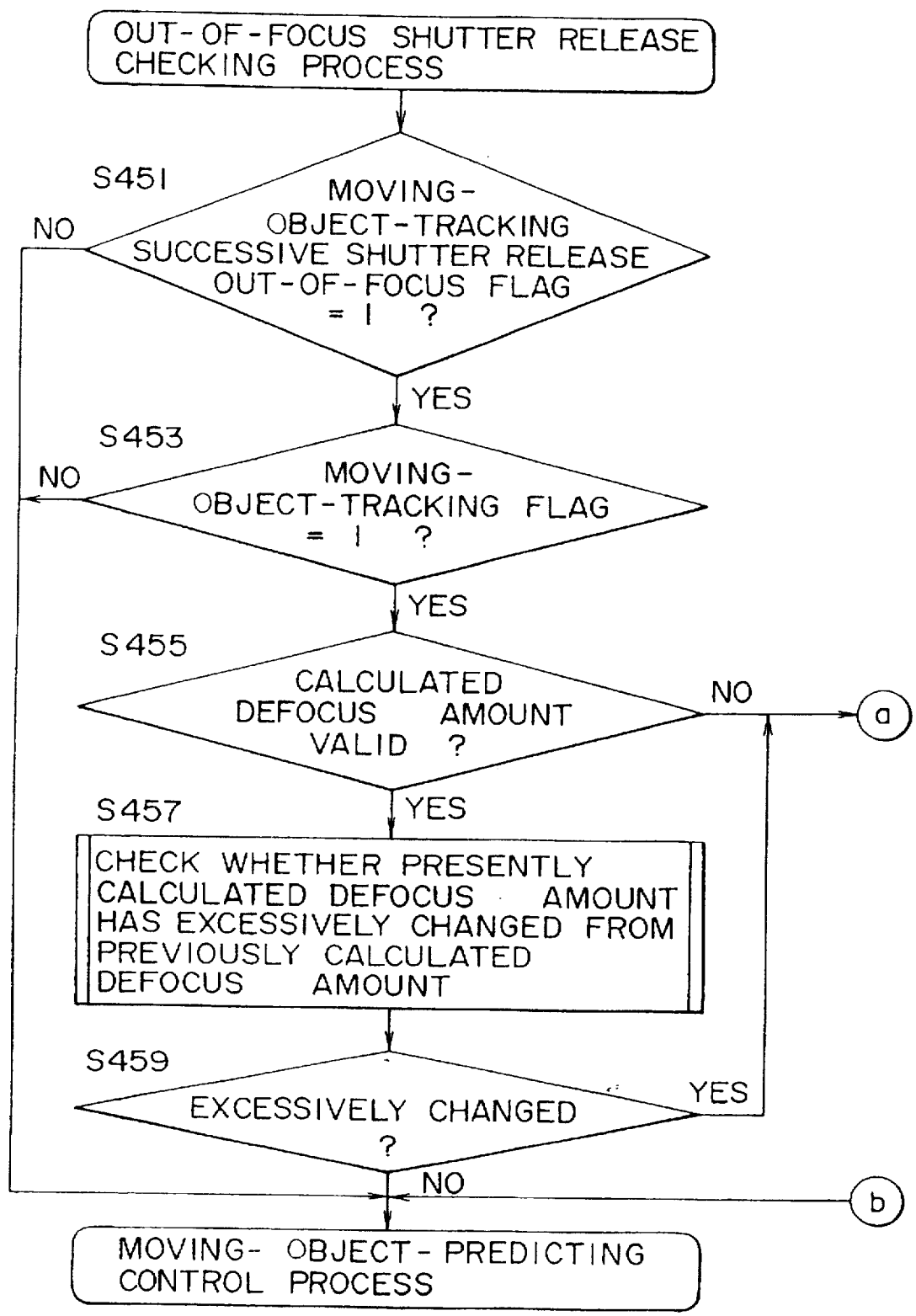
Figure 16B:
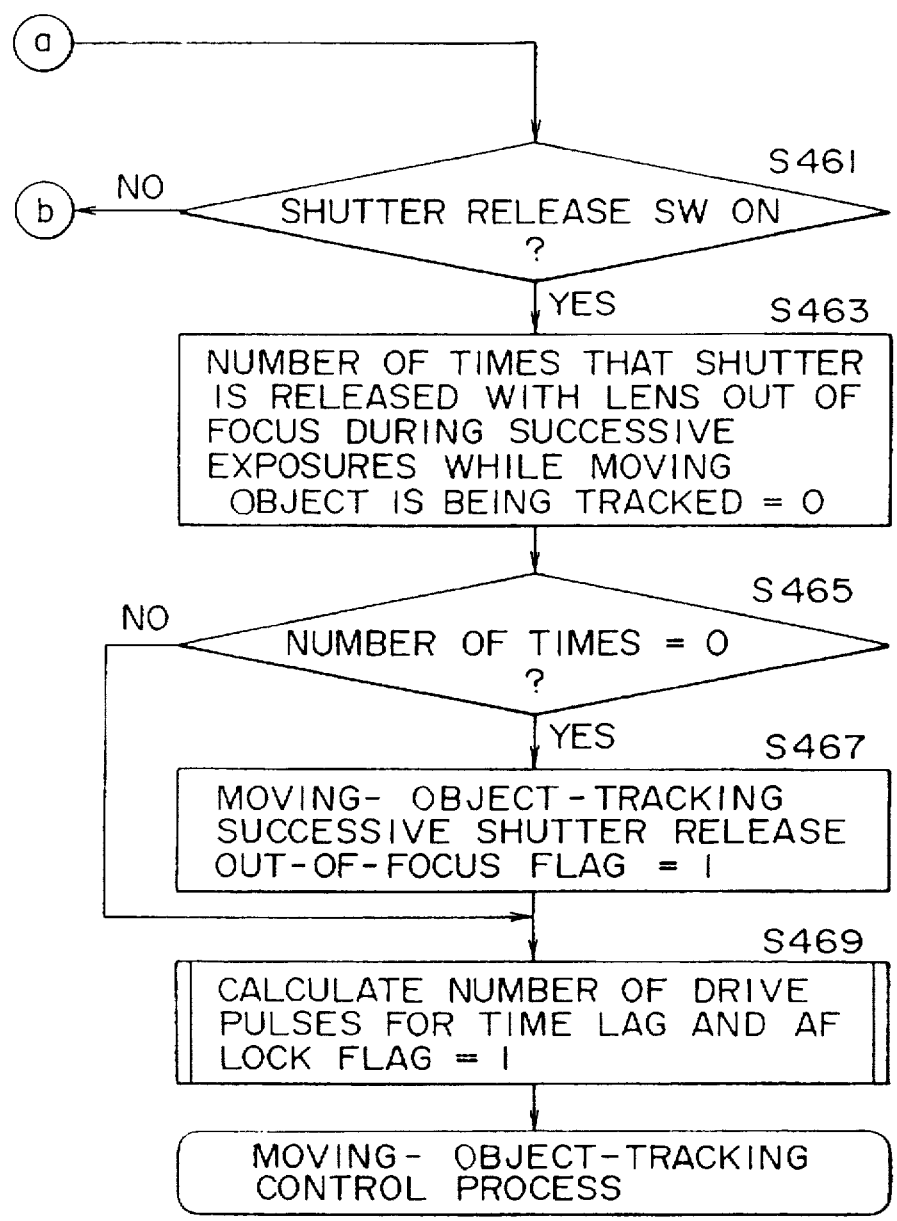
Figure 16:
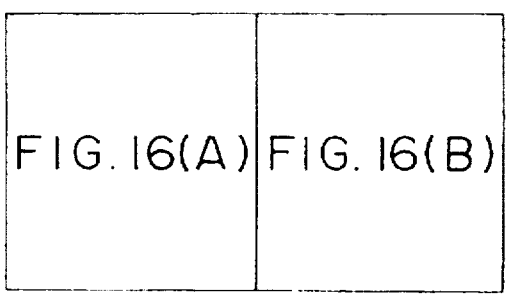
Figure 17:
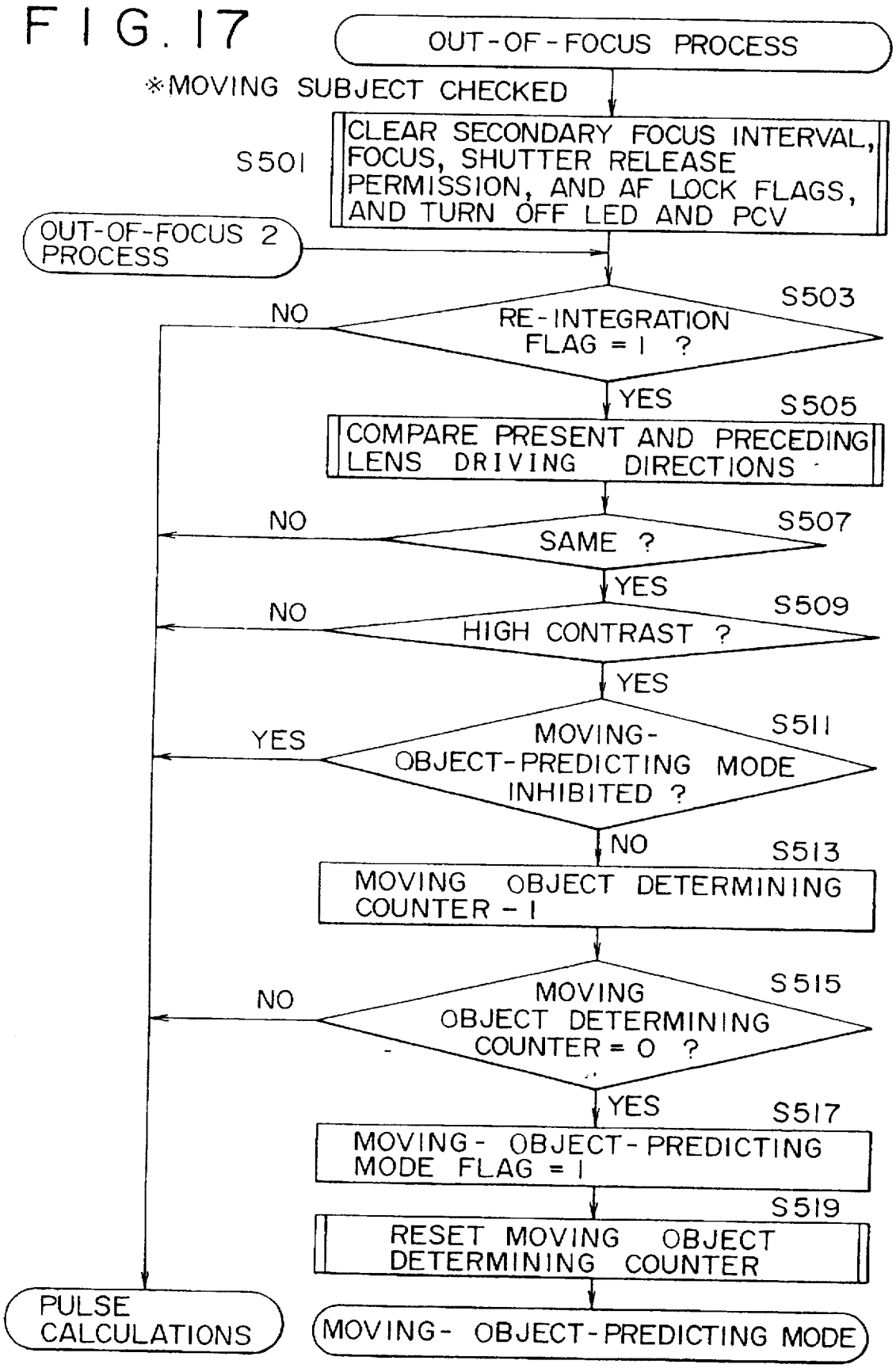
Figure 19B:
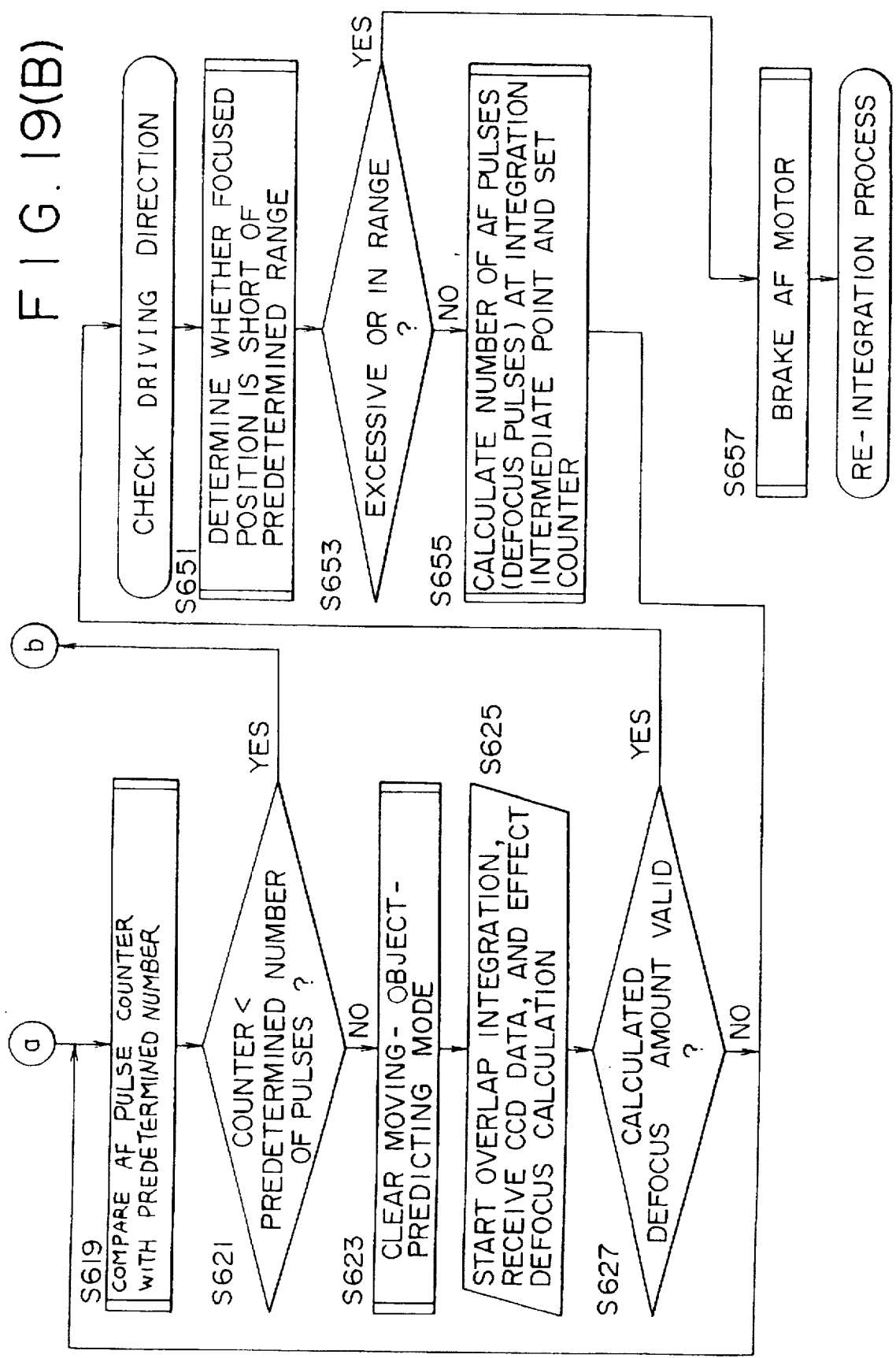
Figure 21:
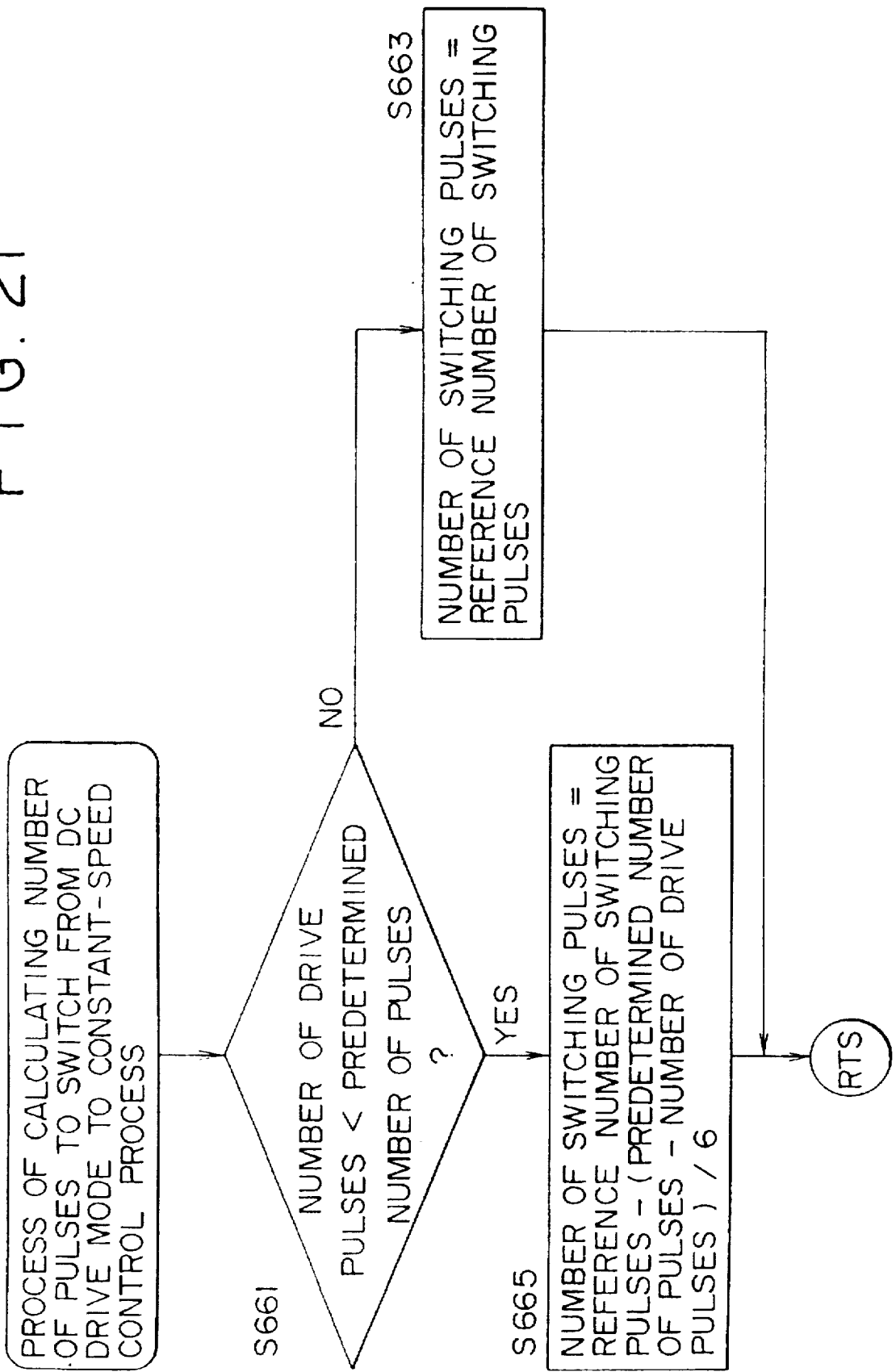
Figure 22B:
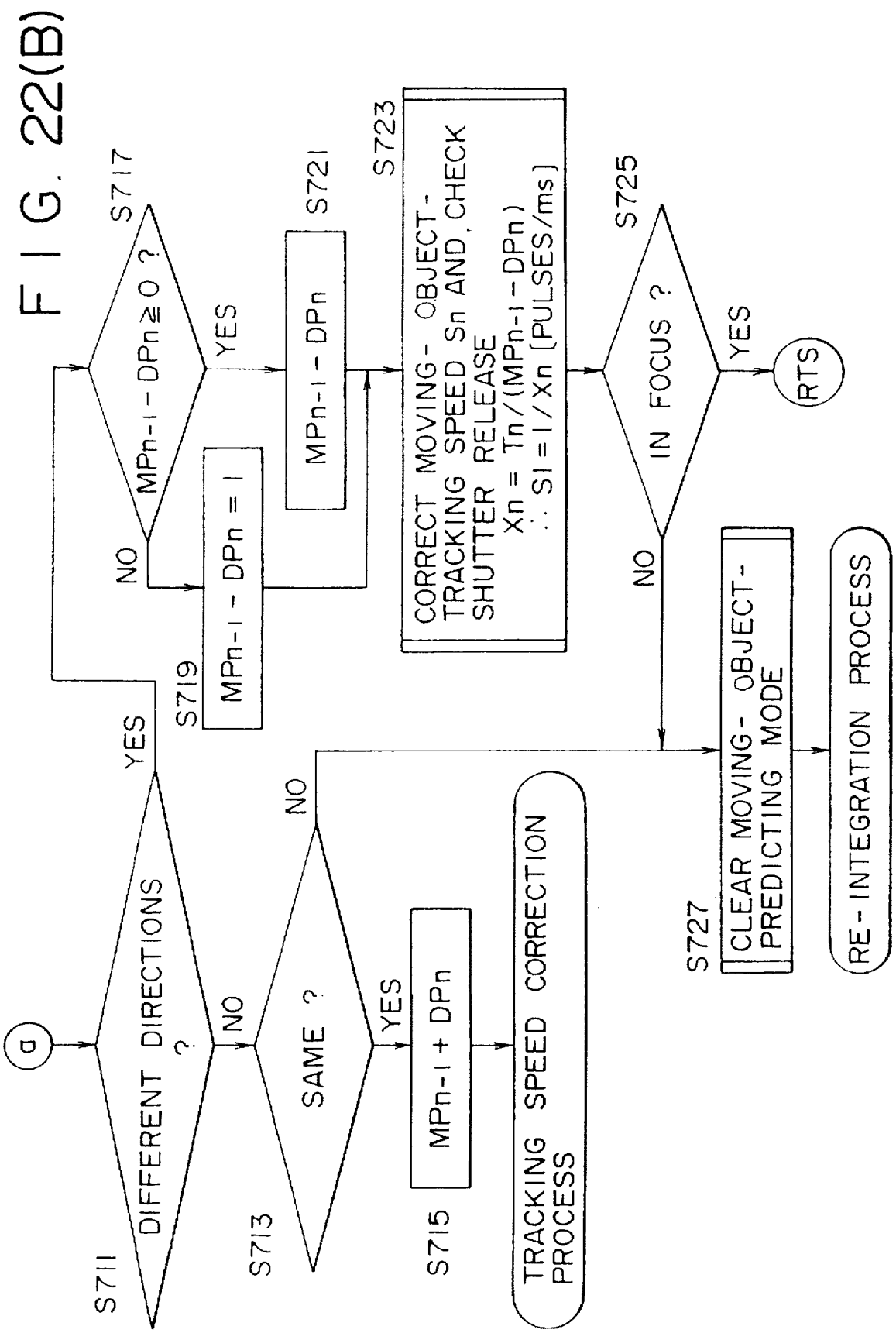
Figure 24:
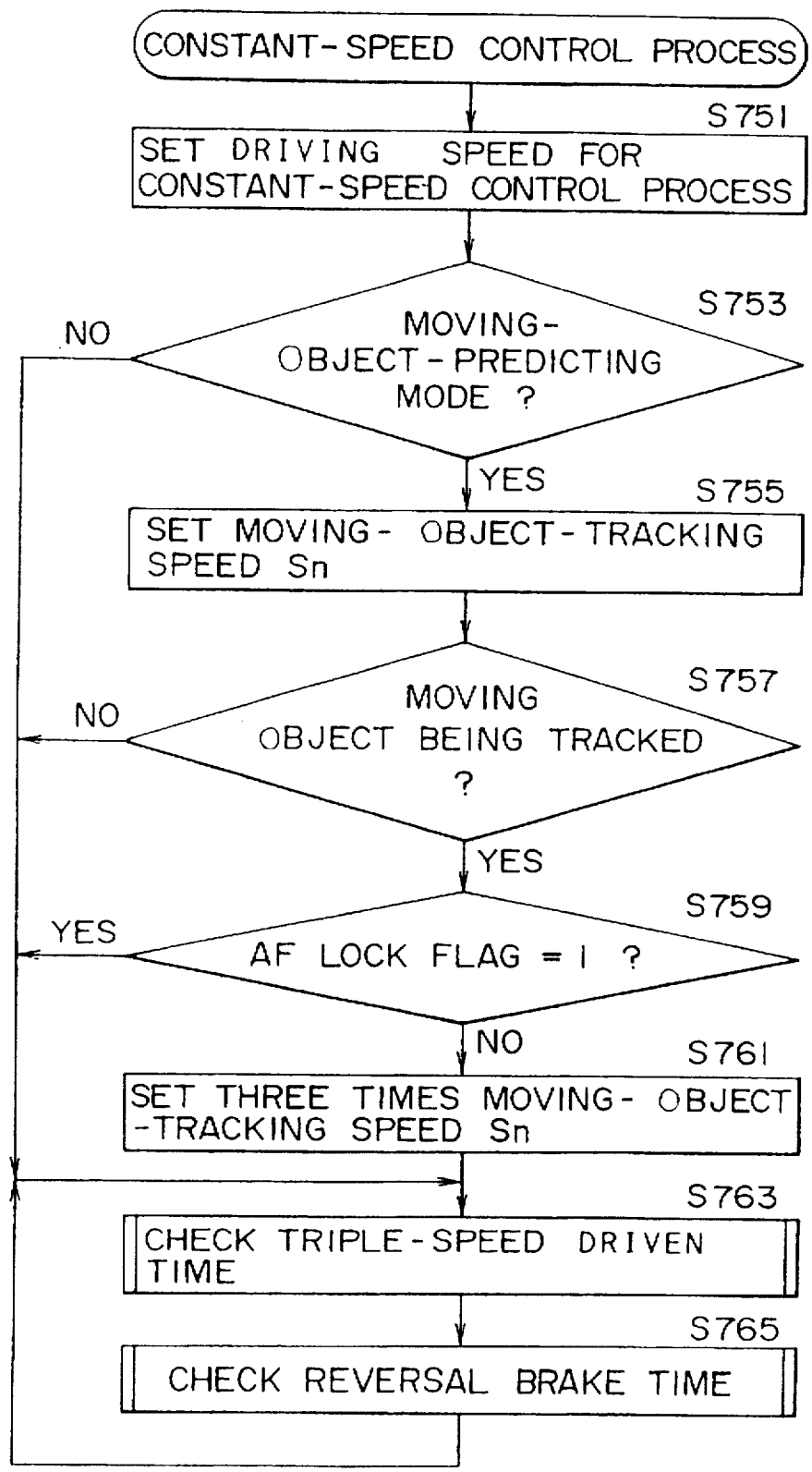
Figure 25:
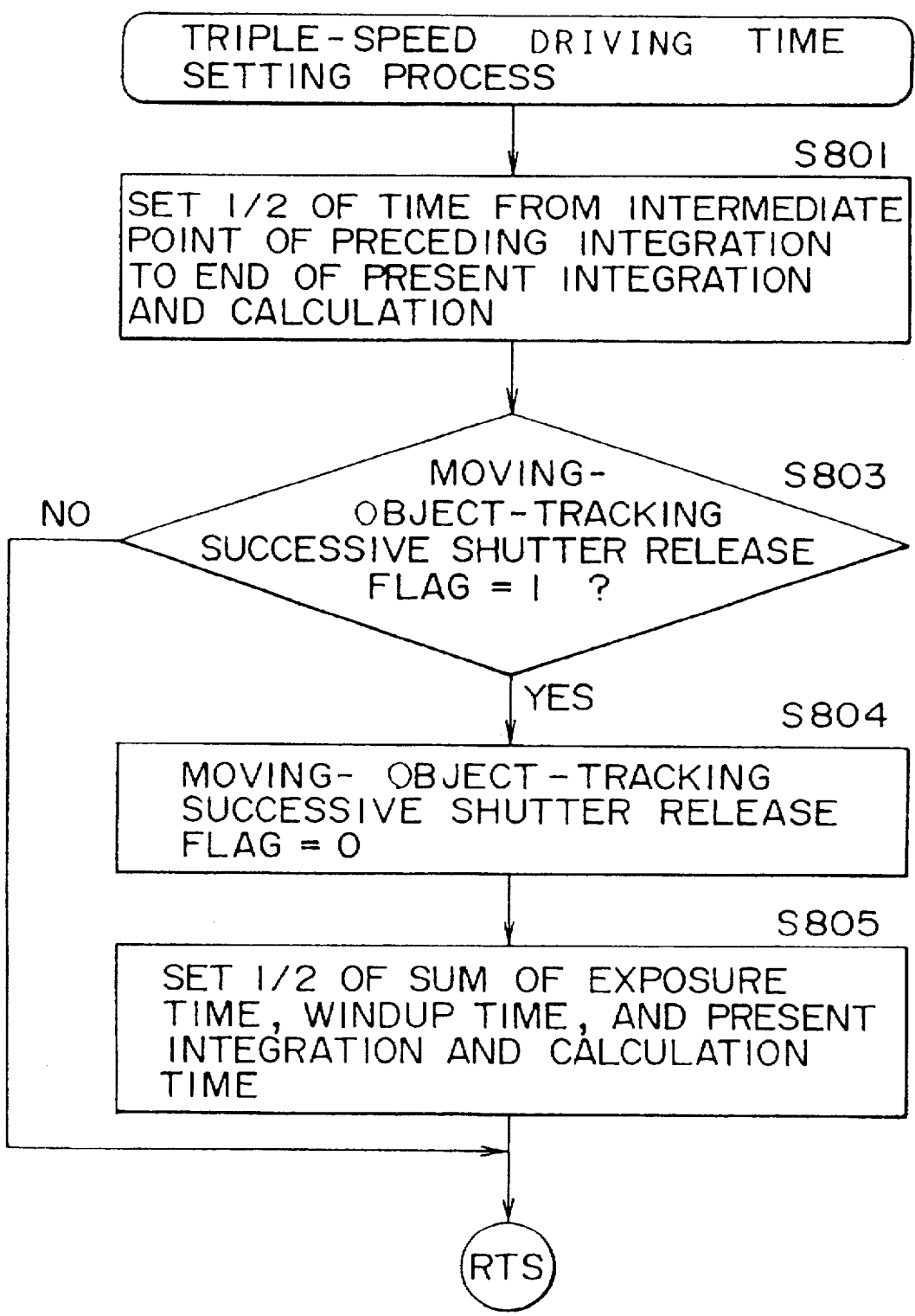
Figure 26:
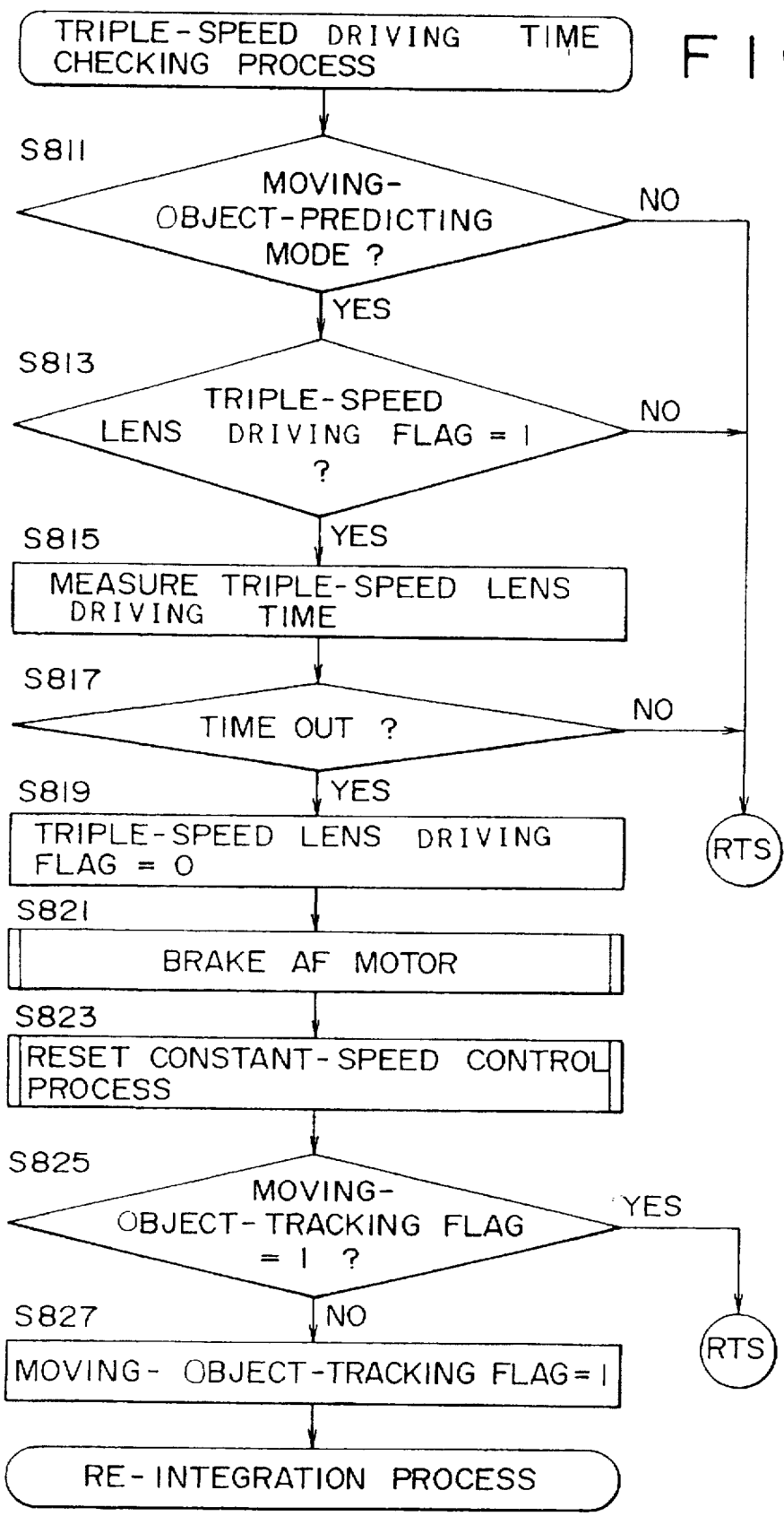
Figure 27:
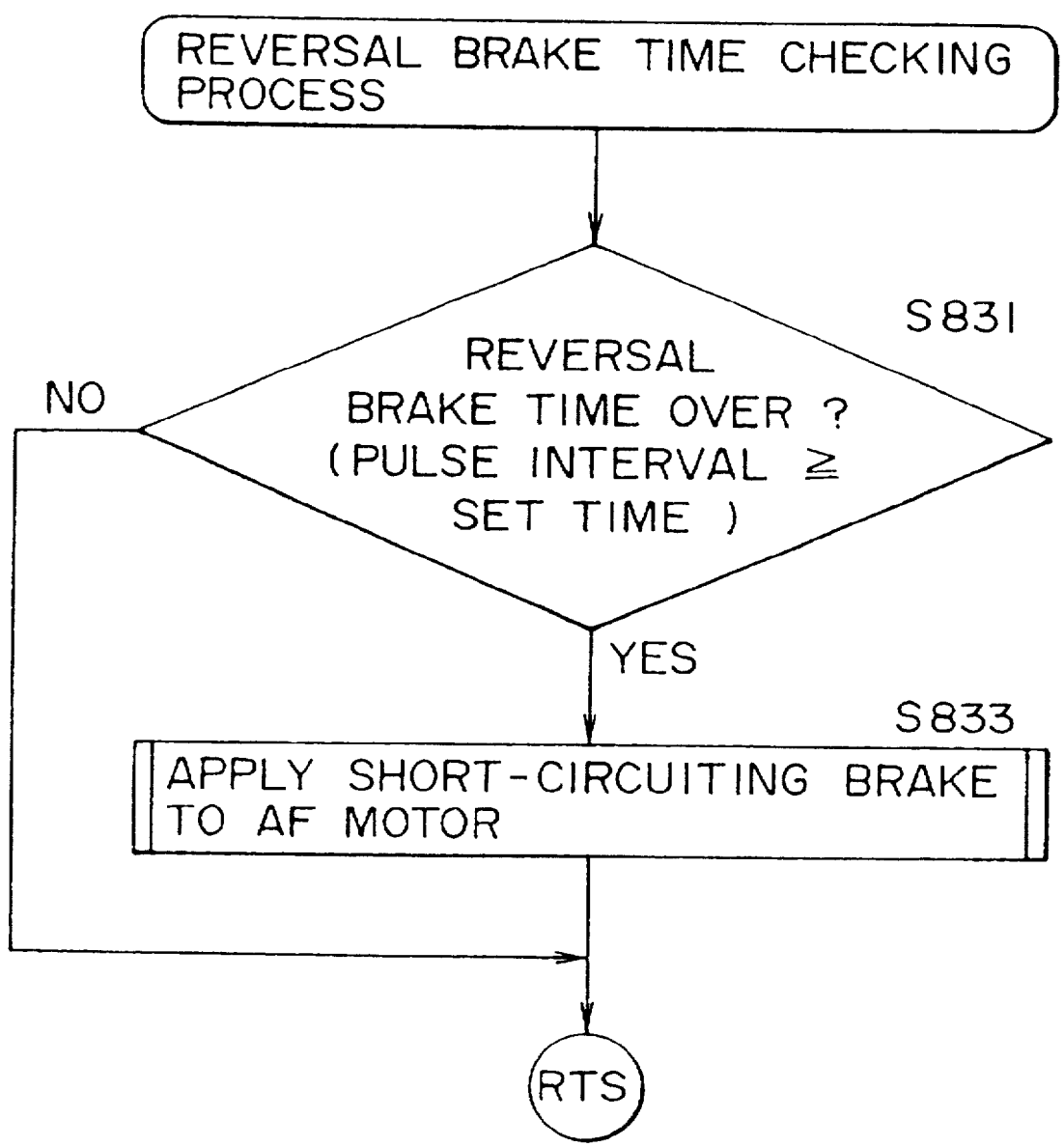
Figure 28:
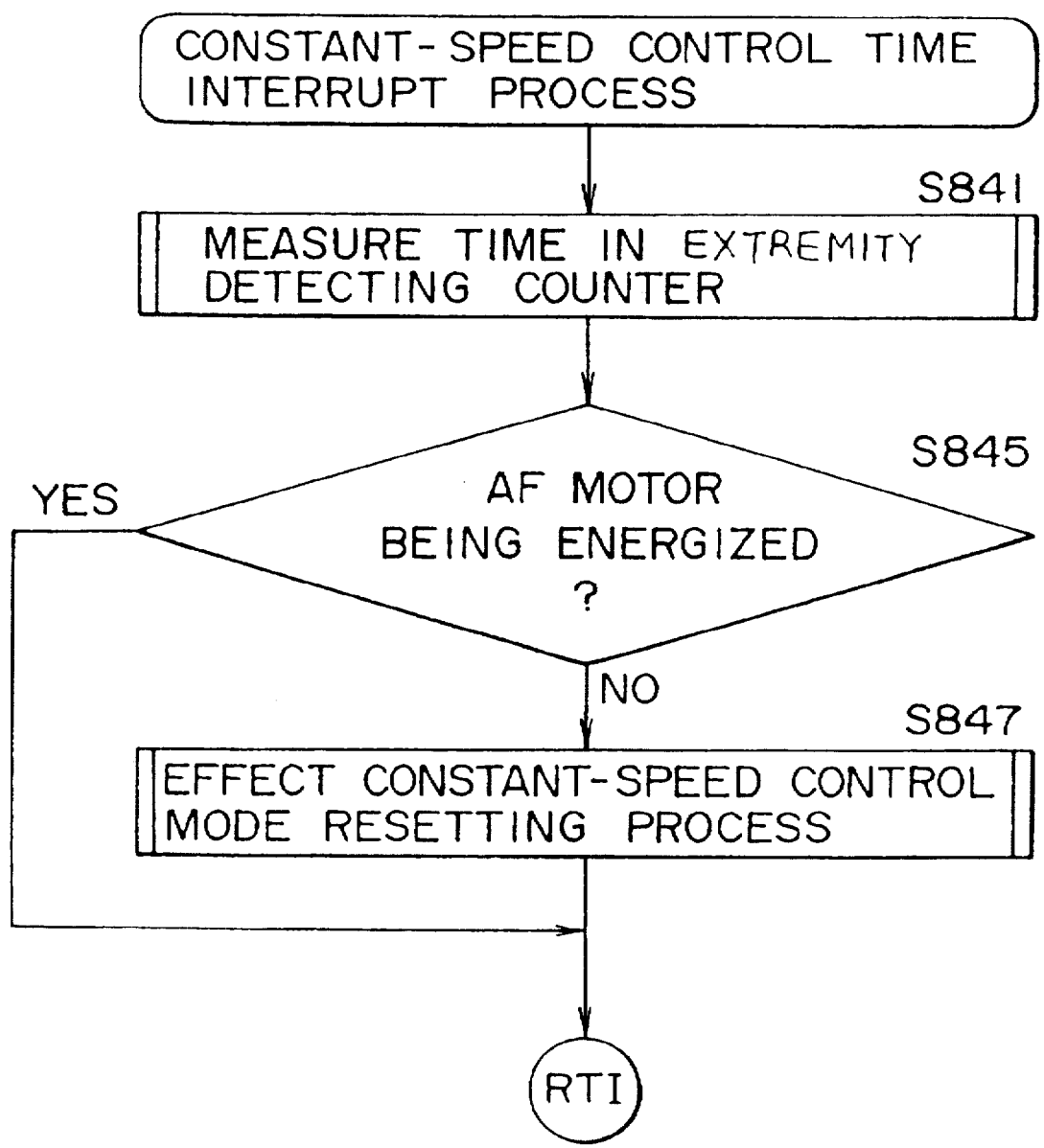
Figure 29:
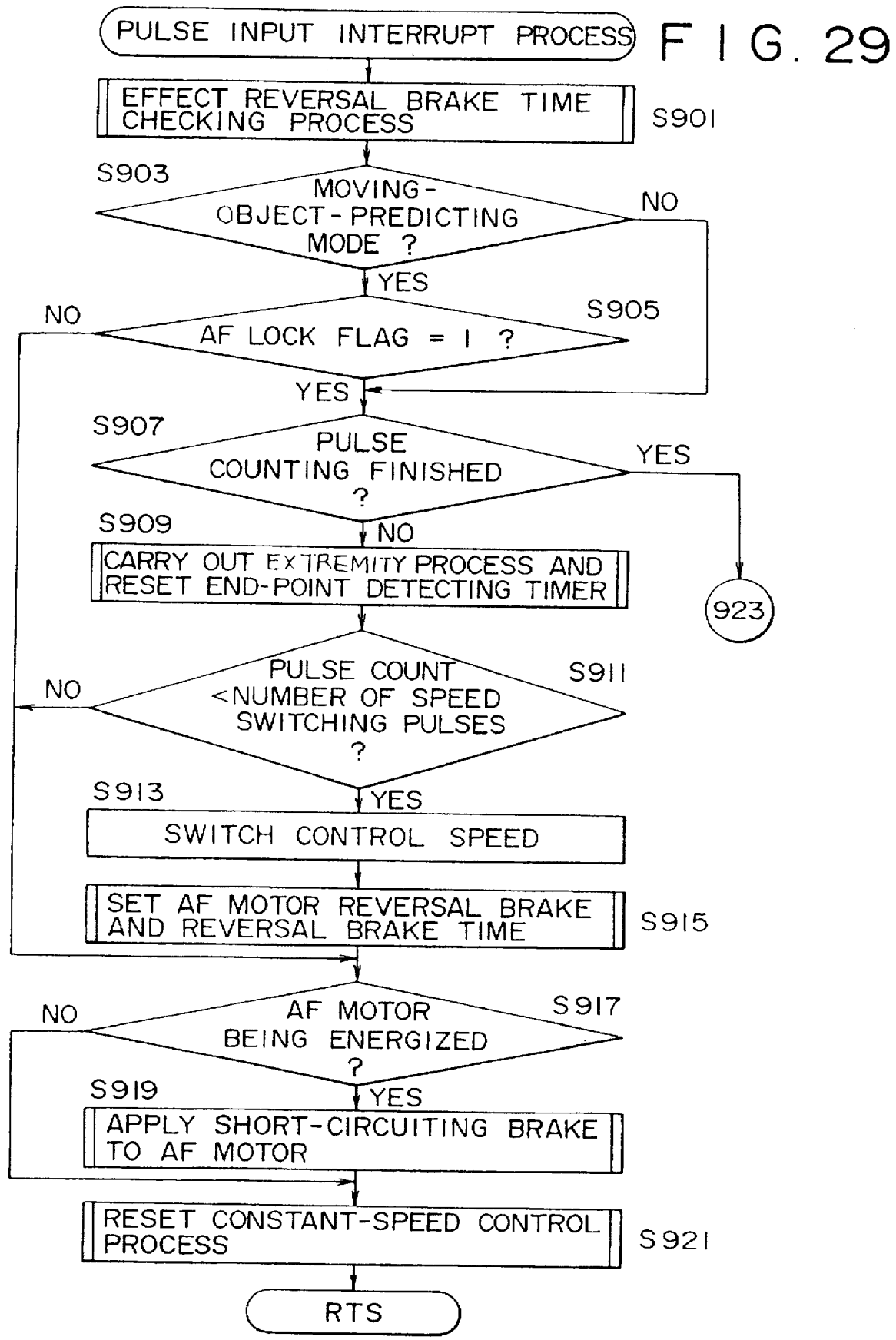
Figure 30:
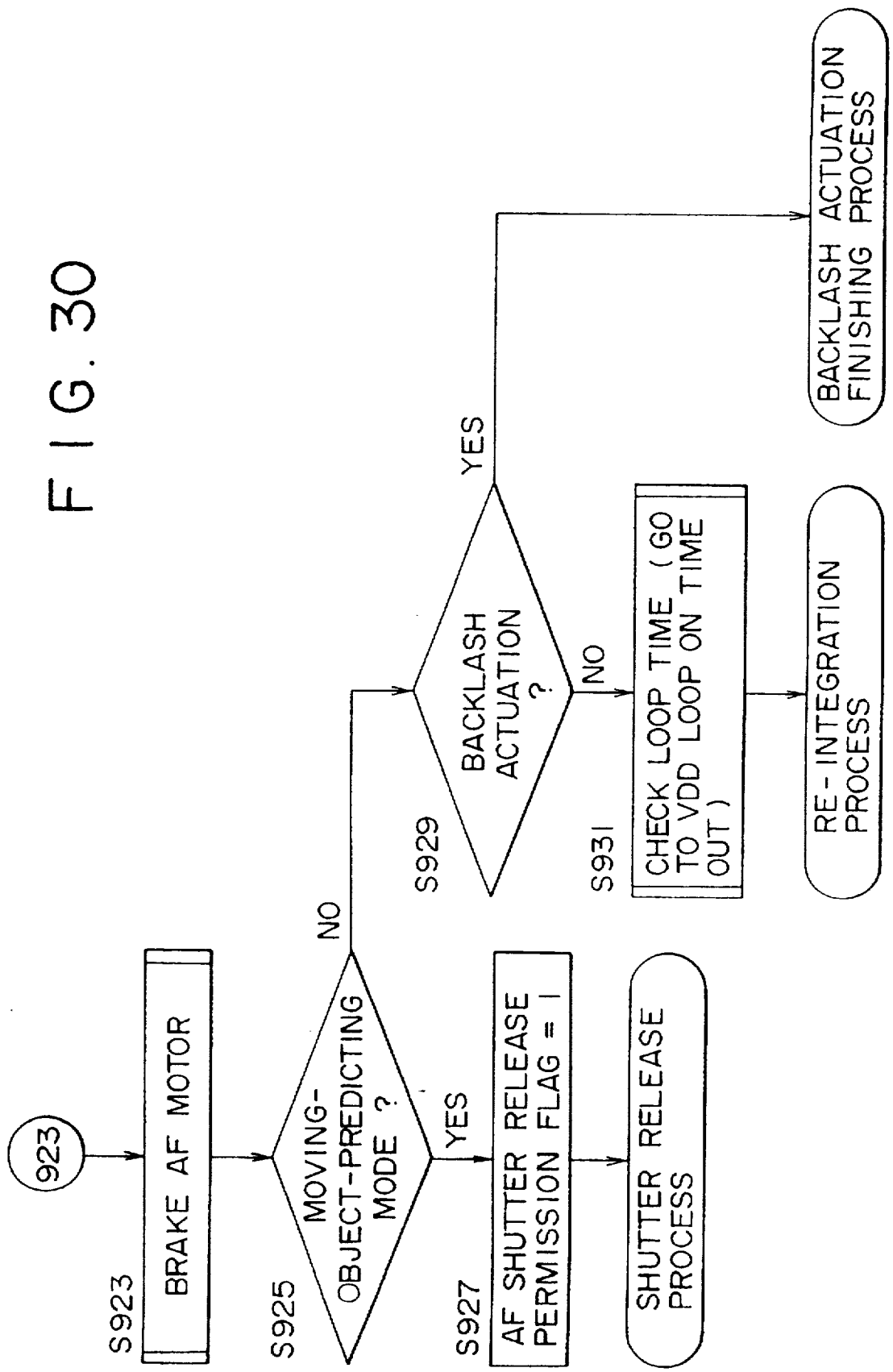
Figure 31:
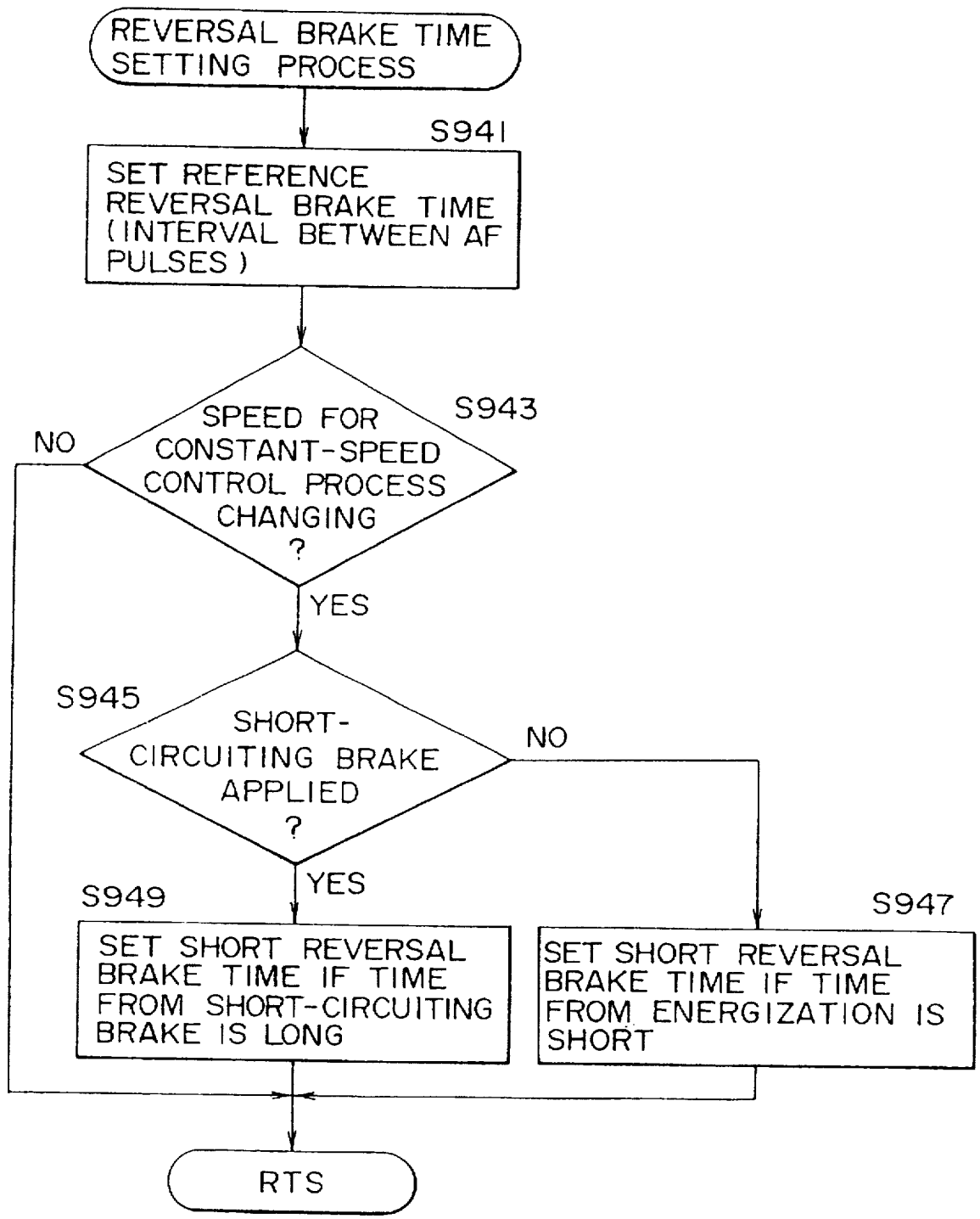

FIGS. 8, 9, 9(A), and 9(B) show a flowchart of an automatic focusing process of the automatic focusing device;

FIG. 10 is a flowchart of a loop time checking process of the automatic focusing device;

FIG. 11 is a flowchart of an integration starting process of the automatic focusing device;

FIGS. 12, 12(A), 12(B), and 13 show a flowchart of a re-integration process, a focus checking process, and an AF locking process of the automatic focusing device;

FIG. 14 is a flowchart of an AFNG process and an end point process of the automatic focusing device;

FIGS. 15, 15(A) and 15(B) show a flowchart of a moving-object-tracking successive checking process of the automatic focusing device;

FIGS. 16, 16(A) and 16(B) show a flowchart of an out-of-focus shutter release checking process of the automatic focusing device;

FIG. 17 is a flowchart of an out-of-focus process of the automatic focusing device;

FIG. 18 is a flowchart of a focus prediction AF mode and a moving-object-tracking control process of the automatic focusing device;

FIGS. 19(A), 19(B), 20, 20(A) and 20(B) are a flowchart of a pulse calculation process and a pulse setting process of the automatic focus controlling system;

FIG. 21 is a flowchart of a process of calculating the number of switching pulses to switch from a DC drive mode to a constant-speed control process in the automatic focusing device;

FIGS. 22, 22(A), 22(B), 23, 23(A) and 23(B) show a flowchart of a moving-object-tracking speed calculation process of the automatic focusing device;

FIG. 24 is a flowchart of a constant-speed control process of the automatic focusing device;

FIG. 25 is a flowchart of a triple-speed driving time setting process of the automatic focusing device;

FIG. 26 is a flowchart of a triple-speed driving time checking process of the automatic focusing device;

FIG. 27 is a flowchart of a reversal brake time checking process of the automatic focusing device;

FIG. 28 is a flowchart of a constant-speed control time interrupt process of the automatic focusing device;

FIGS. 29 and 30 are a flowchart of a pulse input interrupt process of the automatic focusing device; and FIG. 31 is a flowchart of a reversal brake time setting process of the automatic focusing device.

DESCRIPTION OF THE EMBODIMENT

Figure 1:
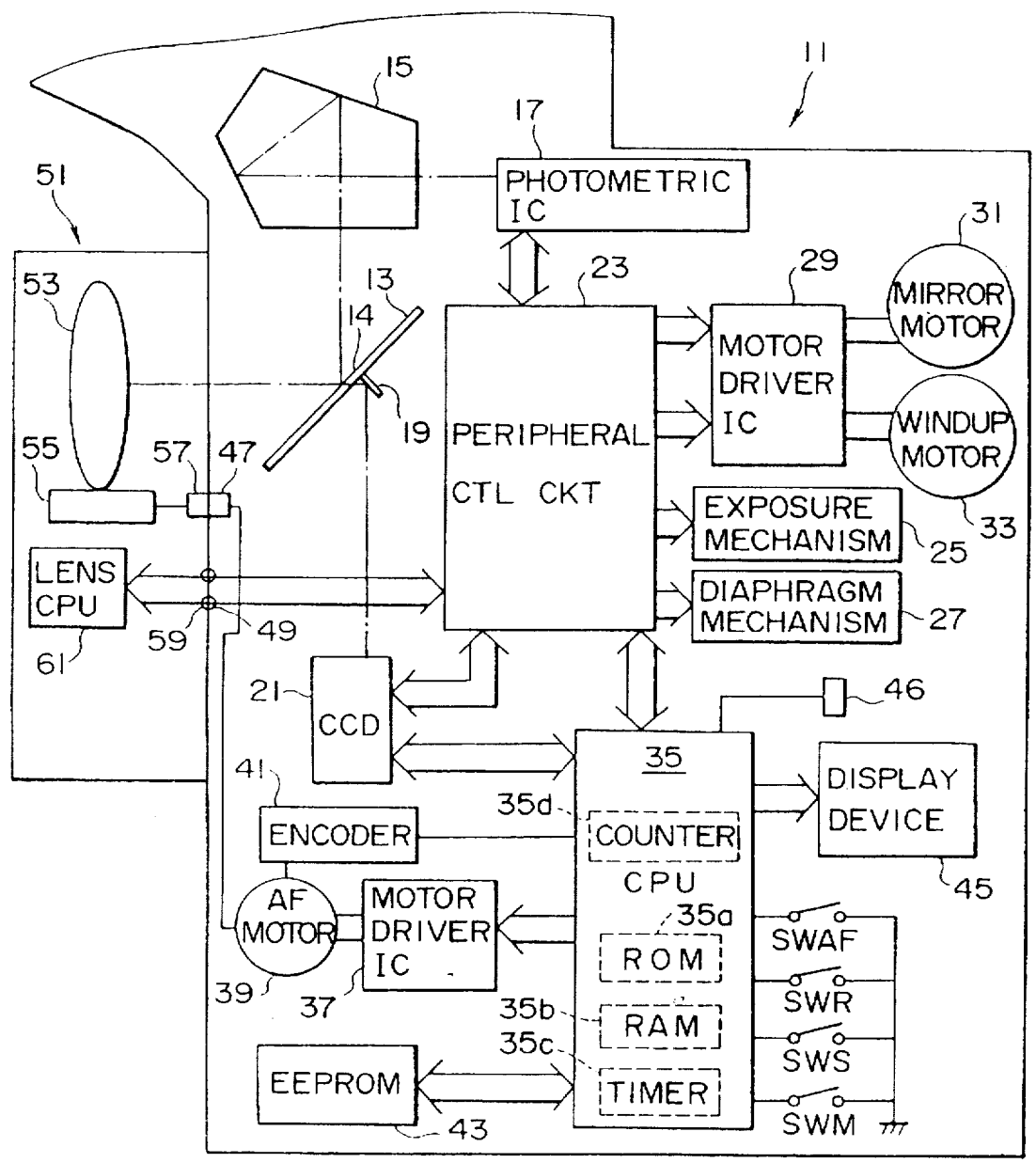
FIG. 1 is a block diagram of a single-lens reflex camera which incorporates an automatic focusing device according to the present invention.

FIG. 1 is a block diagram of a single-lens reflex camera which incorporates an automatic focusing device according to the present invention.

As shown in FIG. 1, an automatic focusing device according to the present invention is incorporated in a single-lens reflex camera having a camera body 11 and a lens mechanism 51 detachably mounted on the camera body 11. A ray of light from an object to be photographed by the camera is introduced through the lens mechanism 51 into the camera body 11. The ray of light is reflected upwardly by a main mirror 13 toward a pentaprism 15 of a viewfinder optical system positioned above the main mirror 13. A part of the reflected light then travels from the pentaprism 15 to the photodetector of a photometric IC (integrated circuit) 17.

The main mirror 13 includes a half mirror 14 which allows a part of the ray of light passed through the lens mechanism 51 to pass through. The part of the light that has passed through the half mirror 14 is reflected downwardly by an auxiliary mirror 19 and introduced to a rangefinder CCD (charge-coupled device) sensor unit 21 positioned below the main mirror 13.

The photodetector of the photometric IC 17 generates an electric photometric signal corresponding to the intensity of light detected thereby. The photometric signal is logarithmically compressed by the photometric IC 17, and then supplied through a peripheral control circuit 23 to a main CPU (central processing unit) 35.

The main CPU 35 converts the supplied photometric signal to a digital photometric signal. The main CPU 35 carries out predetermined exposure calculations based on the digital photometric signal and film sensitivity information, thereby determining a shutter speed and an aperture value suitable for making an exposure. Based on the calculated shutter speed and aperture value, the main CPU 35 executes a shooting, i.e., actuates an exposure mechanism (shutter mechanism 25 and a diaphragm mechanism 27) to expose a photosensitive film to the light from the object. When the exposure is made (before and after the exposure), the peripheral control circuit 23 controls a motor driver IC 29 to energize a mirror motor 31 to lift or lower the main mirror 13. After the exposure is made, the peripheral control circuit 23 controls the motor driver IC 29 to energize a windup motor 33 to transport the photosensitive film.

The rangefinder CCD sensor unit 21 includes a phase-difference (co-relation) rangefinder sensor. The rangefinder sensor has a beamsplitter optical system for dividing the ray of light from the object into two rays of light, and a CCD line sensor for detecting the two rays of light and integrating them. Thus, the rangefinder CCD sensor unit 21 converts the two rays of light to electric charges and stores the electric charges. The rangefinder CCD sensor unit 21 then outputs the integral data from the CCD line sensor to the main CPU 35. The rangefinder CCD sensor unit 21 is controlled by the main CPU 35 and the peripheral control circuit 23. Further, the rangefinder CCD sensor unit 21 has a monitor device through which the peripheral control circuit 23 detects the brightness of the object. The peripheral control circuit 23 changes the integration period during which the CCD line sensor integrates the electric charges based on the detected brightness of the object.

Based on the integral data from the rangefinder CCD sensor unit 21, the main CPU 35 calculates a defocus amount, i.e., an amount by which the image plane of the object is defocused with respect to the film plane, according to predictive calculations. Then, based on the calculated defocused amount, the main CPU 35 calculates a driving direction and a driving speed of an AF (automatic focusing) motor 39, the speed being represented by a number of pulses of an encoder 41.

Based on the calculated direction and speed, the main CPU 35 controls a motor driver IC 37 to energize the AF motor 39. In synchronism with rotation of the AF motor 39, the encoder 41 outputs pulses which are counted by a counter 35d in the main CPU 35. When the count of pulses from the encoder 41 reaches the number of pulses that represents the calculated driving speed, the main CPU 35 controls the motor driver IC 37 to de-energize the AF motor 39.

The main CPU 35 can control the AF motor 39 to operate in a DC drive mode, and also to rotate in a constant-speed mode by way of pulse width modulation (PWM) based on the interval between output pulses from the encoder 41 before the AF motor 39 is de-energized.

The rotation of the AF motor 39 is transmitted to the lens mechanism 51 through a joint 47 provided on the lens mount of the camera body 11 and a joint 57 provided on the lens barrel of the lens mechanism 51. The joints 47 and 57 are coupled to each other when the lens mechanism 51 is mounted on the camera body 11.

In the DC drive mode, the main CPU 35 energizes the AF motor 39 substantially with a direct current. In the constant-speed mode, the main CPU 35 energizes the AF motor 39 so as to rotate at a predetermined constant speed. In this embodiment, the constant-speed mode is carried out by the PWM which changes the ratio of ON state to OFF state in energizing the AF motor 39.

The main CPU 35 has a read-only memory (ROM) 35a for storing a program and other data, a random-access memory 35b for temporarily storing calculation and control data, and a reference timer 35c for measuring time, in addition to the counter 35d which is hardware-implemented. To the main CPU 35, there is connected an electrically erasable programmable read-only memory (EEPROM) 43 for storing various constants of the camera body 11 and various functions and constants required for calculations in a focus prediction AF mode.

To the main CPU 35, there are also connected:

a photometric switch SWS which can be turned on when the shutter release button of the camera body 11 is partly or fully pressed;

a shutter release switch SWR which can be turned on when the shutter release button is fully pressed;

an automatic focusing switch SWAF for switching between an automatic focusing process and a manual focusing process; and a main switch SWM for turning on and off the electric power supply of the main CPU 35 and peripheral devices.

The main CPU 35 displays an information of an AF mode, an exposure mode, a selected photographic mode, a shutter speed, and an aperture value on a display device 45. The display device 45 includes a display unit (not shown) on an outer surface of the camera body 11 and another display unit (not shown) in a viewfinder. An electronic buzzer (PCV—piezo ceramic vibrator) connected to the main CPU 35.

The main CPU 35 serves as a control means for controlling the single-lens reflex camera as a whole. The main CPU 35, the rangefinder CCD sensor unit 21, and the peripheral control circuit 23 serve as a rangefinding means and also a defocus measuring means. The main CPU 35, the motor driver IC 37, the AF motor 39, and the encoder 41 serve as a lens driving means. The main CPU 35, the peripheral control circuit 23, the motor driver IC 29, the mirror 31, and the windup motor 33 serve as a successively photographing means, a focus determining means, and a moving-object determining means.

The lens mechanism 51 includes a focusing lens group 53 that is movable along its optical axis by a focus adjusting mechanism 55 which is supported in the lens barrel of the lens mechanism 51. When the joints 47 and 57 are coupled to each other, the rotation of the AF motor 39 is transmitted to the focus adjusting mechanism 55. The lens mechanism 51 also has a lens CPU 61 disposed in the lens barrel for calculating various data for the lens mechanism 51. The lens CPU 61 is electrically connected to the peripheral control circuit 23 through electric contacts 49 on the camera body 11 and electric contacts 59 on the lens mechanism 51. Data from the lens CPU 61 is transmitted to the main CPU 35 through the peripheral control circuit 23. The data transmitted from the lens CPU 61 to the peripheral control circuit 23 includes data of a controllable open aperture value Av, a maximum aperture value Avmax, the greatest focal length, the shortest focal length, a present focal length, and K value information. The K value information represents the number of pulses to be outputted by the encoder 41, i.e., the angular displacement of the AF motor 39, when an image plane focused by the focusing lens group 53 moves a unit distance of 1 mm, for example, along the optical axis.

When the photometric switch SWS is turned on, the single-lens reflex camera starts carrying out the AF process. In the AF process, the rangefinder CCD sensor unit 21 starts integrating electric charges. After the rangefinder CCD sensor unit 21 has integrated electric charges, it supplies the integral data to the main CPU 35. The main CPU 35 then calculates a defocus amount and the number of drive pulses, and energizes the AF motor 39 based on the calculated number of drive pulses.

When an object to be photographed by the single-lens reflex camera is still, the automatic focusing device according to the present invention operates in an ordinary AF mode. When the object is moving, the automatic focusing device operates in a focus prediction AF mode for tracking the object-in-motion. The automatic focusing device also has a focus-priority AF mode in which the exposure cannot be made unless the focusing lens group 53 is focused on the object.

The AF process of the single-lens reflex camera will be described below with reference to FIGS. 2 through 5.

Each of FIGS. 2 through 5 shows the relationship between the position of an object image (image plane) with reference to the focusing lens group 53 and the position of a plane equivalent to a film plane (focusing position). In FIGS. 2 through 5, when the position of the object image is above the focusing position, the object image is in a rear focus condition. The object is approaching the camera in FIGS. 2 through 5. Denoted in FIGS. 2 through 5 by I are periods of integrations in which the rangefinder CCD sensor unit 21 integrates electric charges, denoted by C are periods of calculations in which the main CPU 35 calculates a defocus amount and the number of drive pulses based on the integral data, and M are periods of lens driving in which the main CPU 35 energizes the AF motor 39 to drive the focusing lens group 53.

Figure 2:
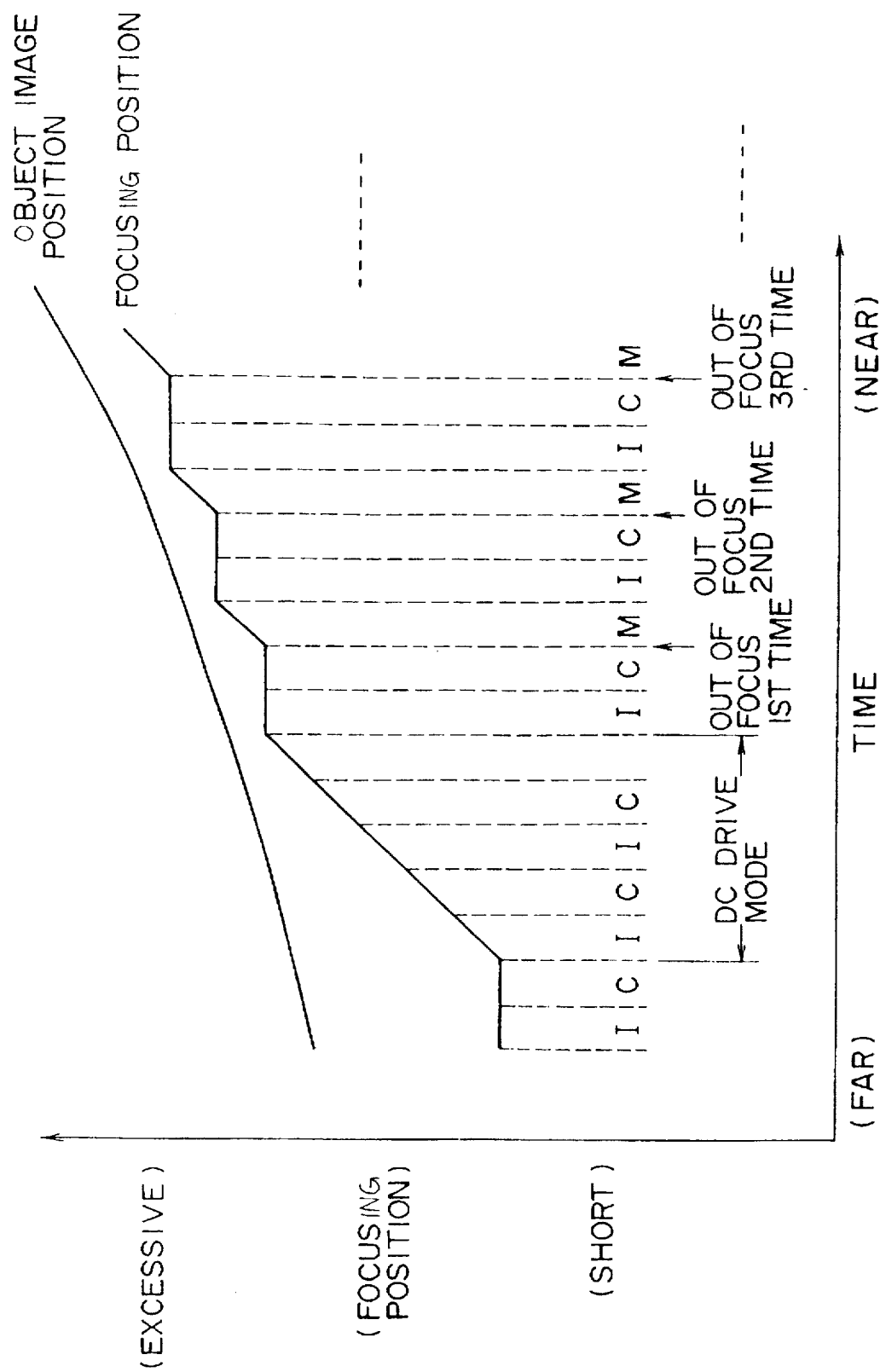
FIG. 2 is a graph showing an automatic focusing process of the automatic focusing device before it enters a focus prediction automatic focusing mode.

FIG. 2 shows the normal AF process before the automatic focusing device enters a moving-object-tracking AF mode, i.e., a focus prediction AF mode.

When the AF process is started by turning on the photometric switch SWS, the AF motor 39 is energized to move the focusing lens group 53 based on the number of drive pulses that is determined during the first integration I and the first calculation C. If the defocus amount (the number of drive pulses) is greater than a predetermined value, the integration and calculation is repeated while the focusing lens group 53 is being moved. If a defocus amount becomes smaller than the predetermined value during the repeated integration and calculation, then no subsequent integration and calculation will be carried out, and the focusing lens group 53 is driven on the basis of the number of drive pulses that has been determined by the previous (latest) integration and calculation. The process of integration and calculation is referred to as a rangefinding process. The AF process is composed of the process of integration, calculation, and lens driving.

When the first lens driving is finished, the integration and calculation, i.e., the rangefinding process, is carried out again to determine whether the focusing lens group 53 is focused on the object or not. If focused, then the object is assumed to be still. To confirm the possibility of the object moving, however, a certain period of time is consumed, and then the rangefinding process is effected again and the focusing lens group 53 is driven when required. If the shutter release switch SWR is turned ON and an interrupt occurs during the above certain period of time, then the shutter of the camera is released. If no interrupt occurs, then the rangefinding process and the lens driving are repeated as long as the photometric switch SWS is turned on.

Figure 3:
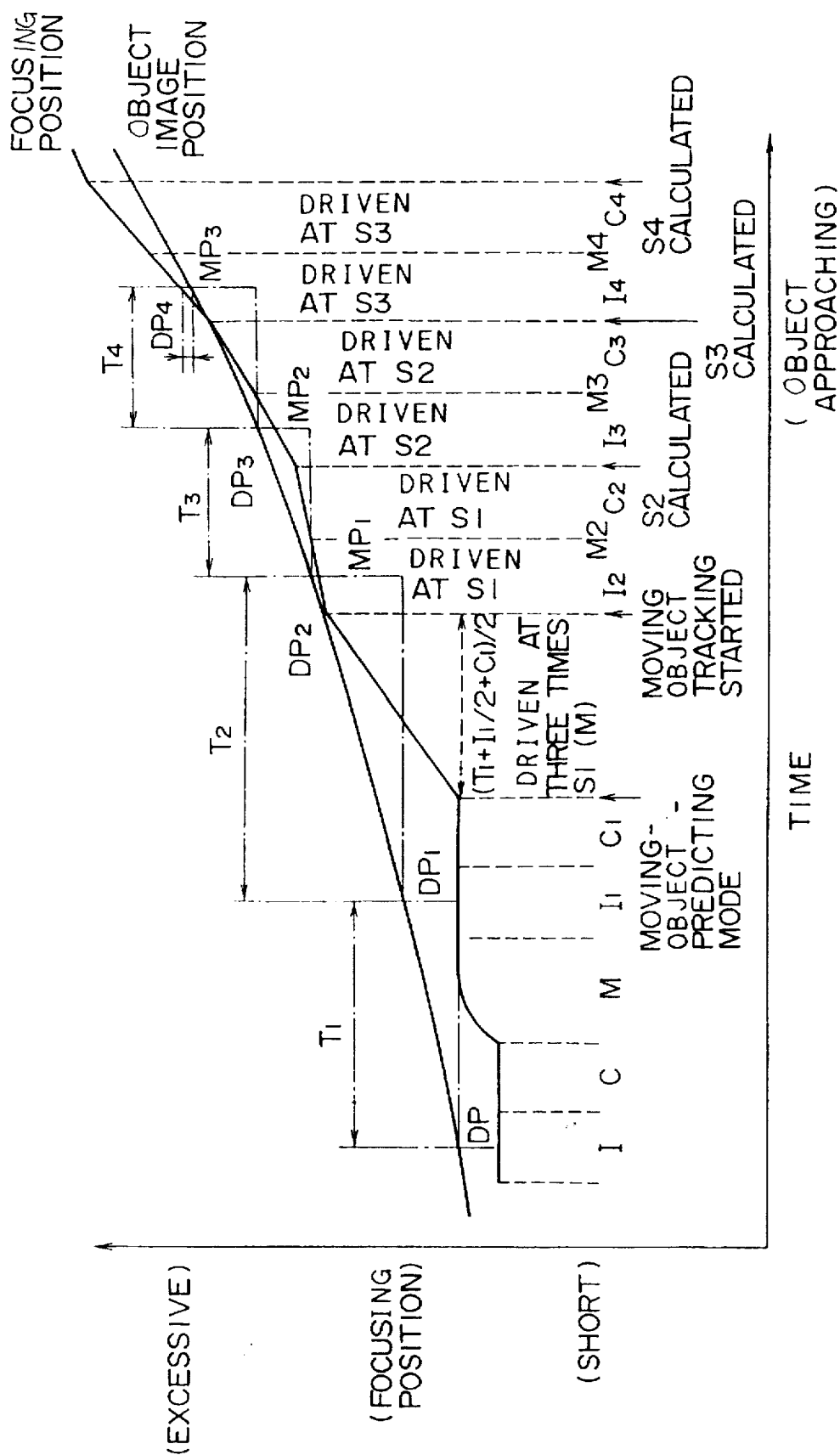
FIG. 3 is a graph showing an automatic focusing process of the automatic focusing device in the focus prediction automatic focusing mode.

If the focusing lens group 53 is not focused on the object successively a plurality of times (three times in this embodiment) while the rangefinding process and the lens driving are being repeated, then it is assumed that the object is moving, and the automatic focusing device enters a focus prediction AF mode (see FIG. 3).

"Tracking the object-in-motion"

The AF process to be carried out when the object is moving will be described below with reference to FIGS. 3 through 5.

When a defocus pulse DP is produced as a result of a calculation C (defocus calculation) based on an integration I, a lens driving M (in the DC drive mode and the constant-speed mode by way of PWM) is carried out based on the defocus pulse DP.

When a defocus pulse DP1 greater than a predetermined value is obtained as a result of an integration I1 and a calculation C1 (defocus calculation) immediately after the lens driving M, an object image plane moving speed (object-in-motion tracking speed) S1 and a lens driving period are calculated in the focus prediction AF mode.

The speed (object-in-motion tracking speed) S1, at which the object image moves in an interval (integrating interval) T1 between intermediate points in the integrations I and I1, is calculated as follows:

$$X1 = T1/DP1 \text{ (ms)} \quad (1)$$

$$S1 = 1/X1 = Dp1/T1 \text{ (pulses/ms)} \quad (2)$$

where X1 is the cyclic period (ms) of pulses outputted by the encoder 41.

The object-in-motion tracking speed S1 is substantially equal to the actual object image plane moving speed.

Then, a lens driving M1 is carried out at a speed that is three times greater than the object-in-motion tracking speed S1 during the lens driving interval calculated by an equation (3) below.

$$\{T1 + (I1/2) + C1\}/2 \quad (3)$$

As the lens driving M1 is carried out as above, the focusing lens group 53 can move to a position close to the focusing position within a short period of time. The lens driving M1 may be carried out at a speed that is twice, four times, or more times greater than the object-in-motion tracking speed S1. If, for example, the lens driving M1 is carried out at a speed that is twice the object-in-motion tracking speed S1, then the lens driving interval is about twice the lens driving time when the lens driving M1 is carried out at a speed three times greater than the object-in-motion tracking speed S1.

After the lens driving M1 is finished, an integration I2 and a calculation C2 are carried out while a lens driving M2 is being effected at the object-in-motion tracking speed S1. In the calculation C2, the number of pulses MP1, which corresponds to the distance that the object image moves on the assumption that the object image has moved at the object-in-motion tracking speed S1, in a time T2, from the intermediate point of the previous integration I1 to the intermediate point of the present integration I2, is calculated as follows:

$MP1 = T2 \times S1$.

Then, a cyclic period X2 of AF pulses, used to obtain an object-in-motion tracking speed S2, is determined based on the time T2 from the intermediate point of the previous integration I1 to the intermediate point of the present integration I2, the number MP1 of pulses corresponding to the distance that the object image moves in the time T2, and the present number DP2 of defocus pulses. Then, the object-in-motion tracking speed S2 is determined from the cyclic period X2 of AF pulses, as follows:

$$X2 = T2/(Mp1+Dp2) \text{ (ms)} \tag{4},$$

$$S2 = 1/X2 = (MP1+DP2)/T2 \text{ (pulses/ms)} \tag{5}.$$

A lens driving M3 is carried out at the object-in-motion tracking speed S2 during a next integration I3 and a next calculation C3.

Subsequently, an object-in-motion tracking speed Sn is determined from the number MPn−1 of pulses (MPn−1 =Tn×Sn−2 in second and subsequent calculations during tracking) which corresponds to the distance that the object image moves on the assumption that the object image has moved at an object-in-motion tracking speed Sn−1 in a time Tn, and a lens driving Mn+1 is carried out at the object-in-motion tracking speed Sn while an integration In+1 and a calculation Cn+1 are being carried out.

The above tracking control operation keeps the focusing lens group 53 substantially focused on the object-in-motion at all times. In the above calculations, since the number DP of defocus pulses is of a scalar quantity, its sign changes depending on whether the object image is overfocused or underfocused. If the calculated number DP of defocus pulses is excessive, then the present number DP2 of defocus pulses is subtracted from the number MP1 of pulses which corresponds to the distance that the object image moves in the time T2.

The general equations for tracking calculations are given as follows:

$$MPn-1 = TN \times Sn-2 \tag{6},$$

(when n=2, MP1=T2 x S1)

$$Xn = Tn/(MPn-1 \pm DPn) \text{ (ms)} \tag{7},$$

and $$Sn = 1/Xn \text{ (pulses/ms )} \tag{8}.$$

Figure 4:
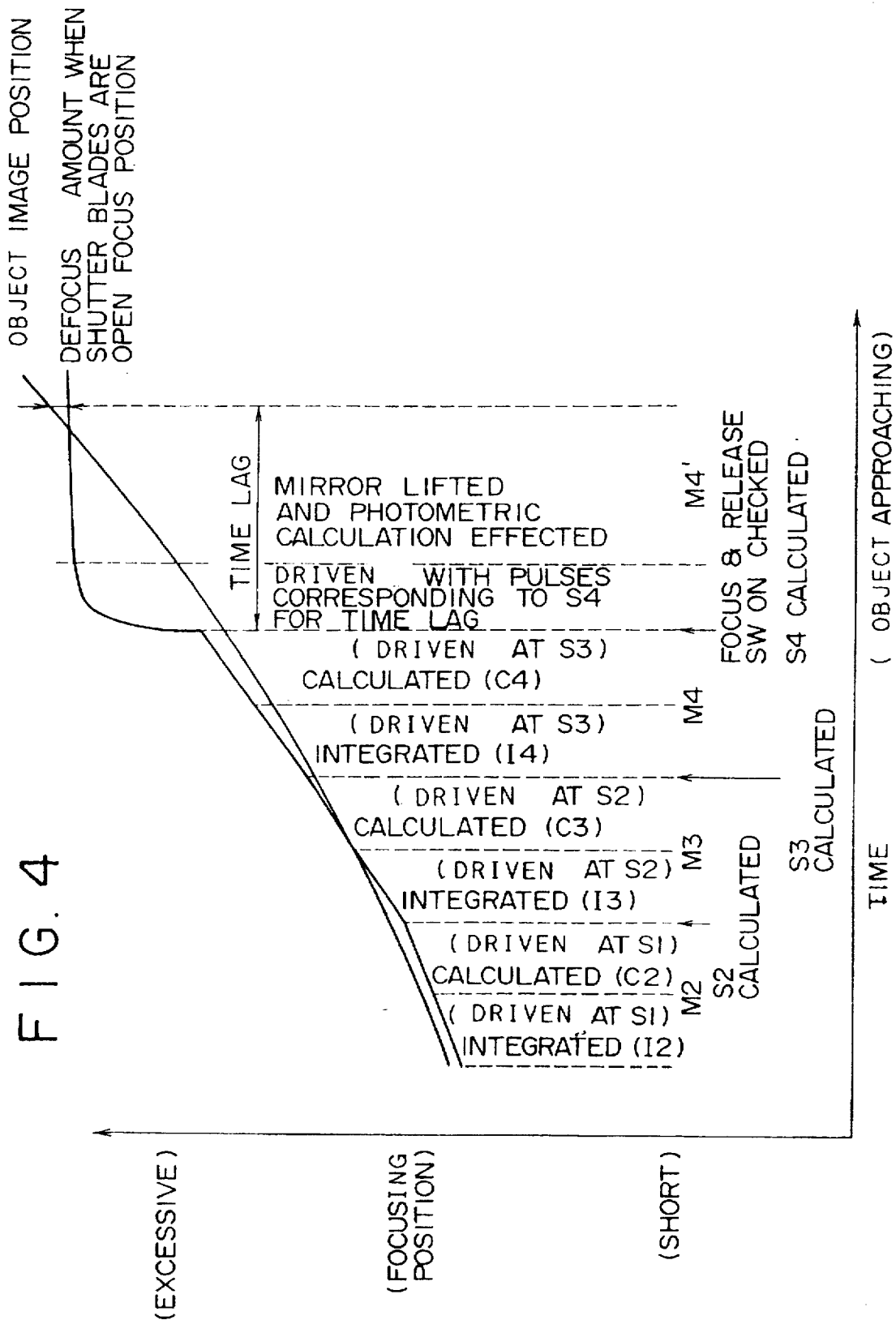
FIG. 4 is a graph showing an automatic focusing process of the automatic focusing device when a shutter release switch is turned on in the moving-object-predicting automatic focusing mode.
Figure 5:
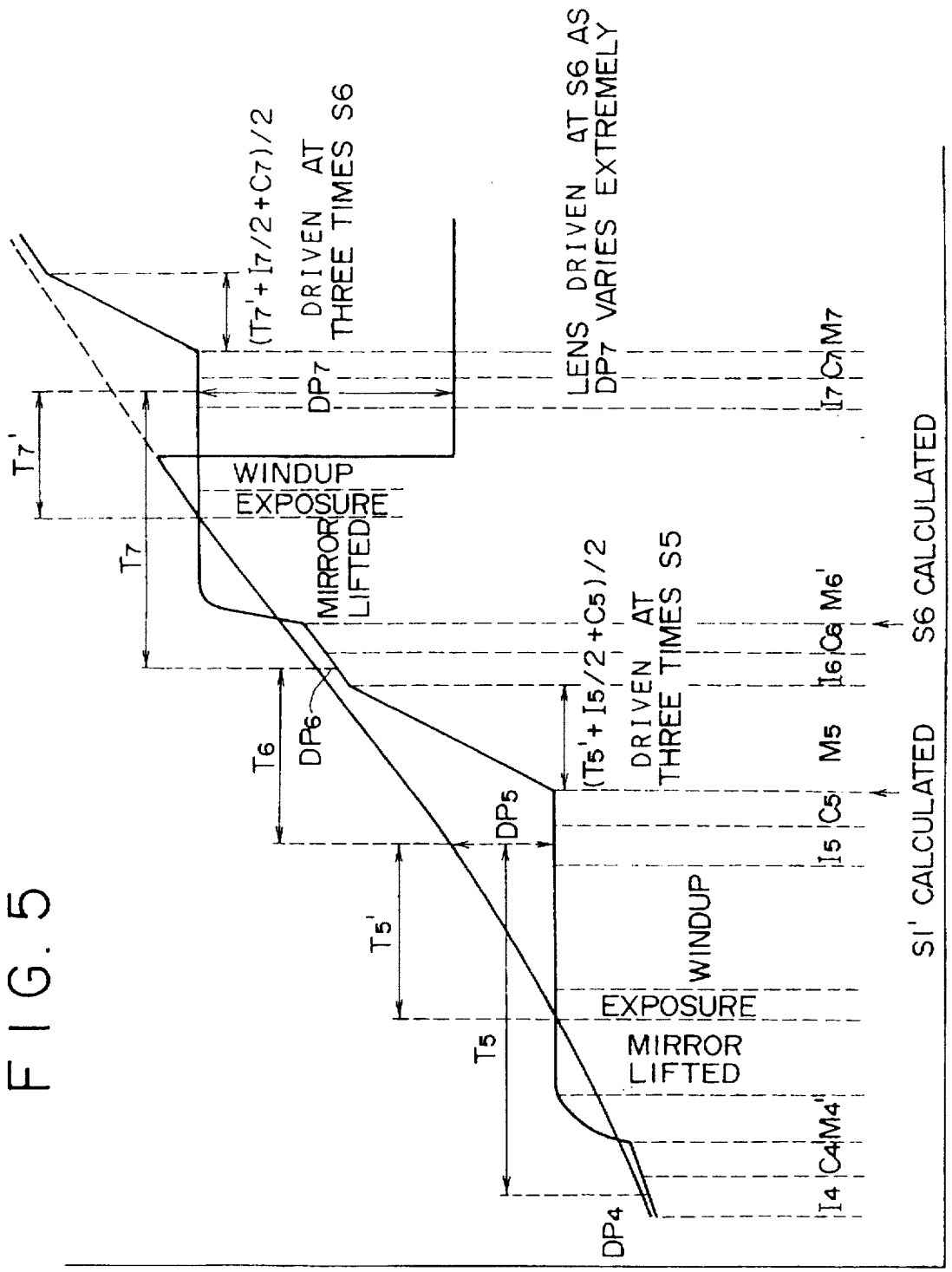
FIG. 5 is a graph showing an automatic focusing process of the automatic focusing device when a main object moves out of a rangefinding zone while successive exposures are being made in the focus prediction automatic focusing mode.

By repeating the calculations according to the above equations (6), (7), and (8), the lens driving and integration based on the results of the calculations, it is possible to track the object-in-motion as shown in FIGS. 3 through 5. The number MPn−1 of pulses and the number DPn of defocus pulses, which are calculated, are of absolute values. Therefore, the number±DPn of defocus pulses on the right-hand side of the equation (7) is rendered positive (+) when a rear focus condition exists, and negative (−) when a front focus condition exists.

"AF process when the shutter release switch is turned on"

Generally, the mirror in the single-lens reflex camera is lifted after the shutter release switch SWR is turned on. Therefore, a certain period of time elapses after the shutter release switch SWR is turned on until the photographic film is actually exposed to the light from the object. When the object is moving, since it also moves after the shutter release switch SWR is turned on until the photographic film starts being exposed, i.e., during a shutter release time lag RTL, it is preferable to continue a lens driving to track the object-in-motion during the shutter release time lag RTL.

In this embodiment, such a demand is met by determining whether the shutter release switch SWR is turned on or not when the above calculations are over, and effecting a lens driving for the time lag before the mirror is lifted if the shutter release switch SWR is turned on. This lens driving is carried out in the DC drive mode and the constant-speed mode by means of PWM. The number of drive pulses to effect the lens driving corresponds to the number of drive pulses required to carry out the lens driving Mn+1 at the object-in-motion tracking speed Sn determined immediately before the shutter release switch SWR is turned on, for a time corresponding to the time lag (see FIG. 4). This lens driving prior to the mirror's being lifted brings the focusing lens group 53 substantially into focus when the leading curtain of the shutter starts moving, i.e., exposing the photographic film.

"Tracking the object-in-motion in successive exposure mode (successive shutter release mode)"

Tracking the object-in-motion in a successive exposure mode will be described below with reference to FIG. 5. While the user of the camera attempts to photograph an object-in-motion, the rangefinding zone of the camera may move off the object-in-motion during the tracking of the object-in-motion. For example, when the rangefinding zone of the viewfinder field temporarily moves off the object-in-motion and catches another object in the process of integration, the defocus amount may become extremely large, e.g., so large that the focusing lens group 53 will be moved to an infinitely distant focusing position or a very close focusing position. If the number of defocus pulses and the object-in-motion tracking speed were determined using the integral data as obtained in such a situation and the lens driving were carried out based on the number of defocus pulses and object-in-motion tracking speed, then the focusing lens group 53 would be focused on an object distant from the object-in-motion, and the object-in-motion would be out of focus. Even if the object-in-motion is caught by the rangefinding zone, since the speed to drive the focusing lens group 53 to track the object-in-motion, determined based on the integral data before and when the object-in-motion is caught by the rangefinding zone, is largely different from the speed to drive the focusing lens group 53 to track the object-in-motion, determined based on the actual movement of the object-in-motion, it will take a long period of time until the focusing lens group 53 is focused again on the object-in-motion.

Operation of the automatic focusing device to solve the above problems will be described below with reference to FIG. 5.

If the shutter release switch SWR is turned on when a calculation C4 is finished, then a lens driving M4 is carried out in the DC drive mode and the constant-speed mode by means of PWM for the number of pulses corresponding to the time lag. Thereafter, the mirror is lifted, the shutter is actuated to expose the photographic film, the photographic film is transported, and then the mirror is lowered.

Upon detection of the completion of the film windup, an integration I5 is carried out, the number DPS of defocus pulses is calculated based on the integral data of the integration I5, an object-in-motion tracking speed S5 is calculated, and then a lens driving M5 is carried out for a predetermined period of time at a speed three times greater than the object-in-motion tracking speed S5. The object-in-motion tracking speed S5 is determined according to the equation (5) given before.

The period of time for which the lens driving is executed is $\{T5'+(I5/2)+C5\}/2$ where T5' is a period of time from the start of exposure to an intermediate point of the present integration I5.

When the lens driving M5 is over, a lens driving M6 is carried out at the object-in-motion tracking speed S5, and at the same time an integration I6 and a calculation C6 are effected to determine an object-in-motion tracking speed S6 and the number TDP6 of drive pulses for the time lag. The AF motor 39 is then energized in the DC drive mode and the constant-speed mode by way of PWM for the determined number of drive pulses for the time lag.

When the lifting of the mirror, the exposure, the lowering of the mirror, and the film windup are finished, an integration I7 is carried out. If the rangefinding zone moves off the object-in-motion and the distance up to an infinitely distant object is measured during the integration I7, then the direction of defocus is reversed, and the absolute value of defocus becomes extremely large. In such a case, i.e., the defocus changes extremely, the data obtained based on the present integration I7 is canceled, and the object-in-motion tracking speed S6 produced based on the previous integration I6 is employed to control the focusing lens group 53 to track the object-in-motion. That is, a lens driving M7 is carried out at a speed that is three times higher than the object-in-motion tracking speed S6 for a time $[\{T7'+(I7/2)+C7\}/2]$. The lens driving M7 allows the focusing lens group 53 to focus on the object-in-motion.

When the lens driving M5 is over, an integration I8 and a calculation C8 are carried out in the same manner as the integration I6 and the calculation C6. If the absolute value of the defocused value obtained in the calculation C8 is smaller than a predetermined value, then the object-in-motion tracking operation is continued based on the defocused value. If the absolute value of the defocused value is greater than the predetermined value, then a lens driving M8 is carried out at the speed that is three times higher than the object-in-motion tracking speed S6 for a time $[\{T8'+(I8/2)+C8\}/2]$, or the automatic focusing device leaves the focus prediction AF mode and returns to the normal AF process. The number of times that the rangefinding process and the lens driving have to be carried out before the automatic focusing device leaves the focus prediction AF mode is set at step S519 in FIG. 17 (which will be described later). The initial value of this number of times is stored in the EEPROM 43 and can be determined if desired.

"Main operation sequence"

A main operation sequence of the automatic focusing device will be described in detail below with reference to FIGS. 6 through 31. The main operation sequence is executed by the main CPU 35 according to the program that is stored in the ROM 35a of the main CPU 35. Various data including constants and parameters required by the above calculations are stored in the EEPROM 43.

Figure 6:
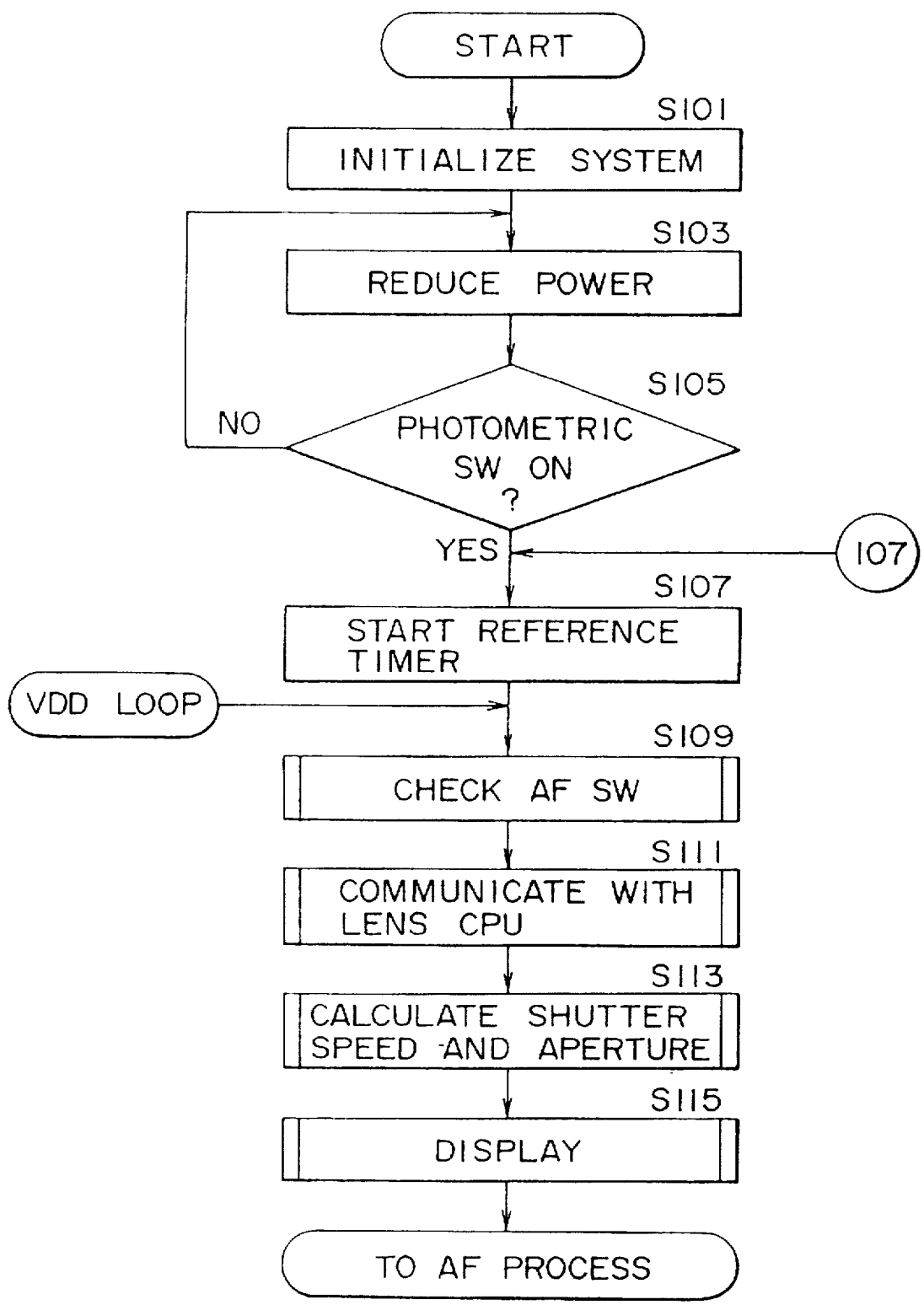
FIG. 6 is a flowchart of a main operation sequence of the automatic focusing device.

FIG. 6 shows a routine of a main sequence of the main CPU 35. The main CPU 35 starts to execute the routine shown in FIG. 6 when the main switch SWM is turned on. First, the main CPU 35 initializes the system, i.e., the ports and memories, in a step S101. Then, the main CPU 35 executes a power-reduction process to eliminate unwanted electric power consumption in a step S103. The power-reduction process is repeated until the photometric switch SWS is turned on in a step S105.

When the photometric switch SWS is turned on, the main CPU 35 starts the reference timer 35c in a step S107, checks the AF switch SWAF in a step S109, and then communicates with the lens CPU 61 to receive the information of controllable open aperture Av, the maximum aperture Av, the focal lengths, and the K value information from the lens CPU 61 in a step S111.

The main CPU 35 receives photometric data relative to the brightness of the object from the photometric IC 17, and calculates a shutter speed and an aperture in a preset exposure mode based on the photometric data and the film sensitivity in a step S113. Then, the main CPU 35 displays the calculated shutter speed and aperture and other photographic data on the display device 45 in a step S115. Control then goes from the step S115 to the AF process.

Figure 7:
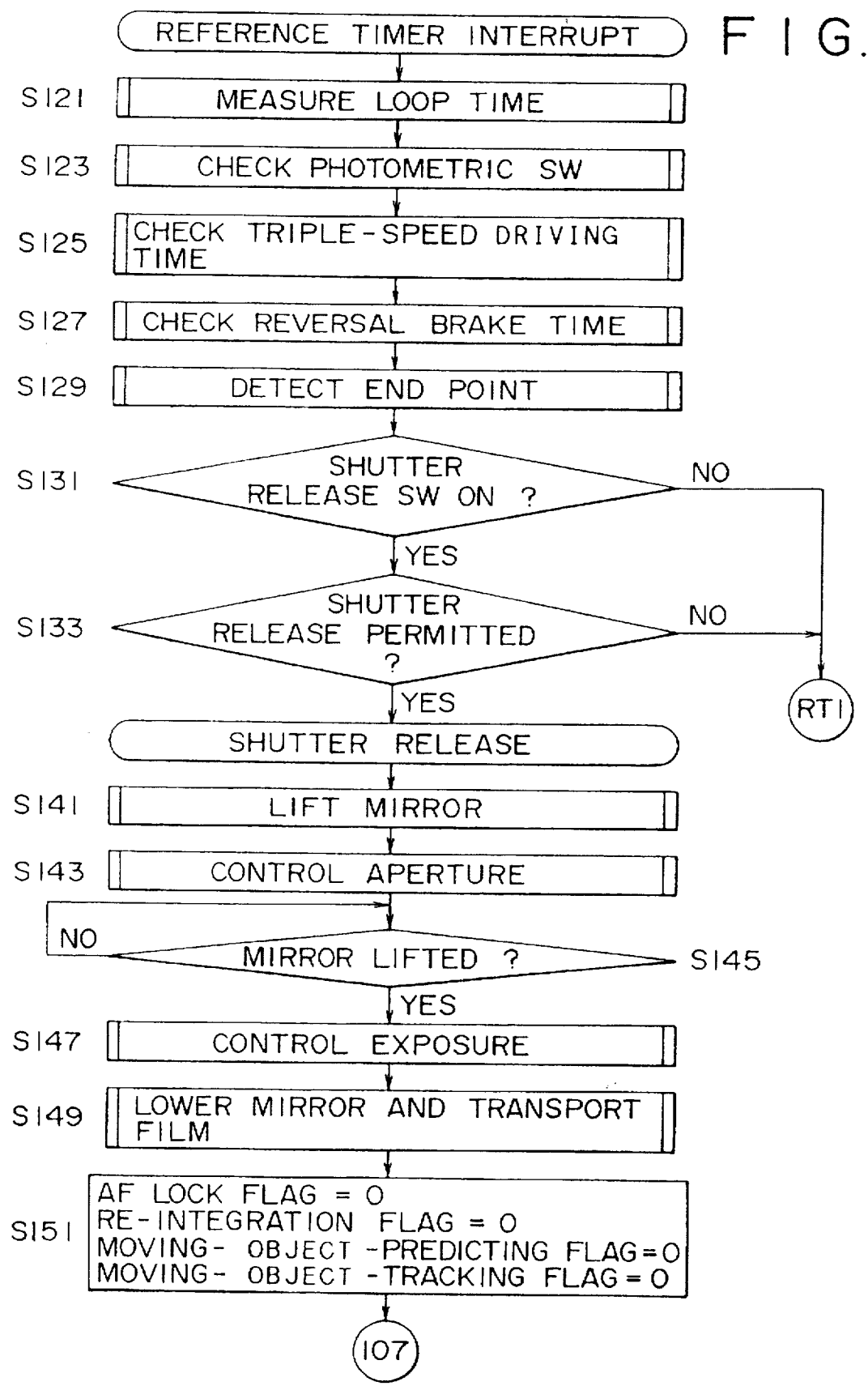
FIG. 7 is a flowchart of a reference timer interrupt routine of the automatic focusing device.

As the process continues past step S107, a reference timer interrupt routine, shown in FIG. 7, will be executed and will interrupt the main routine, each time the reference timer 35c runs out, and will reenter the main routine at step S107, after step S151 is executed, as shown in FIG. 7. Various major processes are carried out in the reference timer interrupt routine illustrated in FIG. 7.

In the reference timer interrupt routine, a loop time is first measured in a step S121. Then, a subroutine for checking the photometric switch SWS is executed in a step S123. In the subroutine for checking the photometric switch SWS, control returns to the routine of the reference timer interrupt if the photometric switch SWS is turned on, and control leaves the routine of the reference timer interrupt and goes to step S107 if the photometric switch SWS is turned off.

If the photometric switch SWS is turned on, then the main CPU 35 executes a subroutine for checking the time for carrying out the lens driving at a triple speed in a step S125, a subroutine for checking a reverse braking time in a step S127, and a subroutine for determining whether the focusing lens group 53 has reached an extremity (far or near extremity) of its stroke in a step S129.

If the shutter release switch SWR is turned off in a step S131 or the shutter release switch SWR is turned on but no shutter release permission is given in a step S133, e.g., if the focusing lens group 53 is not focused in the focus-priority AF mode, then the reference time interrupt routine is terminated, and the control returns where the interruption occured.

If the shutter release switch SWR is turned on and a shutter release permission is given in the step S133, then the main CPU 35 executes a shutter release process. In the shutter release process, the mirror motor 31 is energized to lift the mirror in a step S141, and then, the diaphragm mechanism 27 is driven to set the aperture to the value, which has been calculated in the step S113 in a step S143.

The main CPU 35 waits until the lifting of the mirror is completed in a step S145. If the mirror is fully lifted, then the shutter mechanism 25 is actuated to expose the photographic film at the shutter speed calculated in the step S113 in a step S147. When the exposure is over, the mirror motor 31 is energized to lower the mirror and the windup motor 33 is energized to wind the photographic film by one frame in a step S149. The main CPU 35 clears an AF lock flag, a re-integration flag, a focus prediction flag, and a moving-object-tracking flag in a step S151, after which control returns to the step S107.

"AF process"

Figure 8:
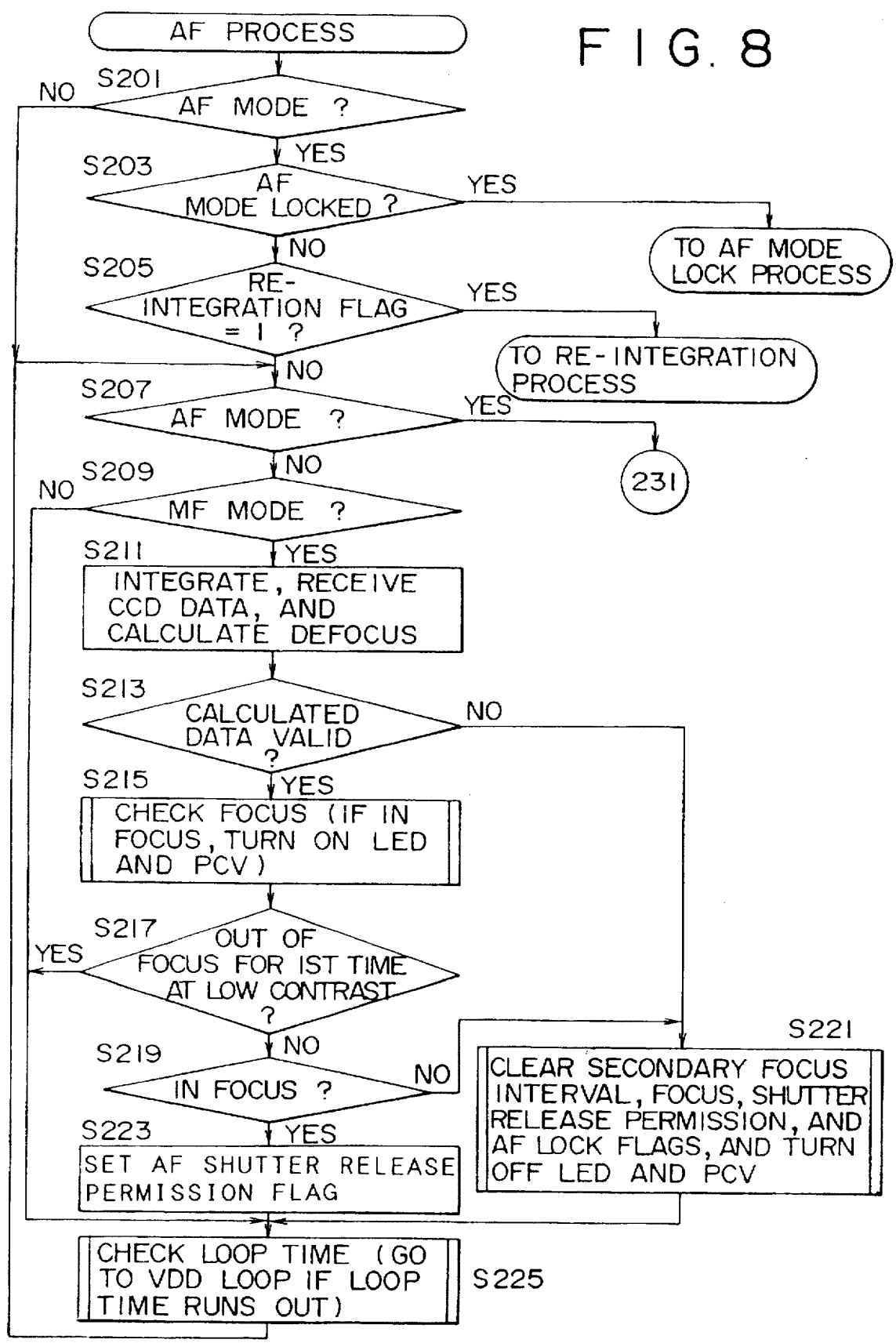
Figure 9A:
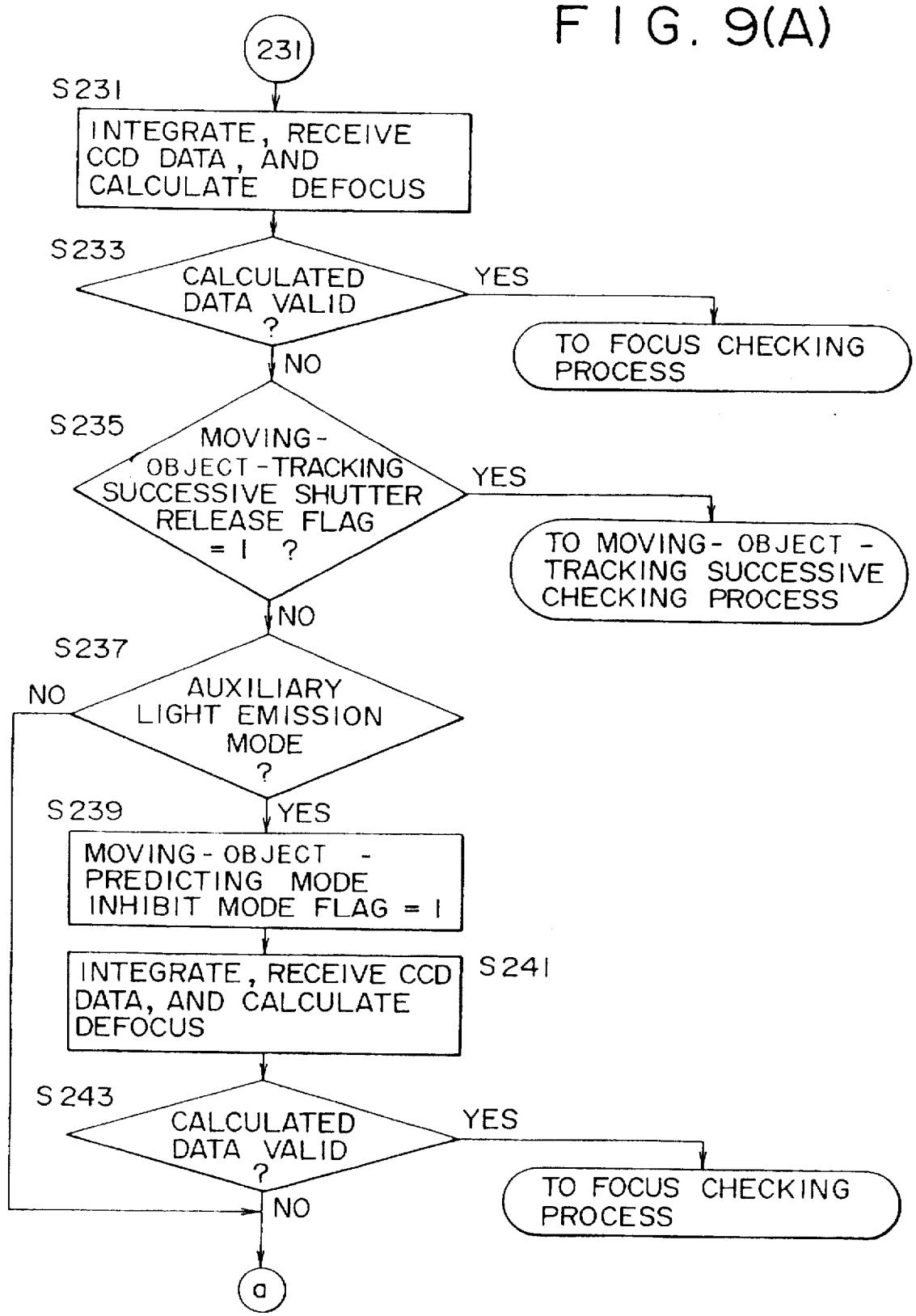
Figure 9B:
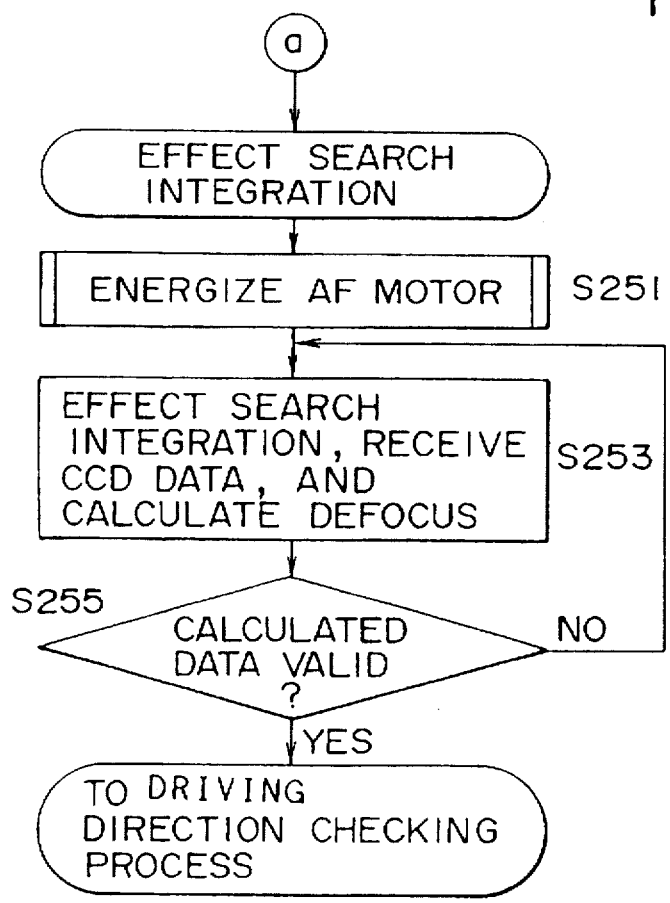
Figure 9:
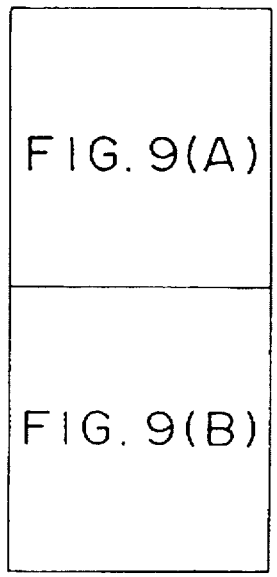

The AF process according to this embodiment will be described below with reference to FIGS. 8 and 9. First, the main CPU 35 determines whether the focusing mode is an AF mode or a manual focusing (MF) mode in a step S201. If the MF mode, then control jumps to a step S207. The AF mode is a mode in which the focus is automatically adjusted, and the MF mode is a mode in which the focus is manually adjusted by the user of the camera. If the AF mode, then the main CPU 35 determines whether the AF mode is to be locked or not in a step S203.

If AF mode is to be locked, then control goes to an AF mode lock process. If not, i.e., if the AF lock flag is 0, then the main CPU 35 determines whether the re-integration flag, that is set after the first integration is over is set or not in a step S205. In the first AF process, control proceeds from the step S205 to the step S207 because the re-integration flag is not set. In the second or subsequent AF process, control goes from the step S205 to a re-integration process as the re-integration flag is set.

In the first AF process or the MF mode, the main CPU 35 determines whether the camera operates in the AF mode or not in the step S207. If in the AF mode, then control goes from the step S207 to a step S231 for starting the AF process. If not in the AF mode, then the main CPU 35 determines whether the camera operates in the MF mode or not in a step S209. If not in the MF mode, then the main CPU 35 executes a loop time checking process in a step S225.

The loop time checking process is shown in FIG. 10. If the loop time has not elapsed in a step S281, then control returns to the step S207. If the loop time has elapsed, then control goes to a VDD loop.

If the camera operates in the MF mode but not in the AF mode, then a rangefinding process and focus or defocus display process are carried out in steps S211 through S223. In the step S211, the main CPU 35 carries out an integration, receives integral data (CCD data), and calculates a defocus amount. Then, the main CPU 35 determines whether the calculated defocus amount is valid or not in a step S213. If valid, then the main CPU 35 checks if the focusing lens group 53 is in focus. If an in-focus condition, the main CPU 35 energizes a focus indicating LED (not shown) of the display device 45 and the electronic buzzer 46 to indicate that the focusing lens group 53 is in focus in a step S215. If not focused, the main CPU 35 does not energize the focusing indicating LED and the electronic buzzer 46.

If the object is of a low contrast and the focusing lens group 53 is out of focus for the first time in a step S217, then control jumps to a step S225. Otherwise, the main CPU 35 determines whether the focusing lens group 53 is in focus in a step S219. If in focus, the main CPU 35 sets an AF shutter release permission flag in a step S223. If not in focus, the main CPU 35 clears a secondary focus allowance, focus, shutter release permission, and AF lock flags, and turns off the focusing indicating LED and the electronic buzzer 46 in a step S221. Thereafter, control goes to the step S225.

Note that there are a first and secondary focus allowance. The first secondary focus allowance is an allowance employed first time when an object is focused. The defocus amount becomes small and within this allowance, the object is deemed to be in an in-focus condition. On the other hand, after the object has been focused with use of the first focus allowance, the defocus amount could be out of the allowance due to the blur of the camera. In such a case, the focusing lens group 53 would flicker at a short interval. To avoid such a situation, the secondary focus allowance is employed once an object has been focused. The secondary focus allowance is set greater than the first focus allowance, thus, even if the defocus amount varies after the object has been focused, though it is not accurately in focus, the object is deemed to be focused, and flickering movement in the vicinity of the focusing position is prevented.

If the calculated defocus amount is invalid in the step S213, then the main CPU 35 also clears the secondary focus allowance, the focus, shutter release permission, and AF lock flags, and turns off the focusing indicating LED and the electronic buzzer 46 in the step S221. Thereafter, control goes to the step S225.

When the AF process is started in the step S231, the main CPU 35 carries out an integration, receives 10 integral data, and calculates a defocus amount. Then, the main CPU 35 determines whether the calculated defocus amount is valid or not in a step S233. If valid, then control goes from the step S233 to a focus checking process. If not valid, the main CPU 35 determines whether a moving-object-tracking successive shutter release flag is set or not in a step S235. If set, then control goes from the step S235 to a moving-object-tracking successive checking process. A moving-object-tracking successive shutter release process is a process in which successive exposures are made while the object-in-motion is being tracked.

If moving-object-tracking successive shutter release flag is not set, then the main CPU 35 determines whether the camera operates in an auxiliary light emission mode or not in a step S237. The auxiliary light emission mode is a mode in which auxiliary infrared radiation of a contrast pattern is applied from an auxiliary radiation emitter (not shown) to the object when the brightness of the object is lower than a predetermined level.

If in the auxiliary light emission mode, since it is difficult to track the object-in-motion, the main CPU 35 sets a focus prediction AF mode inhibit flag in a step S239. The auxiliary infrared radiation is emitted, and the main CPU 35 carries out an integration, receives integral data, and calculates a defocus amount in a step S241. Then, the main CPU 35 determines whether the calculated defocus amount is valid or not in a step S243. If valid, then control goes from the step S243 to a focus checking process. If not valid, control proceeds from the step S243 to a search integration process in steps S251 through S255. If not in the auxiliary light emission mode, control jumps to the step S251.

In the search integration process, since no valid calculated defocus amount is produced in the step S241, the main CPU 35 energizes the AF motor 39 in the DC drive mode in the step S251, and then carries out a search integration, receives integral data, and calculates a defocus amount in the step S253. Then, the main CPU 35 determines whether the calculated defocus amount is valid or not in a step S255. If not valid, then the main CPU 35 carries out a search integration, enters integral data, and calculates a defocus amount again in the step S253. If valid, then control goes from the step S255 to a actuating direction checking process.

FIG. 10 illustrates a loop time checking process. In step S281, a determination is made as to whether the loop time has elapsed. If it has elapsed, control is returned to a VDD loop, which starts at step S109 shown in FIG. 6. If the loop time has not elapsed, the control will be returned to step S207.

"Integration starting process"

An integration starting process shown in FIG. 11 is a subroutine which is called by the integration in the steps S211, S231, S241, S303, the search integration in the step S253, and an overlap integration in a step S625 of the AF process subroutine. In the integration starting process, the system is initialized in a step S261, and an integration is started, i.e., electric charges are stored in the CCD sensor unit 21, in a step S263, and an integration flag is set to "1" in a step S265. While checking a predetermined integration time, the main CPU 35 waits until the predetermined integration time elapses in steps S267, S269. If the integration is not finished within the predetermined integration time in the step S269, then since the object is too dark to effect the focus prediction AF mode, the main CPU 35 sets the focus prediction AF mode inhibit flag in a step S271.

If the CCD sensor unit 21 has finished the integration before the integration time elapses in the step S267, then the main CPU 35 is supplied with the integral data (CCD data) in a step S273, calculates a defocus amount in a step S275, and then goes to a next step.

"Re-integration process and focus checking process"

Figure 12A:
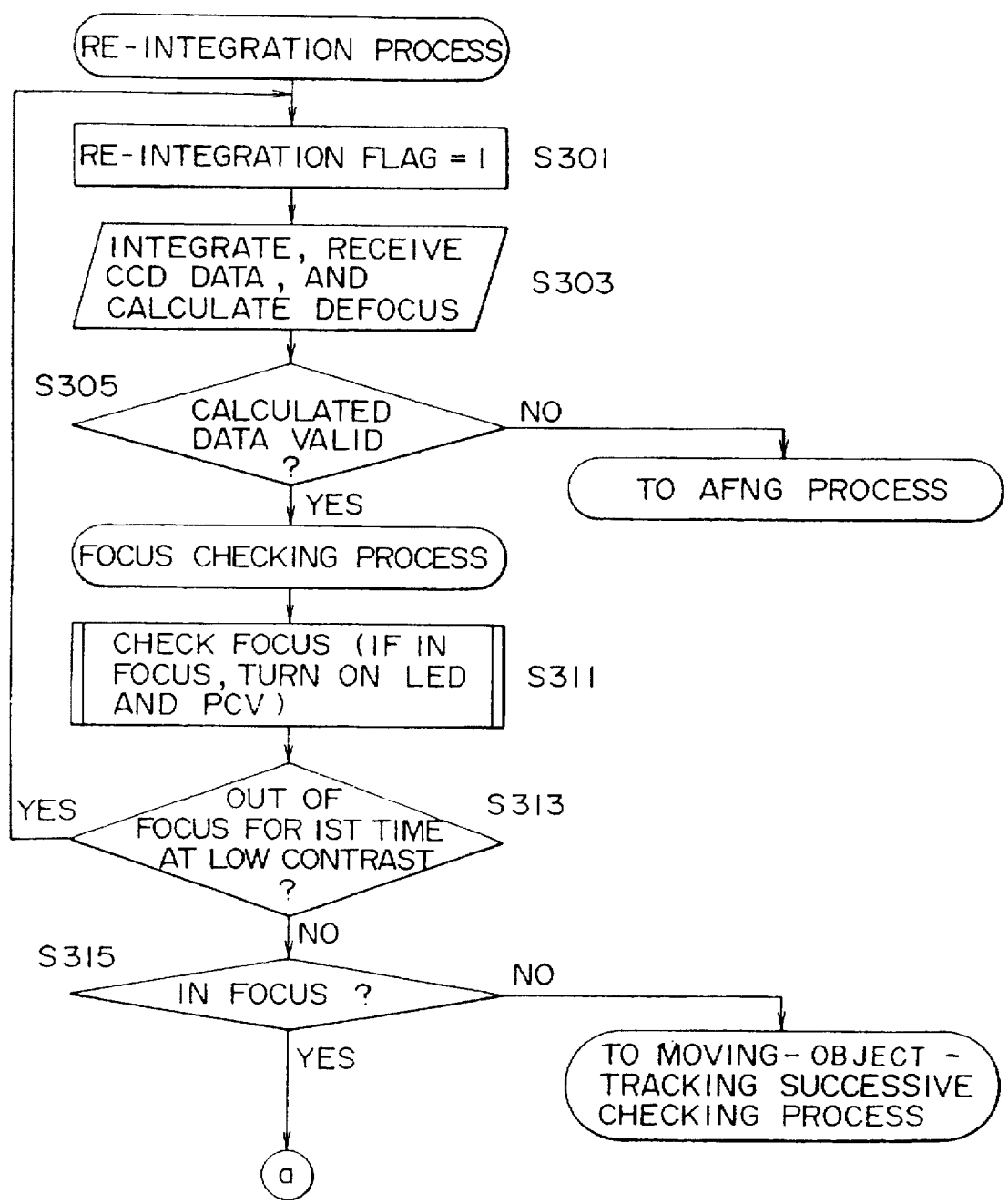
Figure 12B:
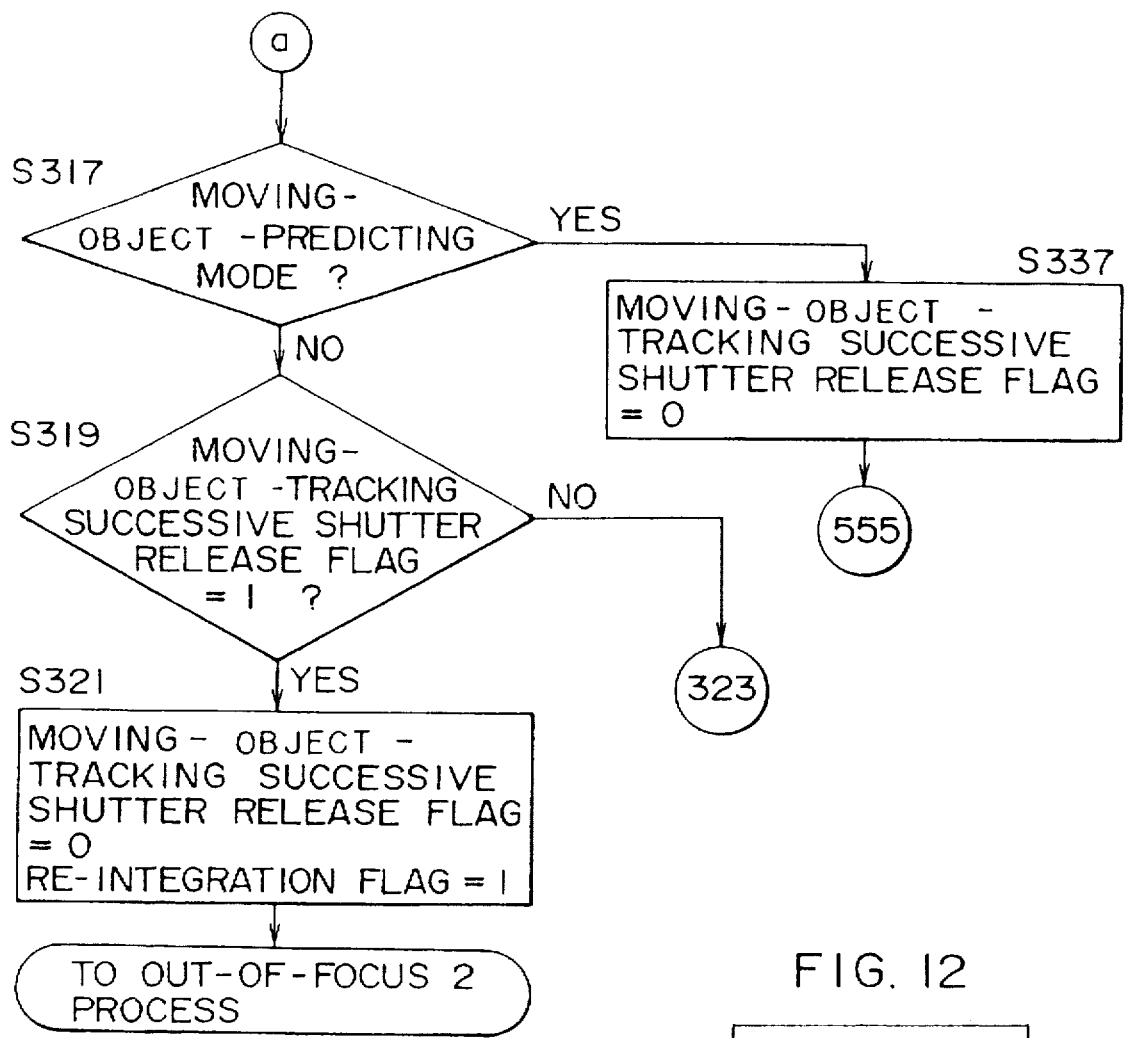
Figure 12:
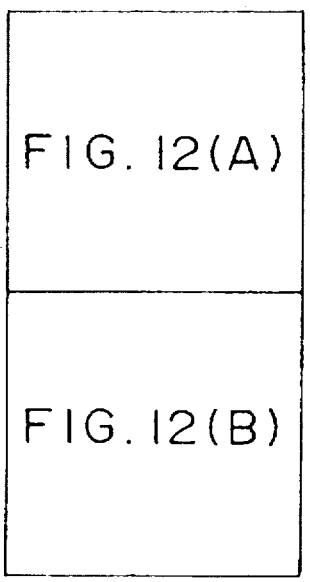
Figure 13:
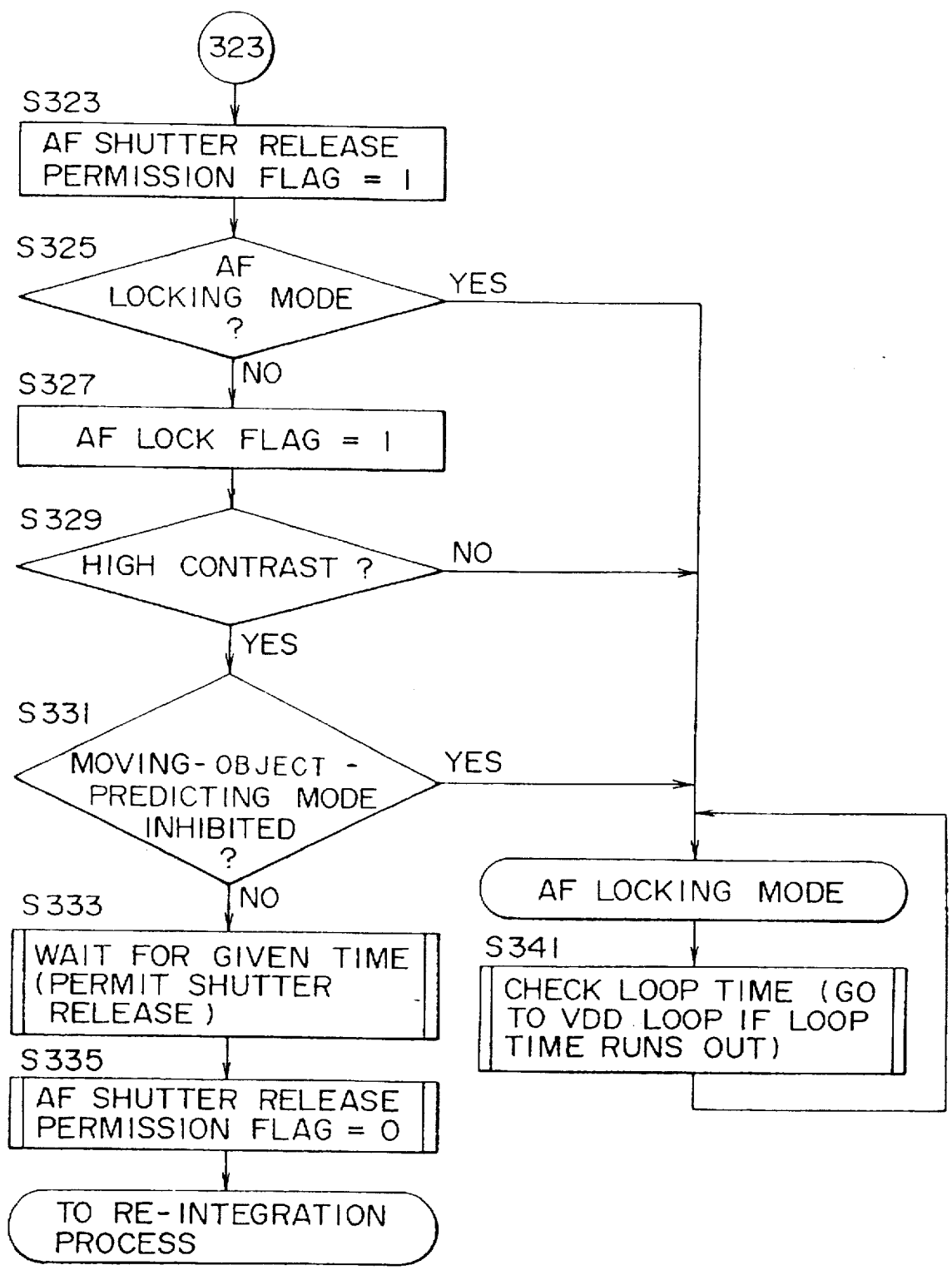

The re-integration process branched from the step S205 and the focusing checking process branched from the steps S233, S243 will be described below with reference to the subroutines shown in FIGS. 12 and 13.

The re-integration process is a second or subsequent integration process that is executed after the integration process shown in FIG. 11 is carried out, after the photometric switch SWS is turned on.

In the re-integration process, the main CPU 35 sets a re-integration flag indicative of the second or subsequent integration process in a step S301, and then effects an integration, receives integral data, and calculates a defocus amount in a step S303. If the calculated defocus amount is invalid in a step S305, then control jumps to an AFNG process. If the calculated defocus amount is valid in the step S305, then control goes to the focus checking process. The calculated defocus amount may be of an invalid value when the object is very dark or the object is a uniformly bright wall, for example.

In the focus checking process, the main CPU 35 determines whether the focusing lens group 53 is in focus from the defocus amount. If the focusing lens group 53 is in focus, then the main CPU 35 energizes the focus indicating LED of the display device 45 and the electronic buzzer 46 in a step S311. If not in focus, the main CPU 35 does not energize the focusing indicating LED and the electronic buzzer 46.

Then, the main CPU 35 determines whether the focusing lens group 53 is out of focus for the first time when the object is of a low contrast in a step S313. If out of focus for the first time, then control goes back to the step S301 and repeats the above steps. If not out of focus for the first time when the object is of a low contrast and also if the focusing lens group 53 is not in focus in a step S315, control jumps to a moving-object-tracking successive checking process (FIG. 15). If in focus in the step S315, then the main CPU 35 determines whether the automatic focusing device is in the focus prediction AF mode or not, i.e., whether a focus prediction AF mode flag is set or not, in a step S317. If already in the focus prediction AF mode, then the main CPU 35 clears the moving-object-tracking successive shutter release flag in a step S337, and then control goes to a step S555 for the focus prediction AF mode. The moving-object-tracking successive shutter release process is a process in which successive exposures are made while in the focus prediction AF mode.

If not in the focus prediction AF mode, and the moving-object-tracking successive shutter release flag is set in a step S319, then the moving-object-tracking successive shutter release flag is cleared and the re-integration flag is set in a step S321. Thereafter, control proceeds to an OUT-OF-FOCUS 2 process (step S503) shown in FIG. 17.

If not in the focus prediction AF mode, and the moving-object-tracking successive shutter release flag is cleared in the step S319, then the main CPU 35 sets the AF shutter release permission flag which permits the shutter to be released in the AF process in a step S323, and then determines whether the automatic focusing device is in the AF locking process or not, i.e., whether the AF lock flag is set or not, in a step S325.

If not in the AF locking process, i.e., if the AF process is carried out for the first time after the focusing lens group 53 is brought into focus, in the step S325, then the main CPU 35 sets the AF lock flag in a step S327. If the AF lock flag has already been set in the step S325, then since the AF process is the second or subsequent AF process after the focusing lens group 53 is brought into focus, control jumps to the AF locking process in which the loop time checking process is executed in a step S341.

After the AF lock flag is set in a step S327, if the object is of a high contrast in a step S329 and the focus prediction AF mode inhibit flag is not set in a step S331, then a provided shutter release interrupt occurs in a predetermined time in a step S333, and the main CPU 35 resets the AF shutter release permission flag in a step S335. Thereafter, control returns to the step S301 for re-integration. If the object is of a low contrast in the step S329 or if the focus prediction AF mode inhibit flag is set in the step S331, then control goes to the AF locking process in the step S341. The AF locking process is a process in which the AF process is not carried out while the photometric switch SWS is continuously turned on.

"AFNG process"

The AFNG process to be executed when the calculated defocus amount is invalid in the step S305 will be described below with reference to FIG. 14.

In the AFNG process, the main CPU 35 determines whether an out-of-focus flag is set or not while the object-in-motion is being tracked, i.e., whether the focusing lens group 53 is out of focus or not while the object-in-motion is being tracked, in a step S351. If the out-of-focus flag is set, then since the shutter can be released, control goes to an out-of-focus shutter release checking process. If the out-of-focus flag is not set, then the focus indicating LED is flickered, indicating that the focusing lens group 53 is not focused in a step S353. Since the integration process has already been carried out, the main CPU 35 sets the re-integration flag in a step S355, and calls the loop time checking subroutine in a step S357. If the loop time elapses, then control returns to the step S109. If the loop time does not elapse, then control goes to the re-integration process.

"End point process"

The end point process will be described below also with reference to the subroutine shown in FIG. 14.

When the focusing lens group 53 reaches one of the end points of its stroke and cannot be driven anymore, or when the AF motor 39 cannot be rotated due to some external forces applied, the AF motor 39 is braked in a step S361. If the focusing lens group 53 is driven with the calculated defocus amount being valid in a step S363, then control goes to the step S355. If the focusing lens group 53 is driven with the calculated defocus amount being invalid in the step S363, e.g., if during the search integration process, then the main CPU 35 determines whether the direction in which the focusing lens group 53 is driven is reversed or not in a step S365. If reversed, then control goes to the step S353. If not reversed, then the CPU 35 reverses the direction in which the focusing lens group 53 is driven in a step S367, and thereafter control proceeds to the search integration process.

"Moving-object-tracking successive checking process"

FIG. 15 shows a subroutine with respect to the moving-object-tracking successive checking process. Control enters the subroutine shown in FIG. 15 as when the focusing lens group 53 is not in focus in the step S315 of the focus checking process.

When the moving-object-tracking successive checking process is started, the main CPU 35 determines whether the moving-object-tracking successive shutter release flag is set or not in a step S401. If the AF process is carried out at least for the first, second, or third time, since the moving-object-tracking successive shutter release flag is not set, the moving-object-tracking successive checking process is not executed, and control jumps to the out-of-focus shutter release checking process shown in FIG. 16.

If the moving-object-tracking successive shutter release flag is set in the step S401, then since the object-in-motion is being tracked and successive exposures are being made, control goes to a step S405 in which the main CPU 35 sets the focus prediction AF mode flag. Then, the main CPU 35 determines whether the number of times that the shutter is released, with the focusing lens group 53 being out of focus during successive exposures while the object-in-motion is being tracked, is 0 or not in a step S407.

If the number of times that the shutter is released is 0, then inasmuch as the shutter release with the focusing lens group 53 being out of focus is finished, the main CPU 35 compares the present and preceding directions in which the focusing lens group 53 is driven in a step S409. If the present and preceding directions are the same in a step S411, then control jumps to the out-of-focus shutter release checking process. If the present and preceding directions are not the same, i.e., if the direction in which the object moves changes, then the main CPU 35 resets the moving-object-tracking successive shutter release flag in a step S412, resets the focus prediction AF mode flag in a step S413, and sets the re-integration flag in a step S415. Thereafter, control jumps to an out-of-focus process shown in FIG. 17.

If the number of times that the shutter is released is not 0 in the step S407, then the main CPU 35 sets a moving-object-tracking successive shutter release out-of-focus flag in a step S417, and thereafter determines whether the calculated defocus amount is valid or not in a step S419. If valid, then the main CPU 35 determines whether the presently calculated defocus amount has excessively changed from the previously calculated defocus amount in a step S421. If the presently calculated defocus amount has excessively changed from the previously calculated defocus amount in a step S423, then control jumps to a moving-object-tracking control process in a step S561 shown in FIG. 18. If the presently calculated defocus amount has not excessively changed from the previously calculated defocus amount, then control goes to the step S409. If the calculated defocus amount is invalid in the step S419, then control jumps to the moving-object-tracking control process in the step S561 shown in FIG. 18.

"Out-of-focus shutter release checking process"

The out-of-focus shutter release checking process according to a feature of the present invention will be described below with reference to FIG. 16. The out-of-focus shutter release checking process is a process in which any shutter release is inhibited when the focusing lens group 53 is out of focus in the focus-preference AF mode, but the shutter can be released in the focus prediction AF mode even if the focusing lens group 53 is out of focus and the defocus amount has excessively changed.

When the out-of-focus shutter release checking process is started, the main CPU 35 determines whether the moving-object-tracking successive shutter release out-of-focus flag is set or not in a step S451 and then determines whether the moving-object-tracking flag is set or not in a step S453. If both flags are set, then the main CPU 35 determines whether the calculated defocus amount is valid or not in a step S455. If valid, then the main CPU 35 detects any change in the calculated defocus amount in a step S457.

If the calculated defocus amount has not excessively changed in a step S459, then control proceeds to the focus prediction AF mode. If the calculated defocus amount is invalid in the step S455 or if the calculated defocus amount has excessively changed though the calculated defocus amount is valid in the step S459, then the main CPU 35 checks the shutter release switch SWR in a step S461. If the shutter release switch SWR is not turned on, control goes to the focus prediction AF mode. If the shutter release switch SWR is turned on, then the number of times that the shutter is released with the focusing lens group 53 being out of focus during successive exposures, while the object-in-motion is being tracked, is decremented by 1 in a step S463. If the number of times that the shutter is released becomes 0 in a step S465, then the moving-object-tracking successive shutter release out-of-focus flag is reset in a step S467. Then, the main CPU 35 calculates the number of drive pulses for the time lag and sets the AF lock flag in a step S469, after which control goes to the moving-object-tracking control process. If the number of times that the shutter is released is not 0 in the step S465, then the moving-object-tracking successive shutter release out-of-focus flag is not reset, but the number of drive pulses for the time lag is calculated and the AF lock flag is set in the step S469, after which control goes to the moving-object-tracking control process.

"Out-of-focus process"

The out-of-focus process at the time the object is out of focus will be described below with reference to FIG. 17. The out-of-focus process is a process in which the number of times that the object is out of focus is counted to determine whether the object is moving or not, and the automatic focusing device enters the focus prediction AF mode when the object is detected as being out of focus successively three times. When the out-of-focus process is started, the main CPU 35 clears the secondary focus allowance, resets the focus, shutter release permission, and AF lock flags, and turns off the focusing indicating LED and the electronic buzzer 46 in a step S501.

Then, the main CPU 35 checks the re-integration flag in a step S503. If the re-integration flag is reset, then since the integration process is not a second or subsequent process, control jumps to a pulse calculation process. If the re-integration flag is set, then since at least one integration process is finished, the main CPU 35 compares the present and preceding directions in which the focusing lens group 53 is driven in a step S505. If the present and preceding directions are the same in a step S507, if the object is of a high contrast in a step S509, and if the focus prediction AF mode inhibit flag is reset in a step S511, then the main CPU 35 decrements an object-in-motion determining counter by 1 in a step S513. The object-in-motion determining counter is initially set to "3". Therefore, when the object is out of focus successively three times as a result of the re-integration and the lens driving, the object is determined as moving.

If the re-integration flag is reset in the step S503, if the present and preceding directions are the same in the step S507, if the object is not of a high contrast in the step S509, or if the focus prediction AF mode inhibit flag is reset in the step S511, then the object-in-motion determining counter is not decremented and control jumps to the pulse calculation process.

After the object-in-motion determining counter is decremented in the step S513, the main CPU 35 determines whether the count of the object-in-motion determining counter is 0 or not in a step S515. If the count of the object-in-motion determining counter is 0, then, the main CPU 35 sets the focus prediction AF mode flag in a step S517, and then resets the object-in-motion determining counter to "3" in a step S519. Thereafter, control goes to the focus prediction AF mode. If the count of the object-in-motion determining counter is not 0 in the step S515, then control jumps to the pulse calculation process.

"Moving-object-predicting AF mode"

The focus prediction AF mode will be described below with reference to FIG. 18. When the focus prediction AF mode is started, the main CPU 35 determines whether the focus prediction AF mode flag is set or not in a step S551. If not set, then since the focusing lens group 53 is out of focus for the first time or successively twice, control goes to the out-of-focus process. If the focus prediction AF mode flag is set, then the main CPU 35 resets the secondary focus interval, focus, shutter release permission, and AF lock flags, and turns off the focusing indicating LED and the electronic buzzer 46 in a step S553.

Then, the main CPU 35 calculates the number of defocus pulses based on the integral data calculated in the step S303 in a step S555. The calculated number of defocus pulses is of a value with respect to the object at the intermediate point of the integration time.

The main CPU 35 then calculates a speed at which the object image plane moves, i.e., an object-in-motion tracking speed, based on the present number of defocus pulses and the time between the preceding and present integration times in a step S557. After calculating the speed, the main CPU 35 determines whether the moving-object-tracking flag is set or not in a step S559.

If the moving-object-tracking flag is set, then since the object-in-motion is already being tracked, the main CPU 35 determines whether the AF lock flag is set or not in a step S567. If the AF lock flag is set, then control proceeds a pulse setting process. If the AF lock flag is not set, then control goes to the re-integration process.

If the moving-object-tracking flag is not set, then since the automatic focusing device is in the first lens driving process before entering the moving-object-tracking operation, the main CPU 35 sets the AF counter 35d to the number of defocus pulses calculated in the step S555 in a step S563. Then, the main CPU 35 sets a time to energize the AF motor 39, i.e., to drive the focusing lens group 53, at a speed that is three times the speed at which the object image plane moves, and sets a triple-speed lens driving flag in a step S565. Thereafter, control goes to a constant-speed control process.

"Pulse calculation process"

Figure 20A:
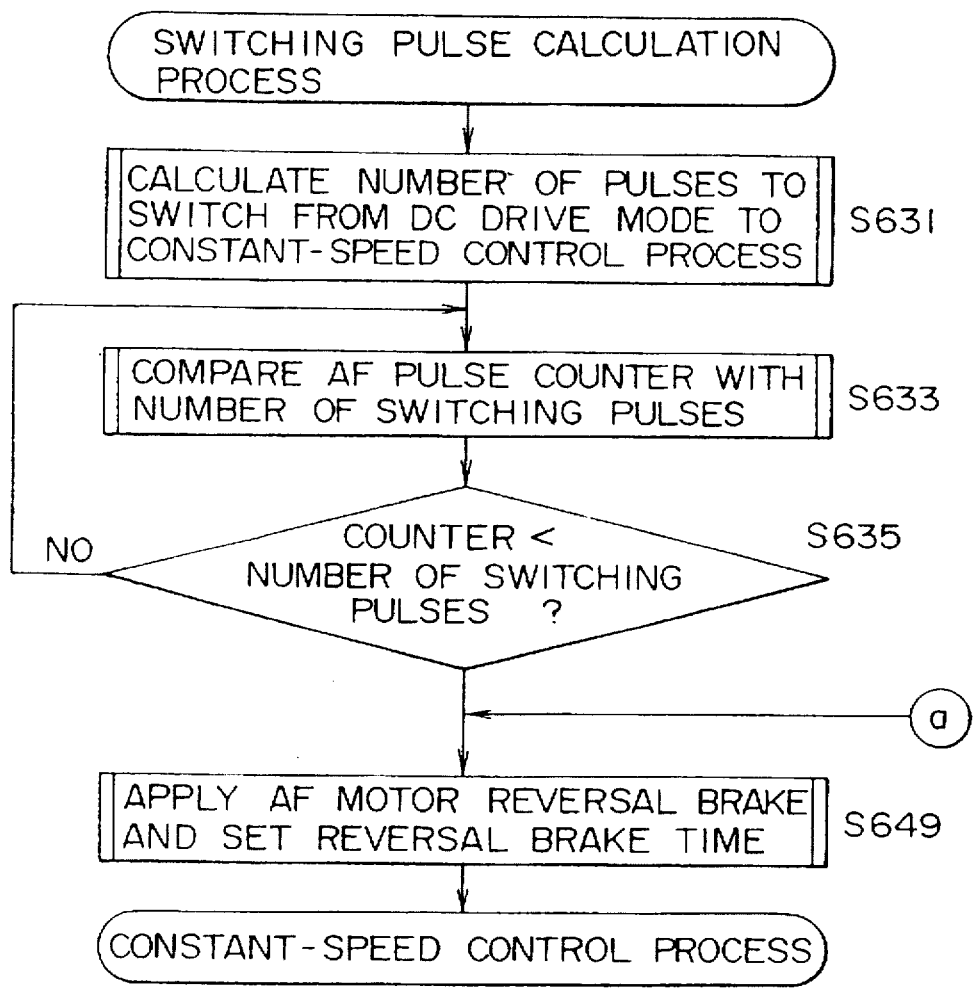
Figure 20:
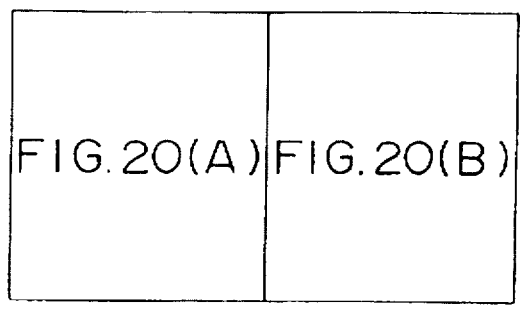

The pulse calculation process will be described below with reference to FIGS. 19 and 20. The pulse calculation process is a process in which the number of pulses required to drive the focusing lens group 53 to a focusing position based on the defocus amount determined from the integral data and also the number of pulses to remove backlash. A backlash actuation mode is an actuation mode for removing backlash from gears in the AF motor 39 and from the joints 47, 57 and the focus adjusting mechanism 55 when the direction in which the AF motor 39 rotates changes. In this embodiment, the backlash actuation mode is carried out separately before the focusing lens group 53 is driven based on the defocus amount.

In the pulse calculation process, the main CPU 35 calculates the number of defocus pulses in a step S601. When the direction of the lens driving, i.e., the sign of the defocused value, has changed from the previous direction or the previous sign, then the main CPU 35 calculates a backlash pulse amount and sets a backlash actuation flag in a step S603. Thereafter, control goes to the pulse setting process. The backlash pulse amount represents the number of pulses required to remove backlash and the direction in which the AF motor 39 rotates. The backlash value of the camera body 11 has already been stored in the EEPROM 43. The backlash value of the lens mechanism 51 has been stored in a ROM of the lens CPU 61, and is supplied to the main CPU 35 through the peripheral control circuit 23 and stored in the RAM 35b of the main CPU 35.

In the pulse setting process, the main CPU 35 sets the counter 35d to the number of defocus pulses when the backlash actuation flag is not set, and to the number of backlash pulses when the backlash actuation flag is set in a step S611. Thereafter, the main CPU 35 determines whether the automatic focusing device is in the focus prediction AF mode or not in a step S613.

If not in the focus prediction AF mode, then the main CPU 35 starts energizing the AF motor 39 in the DC drive mode in a step S615. Thereafter, if the backlash actuation is not carried out, i.e., if the backlash actuation flag is cleared, in a step S617, then the main CPU 35 compares the count of the counter 35d with a predetermined number of pulses in a step S619. If the count of the counter 35d is smaller in a step S621, then control goes to a constant-speed switching pulse calculation process shown in FIG. 20. If the count of the counter 35d is greater than or equal to, then the main CPU 35 clears the focus prediction AF mode flag in a step S623, and starts an overlap integration, receives the CCD data, and carries out a defocus calculation in a step S625. The overlap integration is a process in which an integration is effected while the focusing lens group 53 is being driven.

When the defocus amount is determined, the main CPU 35 determines whether the defocus amount is valid or not in a step S627. If invalid, then control returns to the step S619. If valid, then control proceeds to an driving direction checking process.

In the driving direction checking process, the main CPU 35 determines whether the focusing position is closer than a predetermined range with respect to the object image position based on the defocus amount in a step S651. The predetermined range is a range wider than a focus allowance for determining whether the focusing lens group 53 is in focus or not. If the focusing position is closer than the predetermined range in a step S653, then the main CPU 35 calculates the number of defocus pulses based on the defocus amount determined by the overlap integration in the step S625, and sets the counter 35d to the calculated number of defocus pulses in a step S655. Thereafter, control returns to the step S619. If the focusing position exceeds or is in the predetermined range, then the main CPU 35 brakes the AF motor 39 to stop the lens driving in a step S657, after which control returns to the re-integration process. In this embodiment, the AF motor 39 can be braked by short-circuiting the input terminals of the AF motor 39 (short-circuiting brake).

If the automatic focusing device is in the focus prediction AF mode, i.e., if the moving-object-predicting AF mode is set in the step S613, then the main CPU 35 energizes the AF motor 39 in the DC drive mode for rotation in the direction so far in a step S619, and thereafter carries out the constant-speed switching pulse calculation process in which the AF motor 39 switches from the DC drive mode to the constant-speed mode by way of PWM in a step S631. Then, the main CPU 35 compares an AF pulse counter value, i.e., the count of the counter 35d, with a constant-speed switching pulse value in a step S633, and waits until the AF pulse counter value becomes smaller than the constant-speed switching pulse value in a step S635.

If the AF pulse counter value becomes smaller than the constant-speed switching pulse value, the main CPU 35 applies a reversal brake to the AF motor 39 and sets a reversal brake time in a step S649. Thereafter, control proceeds to the constant-speed control process.

If the backlash actuation is carried out in the step S617, then the main CPU 35 reads and compares the AF pulse counter value with the constant-speed switching pulse value in a step S639. If the AF pulse counter value is smaller than the constant-speed switching pulse value in a step S641, then the main CPU 35 applies a reversal brake to the AF motor 39 and sets a reversal brake time in the step S649. Thereafter, control proceeds to the constant-speed control process.

If the AF pulse counter value is equal to or greater than the constant-speed switching pulse value, then the main CPU 35 waits until the backlash actuation in the DC drive mode is over. If the backlash actuation in the DC drive mode is over, then the main CPU 35 brakes the AF motor 39 to stop the AF motor 39 in a step S645, and resets the backlash actuation flag thus finishing the backlash actuation in a step S647. The main CPU 35 sets the AF pulse counter to the number of defocus pulses, and effects a lens driving for the normal AF process.

According to the above process, the lens driving for backlash is carried out before the lens driving for defocus. If the amount of driving for defocus pulses is greater than a predetermined value, then the lens driving for backlash is carried out in the DC drive mode within a short period of time. If the amount of driving for defocus pulses is smaller than the predetermined value, then the lens driving for defocus pulses is carried out accurately, but not excessively, by the constant-speed control process.

"Process of calculating the number of switching pulses to switch from the DC drive mode to the constant-speed control process"

The subroutine of the step S631 will be described in detail with reference to FIG. 21. When the AF motor 39 is energized in the DC drive mode, it is energized for the number of drive pulses, and in order to stop the AF motor 39 accurately at a desired position without exceeding it, the AF motor 39 is decelerated by the constant-speed control process before it is stopped. The subroutine of the step S631 is a process of calculating the number of remaining drive pulses to switch from the DC drive mode to the constant-speed control process.

First, the main CPU 35 determines whether the number of drive pulses is greater than the predetermined number of pulses in a step S661. If the number of drive pulses is greater than or equal to the predetermined number of pulses, then the main CPU 35 sets the number of reference pulses to the number of switching pulses in a step S663. Thereafter, control returns to the process shown in FIG. 20. If the number of drive pulses is smaller than the predetermined number of pulses, then the main CPU 35 calculates the number of switching pulses according to the equation [the number of switching pulses=the number of reference pulses–(the predetermined number of pulses –the number of drive pulses)/6], after which control returns to the process shown in FIG. 20. The number of reference pulses is the number of pulses with which the AF motor 39 can be stopped under the PWM control to stop the focusing lens group 53 at a predetermined position.

The above subroutine thus calculates the number of remaining drive pulses to switch from the DC drive mode to the constant-speed control process.

"Moving-object-tracking speed calculation"

Figure 23A:
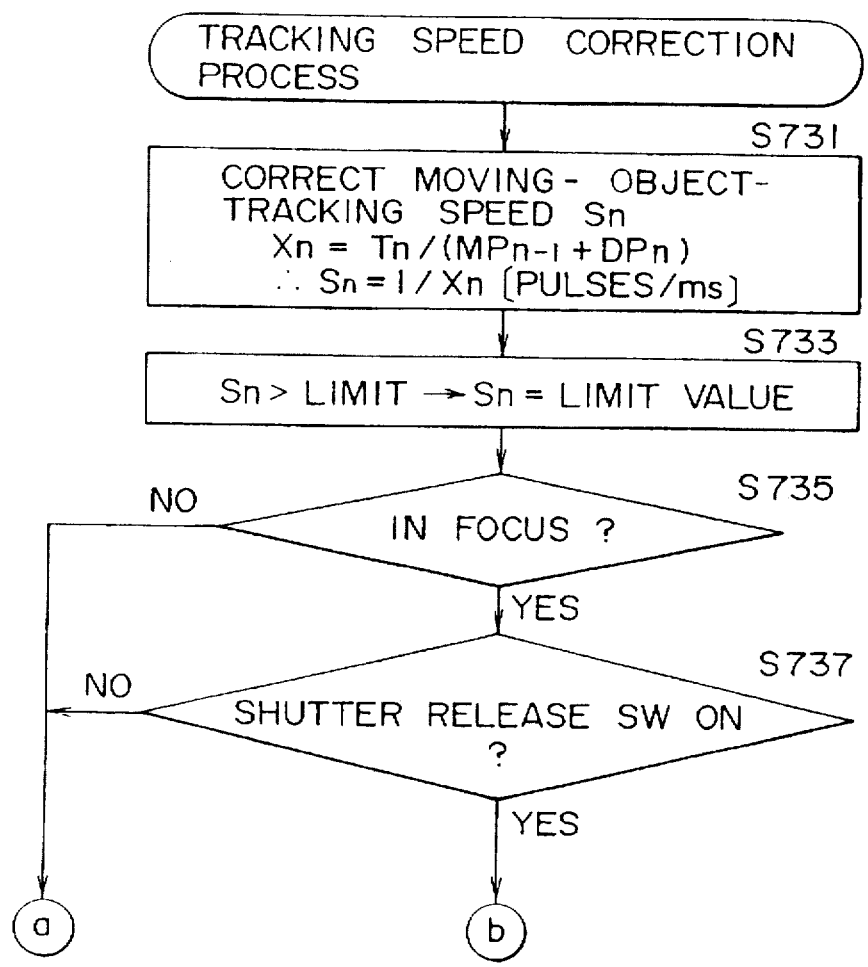
Figure 23:
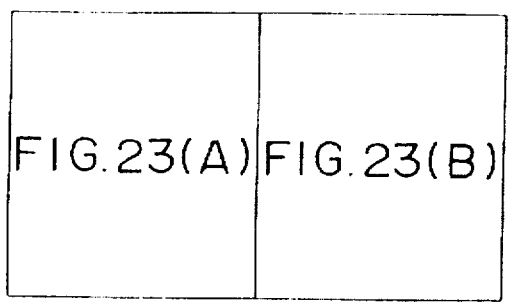
Figure 23B:
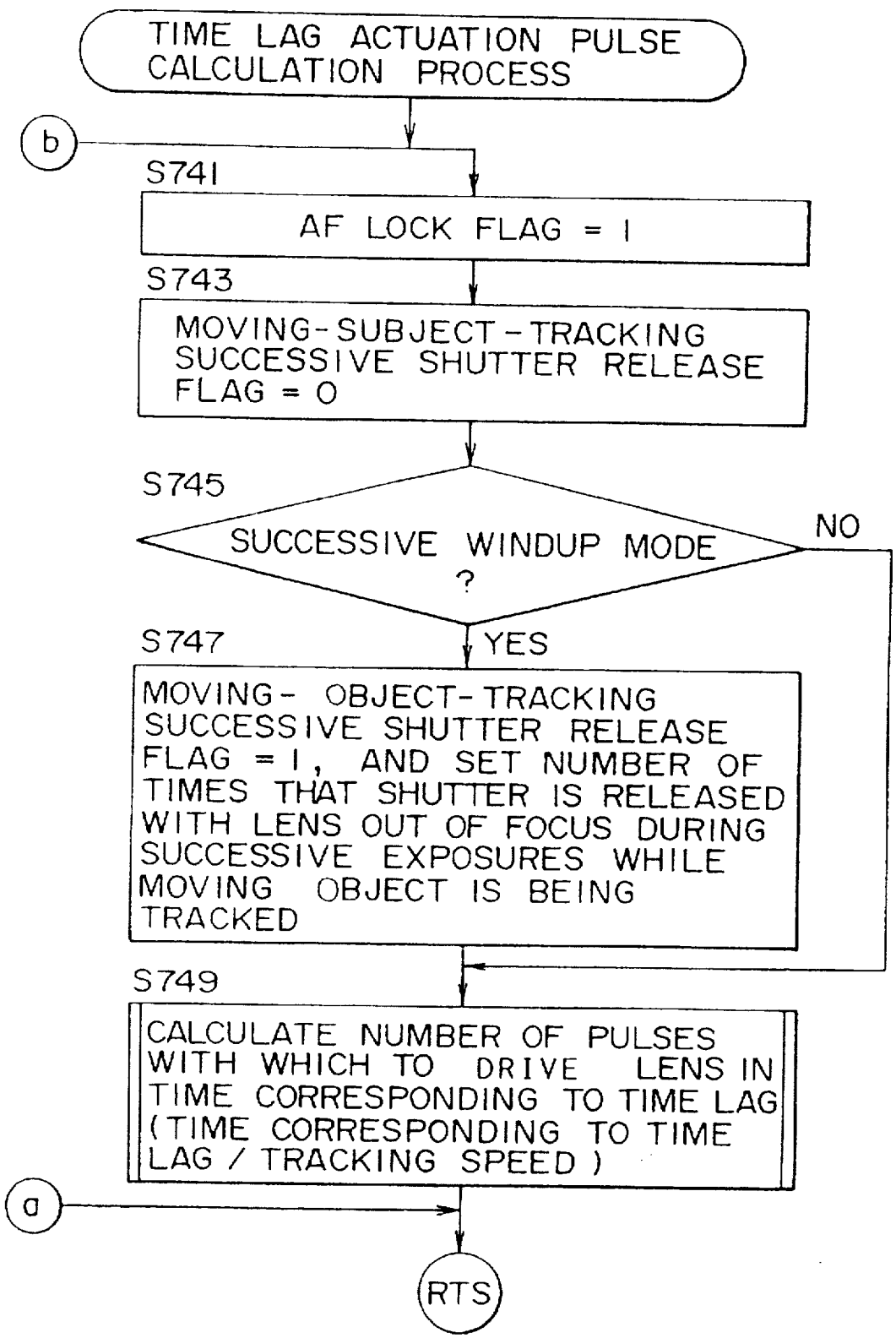

A moving-object-tracking speed calculation process will be described below with reference to FIGS. 22 and 23. First, the main CPU 35 calculates a time Tn between the intermediate points of the preceding and present integrations in a step S701. The integration intermediate points are used because the integration times vary depending on the object brightness.

If not yet in the moving-object-tracking AF mode in a step S703, the main CPU 35 calculates an object image moving speed S1 before tracking in a step S705, and then control returns.

If already in the moving-object-tracking AF mode in the step S703, then the main CPU 35 calculates the number MPn–1 of pulses with which the object image would have moved within a time Tn in a step S707.

The main CPU 35 compares the preceding and present directions in which the focusing lens group 53 is driven in a step S709. If the preceding and present directions are the same as each other in steps S711, S713, then the main CPU 35 adds the present number DPn of defocus pulses to the number MPn–1 of pulses in a step S715. Thereafter, control proceeds a tracking speed correction process.

If the preceding and present directions are different from each other in the step S711, then it is considered that the speed at which the object moves is reduced, or the object is stopped and exceeds the focusing position, or the direction in which the object moves is varied. After the step S711, the main CPU 35 determines whether the number MPn–1 of pulses is greater than or equal to the number DPn of defocus pulses (MPn–1–DPn>=0) in a step S717. If affirmative, then the main CPU 35 determines MPn–1 DPn–in a step S721. If not larger, then the main CPU 35 sets MPn–1–DPn=1 in a step S719. The steps S721, S719 are followed by a step S723 in which the main CPU 35 corrects the object image moving speed Sn as follows:

$$Xn=Tn/(MPn-1-DPn),$$

and $$Sn=1/Xn=(MPn-1-DjPn)/Tn \text{ (pulses/ms)}.$$

If the focusing lens group 53 is in focus in a step S725, then control returns. If the focusing lens group 53 is out of focus in the step S725, then the main CPU 35 clears the focus prediction AF mode flag in a step S727, and control goes to the re-integration process.

If the preceding and present directions are neither different from each other nor the same as each other, i.e., if some fault occurs, then the main CPU 35 clears the focus prediction AF mode flag in the step S727, and control goes to the re-integration process.

"Tracking speed correction process"

In the tracking speed correction process, the main CPU 35 calculates the object image moving speed Sn in a step S731 as follows:

$$Xn=Tn/(MPn-1+DPn),$$

and $$Sn=1/Xn=(MPN=1+DPn)/Tn \text{ (pulses/ms)}.$$

Thereafter, inasmuch as the focusing lens group 53 cannot be driven at the object image moving speed Sn, if the object image moving speed Sn exceeds a lens driving speed limit of the camera, the main CPU 35 sets the object image moving speed Sn to the lens driving speed limit in a step S733.

Then, if the focusing lens group 53 is not in focus in a step S735, or if the focusing lens group 53 is in focus in the step S735, but the shutter release switch SWR is turned off in a step S737, then control returns. If the focusing lens group 53 is in focus in the step S735, and the shutter release switch SWR is turned on in the step S737, then control goes to a time lag actuation pulse calculation process.

"Time lag actuation pulse calculation process"

In the time lag actuation pulse calculation process, the main CPU 35 sets the AF lock flag in a step S741 and clears the moving-object-tracking successive shutter release flag in a step S743. If the automatic focusing device is in a successive windup mode (successive exposure mode) in a step S745, then the main CPU 35 sets the moving-object-tracking successive shutter release flag and sets the number of times that the shutter is released with the focusing lens group 53 being out of focus while the object-in-motion is being tracked in a step S747. Note that the number of times that the shutter is released with the focusing lens group 53 being out of focus is stored in EEPROM 43 and read out at the step S747. Thereafter, the main CPU 35 calculates the number of pulses with which to drive the focusing lens group 53 within a time corresponding to the time lag according to the equation: (time corresponding to the time lag/tracking speed) in a step S749. If not in the successive windup mode in the step S745, then the main CPU 35 does not set the moving-object-tracking successive shutter release flag, but calculates the number of pulses with which to drive the focusing lens group 53 within the time lag in the step S749, after which control returns.

"Constant-speed control process"

The constant-speed control process for energizing the AF motor (zoom motor) 39 at a constant speed such as the object image moving speed Sn will be described below with reference to FIG. 24.

In the constant-speed control process, the main CPU 35 first sets an driving speed for the constant-speed control mode by way of PWM in a step S751. The driving speed can be set to a lower speed in a step S913 (described later). If not in the focus prediction AF mode in a step S753, then control goes to a step S763. If in the focus prediction AF mode in the step S753, then the main CPU 35 sets the moving-object-tracking speed Sn in a step S755 to drive the focusing lens group 53 at the moving-object-tracking speed Sn to track the object. If the object-in-motion is not being tracked in a step S757, or if the object-in-motion is being tracked in the step S757 and the AF lock flag is set in a step S759, then control also goes to the step S763 since the focusing lens group 53 is not driven to track the object.

If the AF lock flag is not set in the step S759, then the main CPU 35 sets a triple-speed which is three times greater than the moving-object-tracking speed Sn in a step S761 to drive the focusing lens group 53. Then, control goes to the step S763. A constant-speed control time interrupt process and a pulse input interrupt process are allowed to drive the focusing lens group 53 at a constant speed. In the step S763, a triple-speed driving time checking subroutine shown in FIG. 26 is called.

"Triple-speed driving time setting process"

A triple-speed driving time setting subroutine, which is part of the step S763, will be described below with reference to FIG. 25.

The main CPU 35 sets ½ of the time from the intermediate point of the preceding integration to the end of the present integration and calculation in a step S801. If the moving-object-tracking successive shutter release flag has been cleared in a step S803, then control returns. If the moving-object-tracking successive shutter release flag is set after the shutter is released, then the main CPU 35 clears the moving-object-tracking successive shutter release flag in a step S804, and thereafter sets ½ of the sum of the exposure time, the windup time, and the present integration and calculation time in a step S805.

"Triple-speed driving time checking subroutine"

In the triple-speed driving time checking subroutine shown in FIG. 26, the main CPU 35 determines whether the automatic focusing device is in the moving-object-predicting AF mode or not in a step S811, and whether a triple-speed lens driving flag is set or not in a step S813.

If not in the focus prediction AF mode, or if in the focus prediction AF mode and the triple-speed lens driving flag is not set, then control returns to the step S763. If in the focus prediction AF mode and the triple-speed lens driving flag is set, then a triple-speed lens driving time is measured in a step S815. If the triple-speed lens driving time does not run out in a step S817, then control returns to the step S763 to continue the triple-speed lens driving. If the triple-speed lens driving time runs out, then in order to stop the triple-speed lens driving, the main CPU 35 clears the triple-speed lens driving flag in a step S819, brakes the AF motor 39 in a step S821, and resets the constant-speed control process in a step S823. Resetting the constant-speed control process is setting the speed, which has been set to three times the moving-object-tracking speed Sn, to the moving-object-tracking speed Sn again. If the moving-object-tracking flag is set in a step S825, then control returns to the step S763. If the triple-speed lens driving flag is not set in the step S825, then it is set in a step S827, after which control goes to the re-integration process.

Control goes from the step S763 to a step S765 (see FIG. 24) to call a reversal brake time checking subroutine shown in FIG. 27. In the reversal brake time checking subroutine, the main CPU 35 determines whether a reversal brake time is over or not in a step S831. If over, the main CPU 35 short-circuits the input terminals of the AF motor 39 thus braking the AF motor 39 in a step S833. Then, control returns to the step S765. If not over, then control returns from the step S831 to the step S765. The fact that the reversal brake time is over means that the interval between pulses outputted from the encoder 41 is longer than a predetermined time, i.e., the rotation of the AF motor 39 is sufficiently slow.

"Constant-speed control time interrupt process"

FIG. 28 shows a constant-speed control time interrupt subroutine which is executed when AF pulses are not outputted for a predetermined time while in the constant-speed control mode.

When the constant-speed control time interrupt subroutine is started, the main CPU 35 measures the time in an end-point detecting timer in a step S841. If the AF motor 39 is energized in a step S845, then control returns. If the AF motor 39 is not energized, then the main CPU 35 effects a constant-speed control mode resetting process in a step S847, after which control returns. In the constant-speed control mode resetting process, the setting of the speed at which the AF motor 39 is energized is updated while it is under PWM control.

"Pulse input interrupt process"

A pulse input interrupt process, which is executed each time an AF pulse is outputted from the encoder 41, will be described below with reference to FIGS. 29 and 30. The main CPU 35 first carries out the reversal brake time checking process in a step S901. The main CPU 35 determines whether the automatic focusing device is in the focus prediction AF mode or not in a step S903 and then whether the AF lock flag is set or not in a step S905. If in the focus prediction AF mode and if the AF lock flag is not set, then control jumps to a step S917. If not in the focus prediction AF mode, or if in the focus prediction AF mode but if the AF lock flag is set, then the main CPU 35 determines whether the counting of pulses is finished or not in a step S907.

If the pulse counting is not finished, then the main CPU 35 carries out the end point process shown in FIG. 14 and resets the end-point detecting timer in a step S909. The end-point detecting timer is a counter for detecting the time at which no pulses are outputted from the encoder 41 when the focusing lens group 53 reaches an end point.

If the count of the pulse counter 35d is greater than or equal to the number of speed switching pulses in a step S911, then control jumps to the step S917. If smaller, then the main CPU 35 changes the control speed in a step S913, and effects an AF motor reversal brake process and a reversal brake time setting process (see FIG. 31) in a step S915. Then, control goes to the step S917.

In the step S917, the main CPU 35 determines whether the AF motor 39 is energized or not. If energized, the main CPU 35 applies a short-circuiting brake to the AF motor 39 in a step S919, and carries out the constant-speed control mode resetting process in a step S921, which is the same as the step S847.

If the pulse counting is over in the step S907, then control goes to a step S923 to brake the AF motor 39. If the automatic focusing device is in the moving-object-predicting AF mode in a step S925, then the main CPU 35 sets an AF release permission flag in a step S927 to allow the shutter to be released in the AF process, after which control proceeds to the shutter release process.

If not in the focus prediction AF mode in the step S925, the main CPU 35 determines whether the automatic focusing device is in the backlash actuation mode or not in a step S929. If in the backlash actuation mode, the main CPU 35 calls the loop time checking subroutine in a step S931. If the loop time has elapsed, then control jumps to the step S109. If the loop time has not elapsed, then control returns to the re-integration process.

The process shown in FIGS. 29 and 30 is executed each time an AF pulse is outputted from the encoder 41 in the constant-speed control mode.

"Reversal brake time setting process"

The reversal brake time setting process in the steps S649, S915 will be described below with reference to FIG. 31. In the reversal brake, the AF motor 39 is supplied with a current to apply a rotational force in a direction opposite to the direction in which the AF motor 39 is presently rotating.

The main CPU 35 sets a reversal brake time, i.e., a time as a reference for an AF pulse interval to apply the reversal brake, in a step S941. If not changing the speed for the constant-speed control mode in a step S943, then control returns. If changing the speed for the constant-speed control mode, then the main CPU 35 determines whether the short-circuiting brake is applied or not in a step S945. If the short-circuiting brake is not applied, i.e., if the AF motor 39 is energized, then the main CPU 35 sets a time that is proportional to the time spent since the AF motor 39 was energized in a step S947. If the short-circuiting brake is applied, then the main CPU 35 sets a time that is inversely proportional to the time elapse since the short-circuiting brake was applied to the AF motor 39 in a step S949. Control returns after the steps S947 and S949. The time set in the step S947 is indicated by |reference time−{corrective value x (constant-speed control time−time spent since energized)}|, and the time set in the step S949 is indicated by |reference time−(corrective value x time elapse since short-circuiting brake)|.

Inasmuch as the reversal brake can be applied depending on the rotational speed of the AF motor 39, it is possible to stop the AF motor 39 and the focusing lens group 53 in a short period of time even when the AF motor 39 is rotating at high speed. The focusing lens group 53 can be brought into focus quickly because the time in which the AF motor 39 is energized in the DC drive mode can be increased even with a small number of drive pulses.

With the above embodiment, as described above, when the automatic focusing device enters the moving-object-predicting AF mode while in the successive exposure (successive windup) mode, even if the object-in-motion temporarily moves out of the rangefinding zone of the viewfinder field while the object-in-motion is being tracked, the moving-object-tracking AF mode is continued for a while at the speed at which the object-in-motion has been tracked immediately before the object-in-motion moves out of the rangefinding zone. As shown in FIG. 15(A), if another object other than the aimed object-in-motion temporarily enters between the aimed object and the camera (the rangefinding zone of the viewfinder field), or the aimed object is temporarily moves out of the rangefinding zone of the viewfinder field, and the defocus amount becomes invalid or changes excessively, the process goes to the step S561 in FIG. 18. Thus, the step S557 is skipped in such a situation, and the speed Sn at the preceding calculation is used for driving the AF motor 39. Accordingly, it is possible to make successive exposures in focus with respect to the object-in-motion.

Consequently, even if the object moves out of the rangefinding zone while the object is being tracked, the focusing lens group is driven at a speed to track the object based on the distance data produced immediately before the object moves out of the rangefinding zone. When the shutter is released with the object moving out of the rangefinding zone, an exposure with respect to the object-in-motion can be made while keeping the focusing lens group in focus. In particular, the automatic focusing device allows successive exposures to be made in focus with respect to the object-in-motion.

The present disclosure relates to an object matter contained in Japanese Patent Application No. HEI 4-243436, filed on Sep. 11, 1992, which is expressly incorporated herein by reference in its entirety.

What is claimed is:

1. An automatic focusing device used in a camera capable of executing successive exposures, said successive exposures being taken when said automatic focusing device is in a focus prediction mode, said automatic focusing device comprising:

an optical system including a focusing lens group;

a defocus measuring system that obtains defocus amount data of an image of an object to be tracked with respect to a film plane;

a memory which stores a defocus amount data;

a control system which determines whether a currently obtained defocus amount data is a defocus amount data of said image of the object to be tracked or of an image of another object, based upon a change in the currently obtained defocus amount data in relation to a previously obtained defocus amount data which is stored in said memory;

a calculating system that calculates a relative speed of movement of said image of the object to be tracked along an optical axis of said focusing lens group with respect to said film plane based on the previous defocus amount data stored in said memory and the defocus amount currently obtained by said defocus measuring system; and a lens driving system that drives said focusing lens group along the optical axis of said optical system, wherein said lens driving system drives said focusing lens in accordance with a previously calculated relative speed when said control system determines that said currently obtained defocus amount data is a defocus amount data of said image of said another object, and drives said focusing lens in accordance with a currently calculated relative speed when said control system determines that said currently obtained defocus amount data is the defocus amount data of said image of said object to be tracked.

2. An automatic focusing device according to claim 1, said lens driving system driving said focusing lens group according to a last calculated relative speed stored in said memory when said control system determines that said current defocus amount is defocus amount data of another object.

3. An automatic focusing device according to claim 1, said lens driving system driving said focusing lens group at a constant speed when said control system determines that said current defocus amount is defocus amount data of another object.

4. An automatic focusing device according to claim 1, further comprising an enabling system that enables said calculating system to calculate said relative speed when said currently obtained defocus amount is within a predetermined amount of said preceding obtained defocus amount data.

5. An automatic focusing device according to claim 1, said control system further including a system that establishes an object tracking mode when said currently obtained defocus amount data has changed in excess of a predetermined amount in relation to a preceding obtained defocus amount data.

6. An automatic focusing device according to claim 1, further comprising a shutter release system that actuates a shutter, exposes a photographic film, and winds the photographic film.

7. An automatic focusing device according to claim 6, further comprising a system that suspends said calculation of relative speed when said shutter release system is actuated and a system that resumes said calculation of said relative speed when said winding is complete.

8. An automatic focusing device according to claim 7, said lens driving system driving said focusing lens group according to a relative speed of movement calculated prior to actuation of said shutter release system when said shutter release system is actuated.

9. An automatic focusing device according to claim 8, said lens driving system driving said focusing lens group at three times said relative speed calculated prior to actuation of said shutter release system when said currently obtained defocus amount data, measured after said winding is complete, has changed in excess of a predetermined amount of a preceding obtained defocus amount data.

* * * * *